United States Patent
Xu et al.

(10) Patent No.: US 12,072,558 B2
(45) Date of Patent: Aug. 27, 2024

(54) VIRTUAL OBJECT MOVEMENT SPEED CURVE FOR VIRTUAL AND AUGMENTED REALITY DISPLAY SYSTEMS

(71) Applicant: Magic Leap, Inc., Plantation, FL (US)

(72) Inventors: Yan Xu, San Jose, CA (US); Ikko Fushiki, Sunnyvale, CA (US); Suraj Manjunath Shanbhag, Santa Clara, CA (US); Shiuli Das, Sunnyvale, CA (US); Jung-Suk Lee, Sammamish, WA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 18/340,778

(22) Filed: Jun. 23, 2023

(65) Prior Publication Data

US 2024/0027794 A1 Jan. 25, 2024

Related U.S. Application Data

(63) Continuation of application No. 17/174,087, filed on Feb. 11, 2021, now Pat. No. 11,726,349.

(Continued)

(51) Int. Cl.
*G02B 27/01* (2006.01)
*G02B 27/36* (2006.01)
(Continued)

(52) U.S. Cl.
CPC ......... *G02C 7/061* (2013.01); *G02B 27/0172* (2013.01); *G02B 27/36* (2013.01); *G02C 7/024* (2013.01); *G02B 2027/014* (2013.01)

(58) Field of Classification Search
CPC .... G02C 7/061; G02C 7/024; G02B 27/0172; G02B 27/36; G02B 27/017;
(Continued)

(56) References Cited

U.S. PATENT DOCUMENTS 6,850,221 B1   2/2005   Tickle
7,483,030 B2   1/2009   Kass et al.
(Continued)

FOREIGN PATENT DOCUMENTS

EP    3 436 863 A1    2/2019

OTHER PUBLICATIONS

ARToolKit:https://web.archive.org/web/20051013062315/http:www.hitl.washington.edu:80/artoolkit/documentation/hardware.htm, archived Oct. 13, 2005.

(Continued)

*Primary Examiner* — William R Alexander
(74) *Attorney, Agent, or Firm* — Seed IP Law Group LLP

(57) ABSTRACT

Systems and methods for regulating the speed of movement of virtual objects presented by a wearable system are described. The wearable system may present three-dimensional (3D) virtual content that moves, e.g., laterally across the user's field of view and/or in perceived depth from the user. The speed of the movement may follow the profile of an S-curve, with a gradual increase to a maximum speed, and a subsequent gradual decrease in speed until an end point of the movement is reached. The decrease in speed may be more gradual than the increase in speed. This speed curve may be utilized in the movement of virtual objections for eye-tracking calibration. The wearable system may track the position of a virtual object (an eye-tracking target) which moves with a speed following the S-curve. This speed curve allows for rapid movement of the eye-tracking target, while providing a comfortable viewing experience and high accuracy in determining the initial and final positions of the eye as it tracks the target.

18 Claims, 34 Drawing Sheets

Related U.S. Application Data

(60) Provisional application No. 62/976,977, filed on Feb. 14, 2020.

(51) Int. Cl.
*G02C 7/02* (2006.01)
*G02C 7/06* (2006.01)

(58) Field of Classification Search
CPC ........... G02B 2027/014; H04N 13/344; H04N 13/383; G06F 3/011; G06F 3/013
USPC .................................................. 351/159.74
See application file for complete search history.

(56) References Cited

U.S. PATENT DOCUMENTS

| | | | |
|---|---|---|---|
| 2005/0195156 A1* | 9/2005 | Pihlaja | G06F 3/0338 |
| | | | 345/156 |
| 2006/0028436 A1 | 2/2006 | Armstrong | |
| 2007/0081123 A1 | 4/2007 | Lewis | |
| 2012/0127062 A1 | 5/2012 | Bar-Zeev et al. | |
| 2012/0162549 A1 | 6/2012 | Gao et al. | |
| 2013/0082922 A1 | 4/2013 | Miller | |
| 2013/0117377 A1 | 5/2013 | Miller | |
| 2013/0125027 A1 | 5/2013 | Abovitz | |
| 2013/0208234 A1 | 8/2013 | Lewis | |
| 2013/0242262 A1 | 9/2013 | Lewis | |
| 2013/0328762 A1* | 12/2013 | McCulloch | G06F 3/016 |
| | | | 345/156 |
| 2014/0049452 A1* | 2/2014 | Maltz | G02B 27/017 |
| | | | 345/8 |
| 2014/0071539 A1 | 3/2014 | Gao | |
| 2014/0177023 A1 | 6/2014 | Gao et al. | |
| 2014/0218468 A1 | 8/2014 | Gao et al. | |
| 2014/0267420 A1 | 9/2014 | Schowengerdt et al. | |
| 2015/0016777 A1 | 1/2015 | Abovitz et al. | |
| 2015/0103306 A1 | 4/2015 | Kaji et al. | |
| 2015/0178939 A1 | 6/2015 | Bradski et al. | |
| 2015/0205126 A1 | 7/2015 | Schowengerdt | |
| 2015/0309263 A2 | 10/2015 | Abovitz et al. | |
| 2015/0326570 A1 | 11/2015 | Publicover et al. | |
| 2015/0346495 A1 | 12/2015 | Welch et al. | |
| 2016/0011419 A1 | 1/2016 | Gao | |
| 2016/0026245 A1 | 1/2016 | Mantiuk et al. | |
| 2016/0026253 A1 | 1/2016 | Bradski et al. | |
| 2016/0048204 A1 | 2/2016 | Scott et al. | |
| 2016/0131902 A1* | 5/2016 | Ambrus | G06F 3/013 |
| | | | 345/156 |
| 2016/0148416 A1 | 5/2016 | Wu et al. | |
| 2016/0225191 A1* | 8/2016 | Mullins | G06F 3/013 |
| 2017/0263007 A1* | 9/2017 | Cavin | G06V 40/18 |
| 2018/0124387 A1* | 5/2018 | Zhao | H04N 13/344 |
| 2018/0205931 A1 | 7/2018 | Yano et al. | |
| 2019/0114052 A1 | 4/2019 | McBeth | |

OTHER PUBLICATIONS

Azuma, "A Survey of Augmented Reality," *In Presence: Teleoperators and Virtual Environments* 6(4):355-385, http://www.cs.unc.edu/~azuma, Aug. 1997.

Azuma, "Predictive Tracking for Augmented Reality," Dissertation, TR95-007, Doctor of Philosophy, Department of Computer Science, UNC-Chapel Hill, NC, Feb. 1995. (262 pages).

Bimber, et al., "Spatial Augmented Reality—Merging Real and Virtual Worlds," 2005 <https://web.media.mit.edu/~raskar/book/BimberRaskarAugmentedRealityBook.pdf>.

International Search Report and Written Opinion mailed Jun. 3, 2021, for International Application No. PCT/US21/17695. (20 pages).

Jacob, "Eye Tracking in Advanced Interface Design," in Woodrow Barfield and Thomas A Furness III, Virtual Environments and Advanced Interface Design, Oxford Academic, https://doi.org/10.1093/oso/9780195075557.003.0015, Jul. 1995.

Tanriverdi et al., "Interacting With Eye Movements in Virtual Environments," ACM CHI 200 Human Factors in Computing Systems Conference, Tufts University, Medford, MA, 2000, pp. 265-272, Addison-Wesley/ACM Press, 2000.

Pfeuffer et al., "Pursuit Calibration: Making Gaze Calibration Less Tedious and More Flexible," Proceedings of the 16th ACM International Conference on Modeling, Analysis & Simulation of Wireless and Mobile Systems, Oct. 8, 2013, pp. 261-270.

* cited by examiner

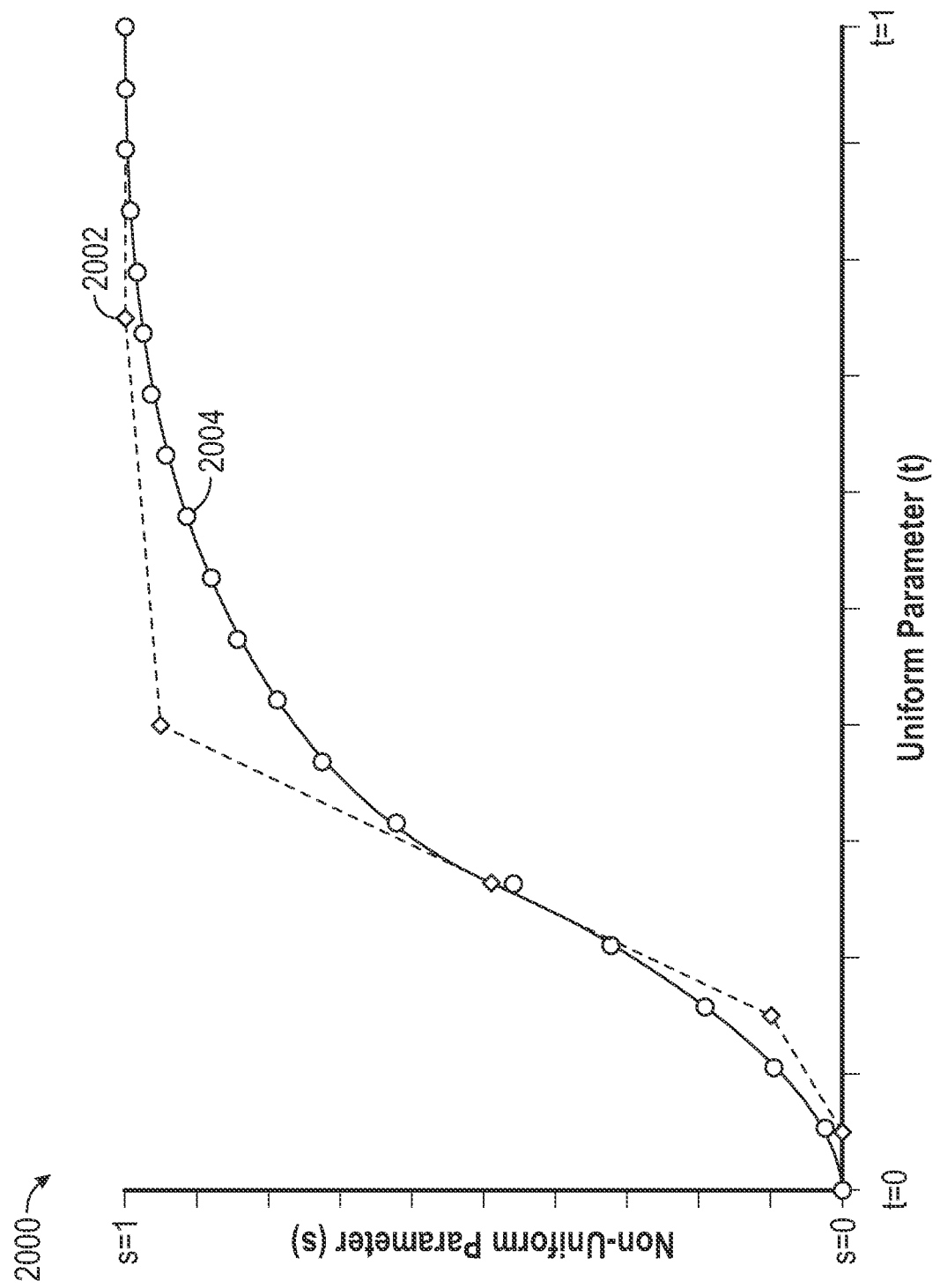

VIRTUAL OBJECT MOVEMENT SPEED CURVE FOR VIRTUAL AND AUGMENTED REALITY DISPLAY SYSTEMS

CROSS REFERENCE TO RELATED APPLICATIONS

This application claims the benefit of priority under 35 U.S.C. § 119(e) to U.S. application Ser. No. 17/174,087, filed on Feb. 11, 2021, now U.S. Pat. No. 11,726,349, which claims priority to U.S. Provisional Application No. 62/976,977, filed on Feb. 14, 2020, entitled "VIRTUAL OBJECT MOVEMENT SPEED CURVE FOR VIRTUAL AND AUGMENTED REALITY DISPLAY SYSTEMS," the contents of which are hereby incorporated by reference in their entirety.

FIELD

The present disclosure relates to virtual reality and augmented reality imaging and visualization systems and more particularly to speed curves for the movement of virtual objects.

BACKGROUND

Modern computing and display technologies have facilitated the development of systems for so called "virtual reality" or "augmented reality" experiences, in which digitally reproduced images or portions thereof are presented to a user in a manner wherein they seem to be, or may be perceived as, real. A virtual reality, or "VR", scenario typically involves the presentation of digital or virtual image information without transparency to other actual real-world visual input; an augmented reality, or "AR", scenario typically involves presentation of digital or virtual image information as an augmentation to visualization of the actual world around the user. A mixed reality, or "MR", scenario is a type of AR scenario and typically involves virtual objects that are integrated into, and responsive to, the natural world. For example, an MR scenario may include AR image content that appears to be blocked by or is otherwise perceived to interact with objects in the real world.

Referring to FIG. 1, an AR scene 10 is depicted. The user of an AR technology sees a real-world park-like setting 20 featuring people, trees, buildings in the background, and a concrete platform 30. The user also perceives that he/she "sees" "virtual content" such as a robot statue 40 standing upon the real-world platform 30, and a flying cartoon-like avatar character 50 which seems to be a personification of a bumble bee. These elements 50, 40 are "virtual" in that they do not exist in the real world. Because the human visual perception system is complex, it is challenging to produce AR technology that facilitates a comfortable, natural-feeling, rich presentation of virtual image elements amongst other virtual or real-world imagery elements.

SUMMARY

Various embodiments of techniques for moving virtual content are disclosed.

In some embodiments, a head-mounted display system is disclosed. The head-mounted display system comprising: a display configured to present virtual content to a user; a hardware processor in communication with the display, the hardware processor programmed to: cause the display system to display a virtual object at a first location; and cause the display system to move the virtual object to a second location at a variable speed based on an S-shaped speed curve.

In some embodiments, a method of moving virtual content is disclosed. The method comprising: causing to display on a display system a virtual object at a first location; and causing the display system to move the virtual object to a second location at a variable speed following an S-shaped speed curve.

In some embodiments, a wearable system for eye tracking calibration is disclosed. The system comprising: a display configured to display an eye calibration target to the user; a hardware processor in communication with the non-transitory memory and the display system, the hardware processor programmed to: cause the display to display the eye calibration target at a first target location; identify a second location different from the first target location; determine a distance between the first target location and the second target location; determine a total allocated time to move the eye calibration target from the first target location to the second target location; calculate a target movement speed curve based on the total allocated time, the target movement speed curve being an S-curve; and move the eye calibration target over the total time according to the target movement speed curve.

In some embodiments, a method for eye tracking calibration is disclosed. The method comprising: causing to display an eye calibration target at a first target location in an environment of a user; identifying a second location different from the first target location; determining a distance between the first target location and the second target location; determining a total allocated time to move the eye calibration target from the first target location to the second target location; calculating a target movement speed curve based on the total allocated time, the target movement speed curve being an S-curve; and moving the eye calibration target over the total time according to the target movement speed curve.

In some embodiments, a wearable system for eye tracking calibration is described. The system comprising: an image capture device configured to capture eye images of one or two eyes of a user of the wearable system; non-transitory memory configured to store the eye images; a display system through which the user can perceive an eye calibration target in an environment of the user; a hardware processor in communication with the non-transitory memory and the display system, the hardware processor programmed to: cause the eye calibration target to be perceivable via the display system at a first target location in the environment of the user; identify a second target location in the environment of the user different from the first target location; determine a diopter distance between the first target location and the second target location; determine a total time to move the eye calibration target from the first target location to the second target location based on the distance; interpolate a target position based at least partly on the inverse of the diopter distance; and move the eye calibration target over the total time according to the interpolated target position as a function of time.

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

BRIEF DESCRIPTION OF THE DRAWINGS

FIG. 20 illustrates an example curve associated with an interpolation that may be used to determine a position of a target at a given time.

Figure 1:
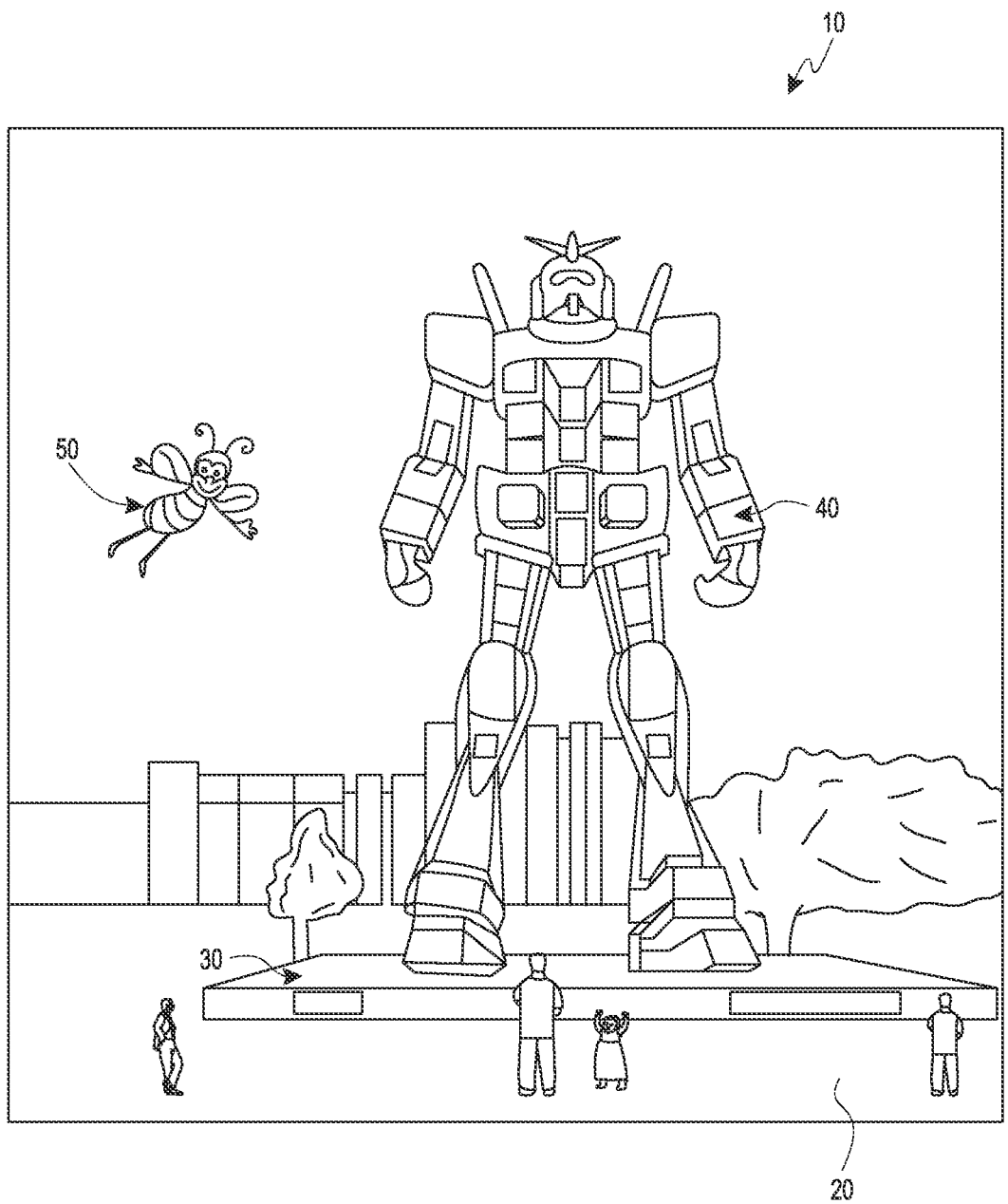
FIG. 1 illustrates a user's view of augmented reality (AR) through an AR device.

The drawings are provided to illustrate example embodiments described herein and are not intended to limit the scope of the disclosure.

DETAILED DESCRIPTION

A wearable display system, such as a head mounted display (HMD), may present virtual content (or virtual objects) in an interactive VR/AR/MR environment. The virtual content may include data elements that may be interacted with by a user through a variety of poses, such as, for example, head pose, eye gaze, or body pose. In the context of user interactions using eye gaze, the wearable display system may collect eye data such as eye images (e.g., via an eye camera in an inward-facing imaging system of the wearable display system). The wearable display system (also referred to herein simply as a wearable system) may calculate the user's eye gaze direction based on a mapping matrix that provides an association between the user's eye gaze and a gaze vector (which may indicate the user's direction of gaze). To improve user experience, the wearable display system may perform an eye-tracking calibration process which may calibrate the mapping matrix to take into account the uniqueness of each person's eyes, the particular orientation of the wearable display system in relation to the user when worn, current environmental conditions (e.g., lighting conditions, temperature, etc.), in combination or the like.

During the eye tracking calibration process, the wearable display system may present various virtual targets and direct a user to look at these virtual targets while collecting information regarding the gaze of the user's eyes. However, an eye calibration process may be uncomfortable and tiresome for the user. If a target moves at a constant speed, abruptly starting at one location and stopping at a second location in a user's environment, a user's eye may overshoot, resulting in lengthier and more uncomfortable eye calibration. The lengthier the eye calibration, the more likely a user is to get distracted, thereby providing poor results, and/or the user may stop participating in the calibration process altogether. If the user does not look at the target as directed, the wearable display system may collect data that does not accurately reflect the user's gaze direction, which may introduce inaccuracies in the calibration and cause a false mapping matrix to be generated. As a result of the inaccuracies in the calibration process, if the wearable display system were to use eye gaze as an input, for example as an interaction input, the user may not be able to target and interact with objects accurately, which may lead to a less than satisfactory user experience. Disclosed herein are systems and methods that provide for more comfortable movement of a virtual object between two locations, whether used for eye-tracking calibration or not. This virtual object movement may advantageously be utilized to improve the accuracy and comfort associated with an eye calibration process.

In some embodiments, virtual objects are moved at speeds that follow a S-curve. For example, with the X-axis representing time, and the Y-axis representing distance, a plot of the movement of the virtual object from a first position to a second position may roughly define an S-shape. From the first position, a virtual object may progressively increase its speed up to a maximum and then progressively decrease its speed until it stops at a second position. In some embodiments, the decrease in speed may be more gradual than the increase in speed. The duration and rate at which the speed decreases may be selected to, for example, prevent the eye from overshooting the second position, which may have advantages for accurate assessments of eye-tracking. In addition, in some embodiments, the time needed to move a virtual object, using an S-shaped speed curve, from the first position to the second position may be reduced relative to the time needed to perform a similar movement with the virtual object moving at a constant speed. This may also reduce the time needed to perform an eye-tracking calibration. In some embodiments, given a set amount of time to move from the first position to the second position (travel time), an S-shaped speed curve may be fitted within that duration. In some embodiments, the travel time may be determined based on characteristics of a user (e.g., an innate speed at which a user's eyes may move or change accommodation states, and/or the user's age, gender, eye health, etc.) or the magnitude of the distance between the first and second locations. It will be appreciated that, as used herein, a speed curve is the plot of time versus distance traversed by the virtual object. As discussed herein, this curve preferably is generally shaped like the letter S.

In some embodiments, the particular values of the speeds along the S-shaped speed curve may be selected based upon where, in virtual space, the first and second locations are positioned. For example, the values of the speeds may be greater for movement of a virtual object within a single depth plane (e.g., lateral movement of a virtual object) than the values of the speeds for movement of the virtual object across depth planes (e.g., movement of the virtual object from closer or farther away from the user, or vice versa). In addition, at locations closer to a user, the speed of a virtual object may be slower than the speed of the virtual object at locations farther from the user.

Advantageously, movement of virtual objects with an S-shaped speed curve may provide a more comfortable viewing experience for a user. For example, such movement may reduce or prevent the eye from overshooting the position at which the virtual object stops. In some applications, such as eye-tracking or eye-tracking calibration, the reduction in overshoot may increase the accuracy of the eye-tracking or calibration, which may improve the user experience. For example, the increased accuracy may provide a more natural and responsive viewing experience.

In addition to eye calibration, the virtual object movement methods described herein may be applicable to any movement of a virtual object within a 2D or 3D environment. For example, a display system may move a virtual game object according to the movement system and methods described herein in order to encourage a user to more easily track the virtual object. In another example, the display system may utilize the movement systems and methods to move a target for the purposes of physical therapy. In another example, the display system may utilize the movement systems and methods to move a target for the purposes of guiding a user to experience their 3D environment for the purposes of, in one example, collecting data about the user's environment. However, while certain applications are described herein, any number of applications of the target movement systems and methods are possible.

Reference will now be made to the drawings, in which like reference numerals refer to like parts throughout. Unless indicated otherwise, the drawings are schematic and not necessarily drawn to scale.

A. Example Wearable 3D Display Systems

Figure 2:
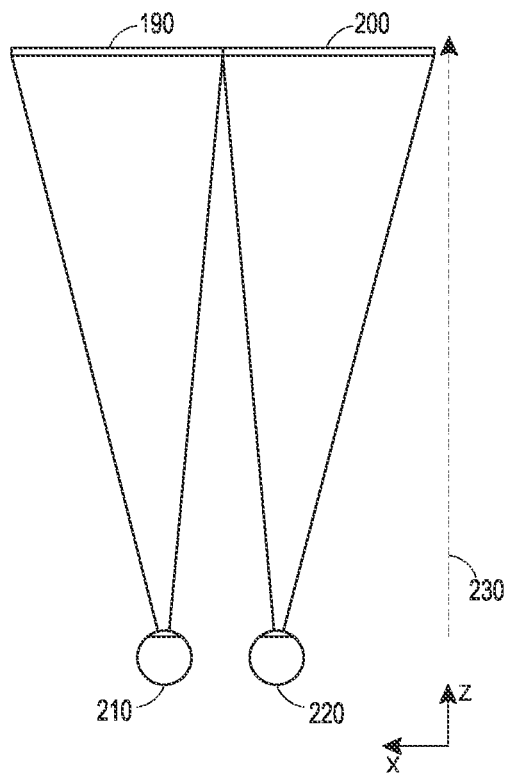
FIG. 2 illustrates a conventional display system for simulating three-dimensional imagery for a user.

FIG. 2 illustrates a conventional display system for simulating three-dimensional imagery for a user. It will be appreciated that a user's eyes are spaced apart and that, when looking at a real object in space, each eye will have a slightly different view of the object and may form an image of the object at different locations on the retina of each eye. This may be referred to as binocular disparity and may be utilized by the human visual system to provide a perception of depth. Conventional display systems simulate binocular disparity by presenting two distinct images 190, 200 with slightly different views of the same virtual object—one for each eye 210, 220—corresponding to the views of the virtual object that would be seen by each eye were the virtual object a real object at a desired depth. These images provide binocular cues that the user's visual system may interpret to derive a perception of depth.

With continued reference to FIG. 2, the images 190, 200 are spaced from the eyes 210, 220 by a distance 230 on a z-axis. The z-axis is parallel to the optical axis of the viewer with their eyes fixated on an object at optical infinity directly ahead of the viewer. The images 190, 200 are flat and at a fixed distance from the eyes 210, 220. Based on the slightly different views of a virtual object in the images presented to the eyes 210, 220, respectively, the eyes may naturally rotate such that an image of the object falls on corresponding points on the retinas of each of the eyes, to maintain single binocular vision. This rotation may cause the lines of sight of each of the eyes 210, 220 to converge onto a point in space at which the virtual object is perceived to be present. As a result, providing three-dimensional imagery conventionally involves providing binocular cues that may manipulate the vergence of the user's eyes 210, 220, and that the human visual system interprets to provide a perception of depth.

Figure 3A:
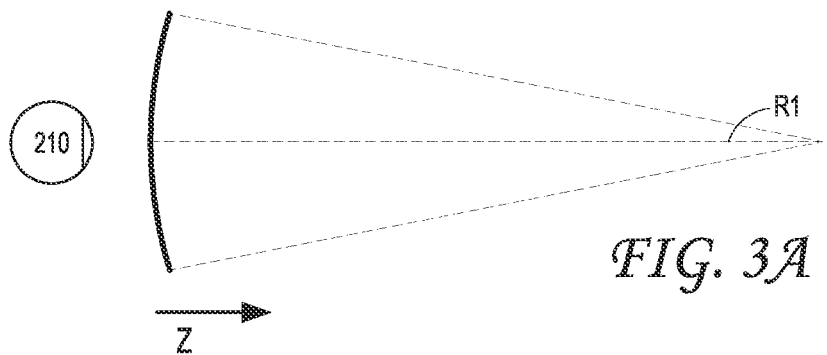
FIGS. 3A-3C illustrate relationships between radius of curvature and focal radius.
Figure 3B:
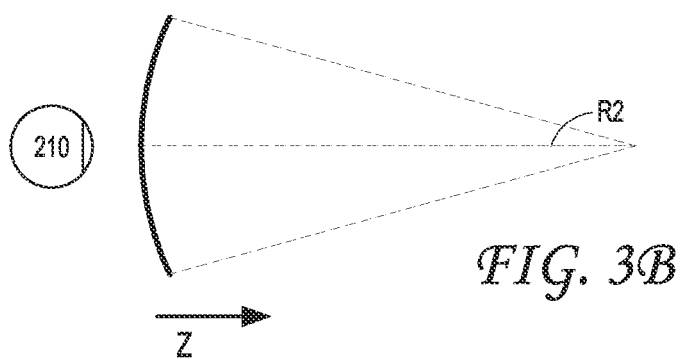
Figure 3C:
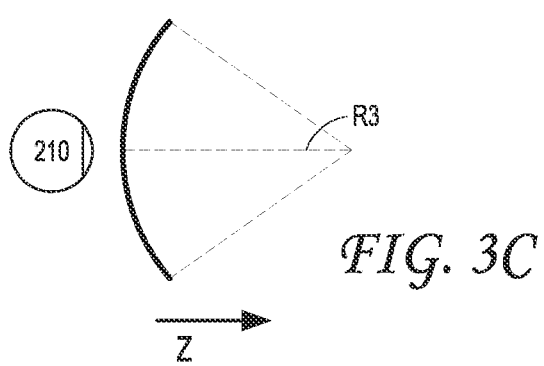

Generating a realistic and comfortable perception of depth is challenging, however. It will be appreciated that light from objects at different distances from the eyes have wavefronts with different amounts of divergence. FIGS. 3A-3C illustrate relationships between distance and the divergence of light rays. The distance between the object and the eye 210 is represented by, in order of decreasing distance, R1, R2, and R3. As shown in FIGS. 3A-3C, the light rays become more divergent as distance to the object decreases. Conversely, as distance increases, the light rays become more collimated. Stated another way, it may be said that the light field produced by a point (the object or a part of the object) has a spherical wavefront curvature, which is a function of how far away the point is from the eye of the user. The curvature increases with decreasing distance between the object and the eye 210. While only a single eye 210 is illustrated for clarity of illustration in FIGS. 3A-3C and other figures herein, the discussions regarding eye 210 may be applied to both eyes 210 and 220 of a viewer.

With continued reference to FIGS. 3A-3C, light from an object that the viewer's eyes are fixated on may have different degrees of wavefront divergence. Due to the different amounts of wavefront divergence, the light may be focused differently by the lens of the eye, which in turn may require the lens to assume different shapes to form a focused image on the retina of the eye. Where a focused image is not formed on the retina, the resulting retinal blur acts as a cue to accommodation that causes a change in the shape of the lens of the eye until a focused image is formed on the retina. For example, the cue to accommodation may trigger the ciliary muscles surrounding the lens of the eye to relax or contract, thereby modulating the force applied to the suspensory ligaments holding the lens, thus causing the shape of the lens of the eye to change until retinal blur of an object of fixation is eliminated or minimized, thereby forming a focused image of the object of fixation on the retina (e.g., fovea) of the eye. The process by which the lens of the eye changes shape may be referred to as accommodation, and the shape of the lens of the eye required to form a focused image of the object of fixation on the retina (e.g., fovea) of the eye may be referred to as an accommodative state.

Figure 4A:
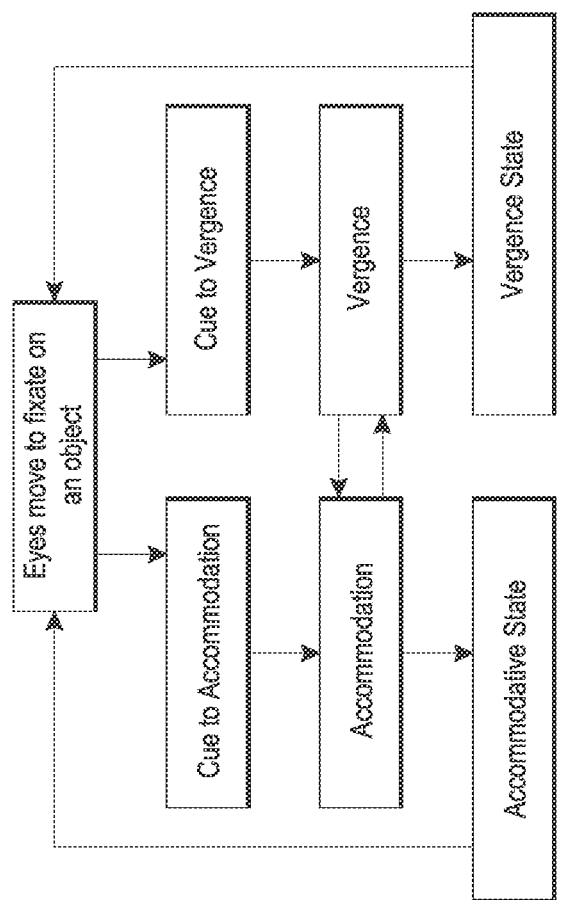
FIG. 4A illustrates a representation of the accommodation-vergence response of the human visual system.

With reference now to FIG. 4A, a representation of the accommodation-vergence response of the human visual system is illustrated. The movement of the eyes to fixate on an object causes the eyes to receive light from the object, with the light forming an image on each of the retinas of the eyes. The presence of retinal blur in the image formed on the retina may provide a cue to accommodation, and the relative locations of the image on the retinas may provide a cue to vergence. The cue to accommodation causes accommodation to occur, resulting in the lenses of the eyes each assuming a particular accommodative state that forms a focused image of the object on the retina (e.g., fovea) of the eye. On the other hand, the cue to vergence causes vergence movements (rotation of the eyes) to occur such that the images formed on each retina of each eye are at corresponding retinal points that maintain single binocular vision. In these positions, the eyes may be said to have assumed a particular vergence state. With continued reference to FIG. 4A, accommodation may be understood to be the process by which the eye achieves a particular accommodative state, and vergence may be understood to be the process by which the eye achieves a particular vergence state. As indicated in FIG. 4A, the accommodative and vergence states of the eyes may change if the user fixates on another object. For example, the accommodated state may change if the user fixates on a new object at a different depth on the z-axis.

Without being limited by theory, it is believed that viewers of an object may perceive the object as being "three-dimensional" due to a combination of vergence and accommodation. As noted above, vergence movements (e.g., rotation of the eyes so that the pupils move toward or away from each other to converge the lines of sight of the eyes to fixate upon an object) of the two eyes relative to each other are closely associated with accommodation of the lenses of the eyes. Under normal conditions, changing the shapes of the lenses of the eyes to change focus from one object to another object at a different distance will automatically cause a matching change in vergence to the same distance, under a relationship known as the "accommodation-vergence reflex." Likewise, a change in vergence will trigger a matching change in lens shape under normal conditions.

Figure 4B:
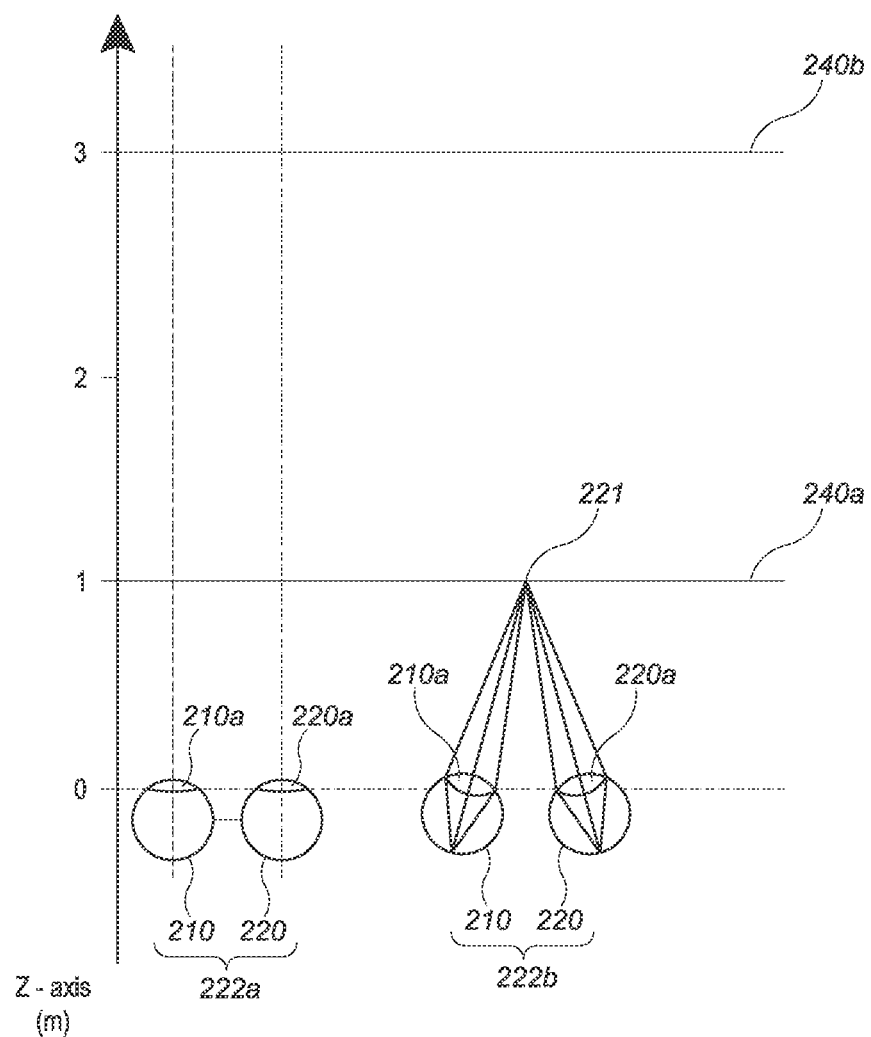
FIG. 4B illustrates examples of different accommodative states and vergence states of a pair of eyes of the user.

With reference now to FIG. 4B, examples of different accommodative and vergence states of the eyes are illustrated. The pair of eyes 222a is fixated on an object at optical infinity, while the pair eyes 222b are fixated on an object 221 at less than optical infinity. Notably, the vergence states of each pair of eyes is different, with the pair of eyes 222a directed straight ahead, while the pair of eyes 222 converge on the object 221. The accommodative states of the eyes forming each pair of eyes 222a and 222b are also different, as represented by the different shapes of the lenses 210a, 220a.

Undesirably, many users of conventional "3-D" display systems find such conventional systems to be uncomfortable or may not perceive a sense of depth at all due to a mismatch between accommodative and vergence states in these displays. As noted above, many stereoscopic or "3-D" display systems display a scene by providing slightly different images to each eye. Such systems are uncomfortable for many viewers, since they, among other things, simply provide different presentations of a scene and cause changes in the vergence states of the eyes, but without a corresponding change in the accommodative states of those eyes. Rather, the images are shown by a display at a fixed distance from the eyes, such that the eyes view all the image information at a single accommodative state. Such an arrangement works against the "accommodation-vergence reflex" by causing changes in the vergence state without a matching change in the accommodative state. This mismatch is believed to cause viewer discomfort. Display systems that provide a better match between accommodation and vergence may form more realistic and comfortable simulations of three-dimensional imagery.

Without being limited by theory, it is believed that the human eye typically may interpret a finite number of depth planes to provide depth perception. Consequently, a highly believable simulation of perceived depth may be achieved by providing, to the eye, different presentations of an image corresponding to each of these limited numbers of depth planes. In some embodiments, the different presentations may provide both cues to vergence and matching cues to accommodation, thereby providing physiologically correct accommodation-vergence matching.

With continued reference to FIG. 4B, two depth planes 240, corresponding to different distances in space from the eyes 210, 220, are illustrated. For a given depth plane 240, vergence cues may be provided by the displaying of images of appropriately different perspectives for each eye 210, 220. In addition, for a given depth plane 240, light forming the images provided to each eye 210, 220 may have a wavefront divergence corresponding to a light field produced by a point at the distance of that depth plane 240.

In the illustrated embodiment, the distance, along the z-axis, of the depth plane 240 containing the point 221 is 1 m. As used herein, distances or depths along the z-axis may be measured with a zero-point located at the exit pupils of the user's eyes. Thus, a depth plane 240 located at a depth of 1 m corresponds to a distance of 1 m away from the exit pupils of the user's eyes, on the optical axis of those eyes with the eyes directed towards optical infinity. As an approximation, the depth or distance along the z-axis may be measured from the display in front of the user's eyes (e.g., from the surface of a waveguide), plus a value for the distance between the device and the exit pupils of the user's eyes. That value may be called the eye relief and corresponds to the distance between the exit pupil of the user's eye and the display worn by the user in front of the eye. In practice, the value for the eye relief may be a normalized value used generally for all viewers. For example, the eye relief may be assumed to be 20 mm and a depth plane that is at a depth of 1 m may be at a distance of 980 mm in front of the display.

Figure 4C:
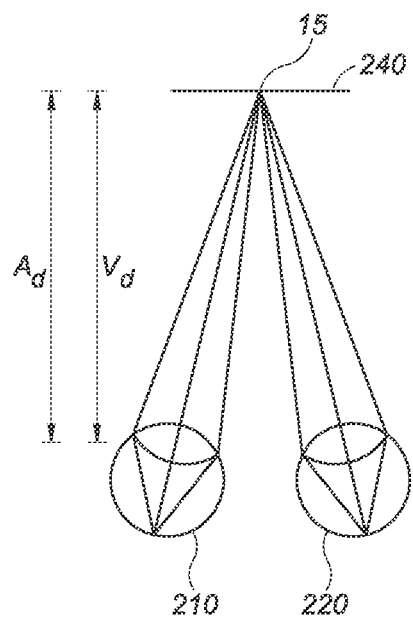
FIG. 4C illustrates an example of a representation of a top-down view of a user viewing content via a display system.
Figure 4D:
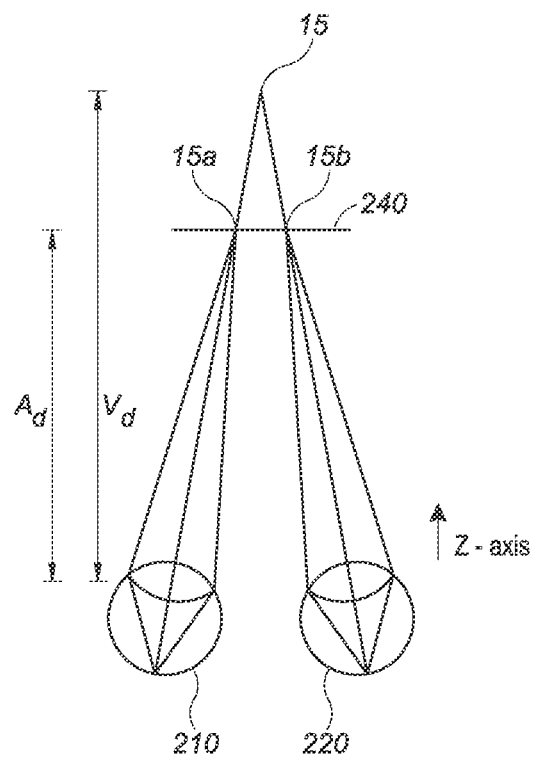
FIG. 4D illustrates another example of a representation of a top-down view of a user viewing content via a display system.

With reference now to FIGS. 4C and 4D, examples of matched accommodation-vergence distances and mismatched accommodation-vergence distances are illustrated, respectively. As illustrated in FIG. 4C, the display system may provide images of a virtual object to each eye 210, 220. The images may cause the eyes 210, 220 to assume a vergence state in which the eyes converge on a point 15 on a depth plane 240. In addition, the images may be formed by a light having a wavefront curvature corresponding to real objects at that depth plane 240. As a result, the eyes 210, 220 assume an accommodative state in which the images are in focus on the retinas of those eyes. Thus, the user may perceive the virtual object as being at the point 15 on the depth plane 240.

It will be appreciated that each of the accommodative and vergence states of the eyes 210, 220 are associated with a particular distance on the z-axis. For example, an object at a particular distance from the eyes 210, 220 causes those eyes to assume particular accommodative states based upon the distances of the object. The distance associated with a particular accommodative state may be referred to as the accommodation distance, Ad. Similarly, there are particular vergence distances, Vd, associated with the eyes in particular vergence states, or positions relative to one another. Where the accommodation distance and the vergence distance match, the relationship between accommodation and vergence may be said to be physiologically correct. This is considered to be the most comfortable scenario for a viewer.

In stereoscopic displays, however, the accommodation distance and the vergence distance may not always match. For example, as illustrated in FIG. 4D, images displayed to the eyes 210, 220 may be displayed with wavefront divergence corresponding to depth plane 240, and the eyes 210, 220 may assume a particular accommodative state in which the points 15a, 15b on that depth plane are in focus. However, the images displayed to the eyes 210, 220 may provide cues for vergence that cause the eyes 210, 220 to converge on a point 15 that is not located on the depth plane 240. As a result, the accommodation distance corresponds to the distance from the exit pupils of the eyes 210, 220 to the depth plane 240, while the vergence distance corresponds to the larger distance from the exit pupils of the eyes 210, 220 to the point 15, in some embodiments. The accommodation distance is different from the vergence distance. Consequently, there is an accommodation-vergence mismatch. Such a mismatch is considered undesirable and may cause discomfort in the user. It will be appreciated that the mismatch corresponds to distance (e.g., Vd−Ad) and may be characterized using diopters.

In some embodiments, it will be appreciated that a reference point other than exit pupils of the eyes 210, 220 may be utilized for determining distance for determining accommodation-vergence mismatch, so long as the same reference point is utilized for the accommodation distance and the vergence distance. For example, the distances could be measured from the cornea to the depth plane, from the retina to the depth plane, from the eyepiece (e.g., a waveguide of the display device) to the depth plane, and so on.

Without being limited by theory, it is believed that users may still perceive accommodation-vergence mismatches of up to about 0.25 diopter, up to about 0.33 diopter, and up to about 0.5 diopter as being physiologically correct, without the mismatch itself causing significant discomfort. In some embodiments, display systems disclosed herein (e.g., the display system 250, FIG. 6) present images to the viewer having accommodation-vergence mismatch of about 0.5 diopter or less. In some other embodiments, the accommodation-vergence mismatch of the images provided by the display system is about 0.33 diopter or less. In yet other embodiments, the accommodation-vergence mismatch of the images provided by the display system is about 0.25 diopter or less, including about 0.1 diopter or less.

Figure 5:
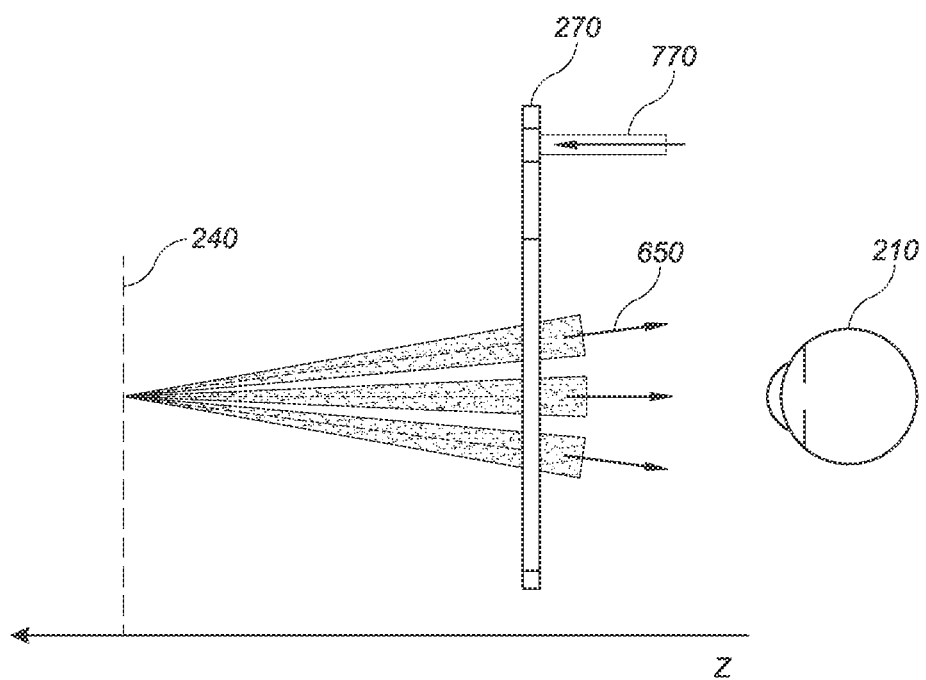
FIG. 5 illustrates aspects of an approach for simulating three-dimensional imagery by modifying wavefront divergence.

FIG. 5 illustrates aspects of an approach for simulating three-dimensional imagery by modifying wavefront divergence. The display system includes a waveguide 270 that is configured to receive light 770 that is encoded with image information, and to output that light to the user's eye 210. The waveguide 270 may output the light 650 with a defined amount of wavefront divergence corresponding to the wavefront divergence of a light field produced by a point on a desired depth plane 240. In some embodiments, the same amount of wavefront divergence is provided for all objects presented on that depth plane. In addition, it will be illustrated that the other eye of the user may be provided with image information from a similar waveguide.

In some embodiments, a single waveguide may be configured to output light with a set amount of wavefront divergence corresponding to a single or limited number of depth planes and/or the waveguide may be configured to output light of a limited range of wavelengths. Consequently, in some embodiments, a plurality or stack of waveguides may be utilized to provide different amounts of wavefront divergence for different depth planes and/or to output light of different ranges of wavelengths. As used herein, it will be appreciated at a depth plane may be planar or may follow the contours of a curved surface.

Figure 6:
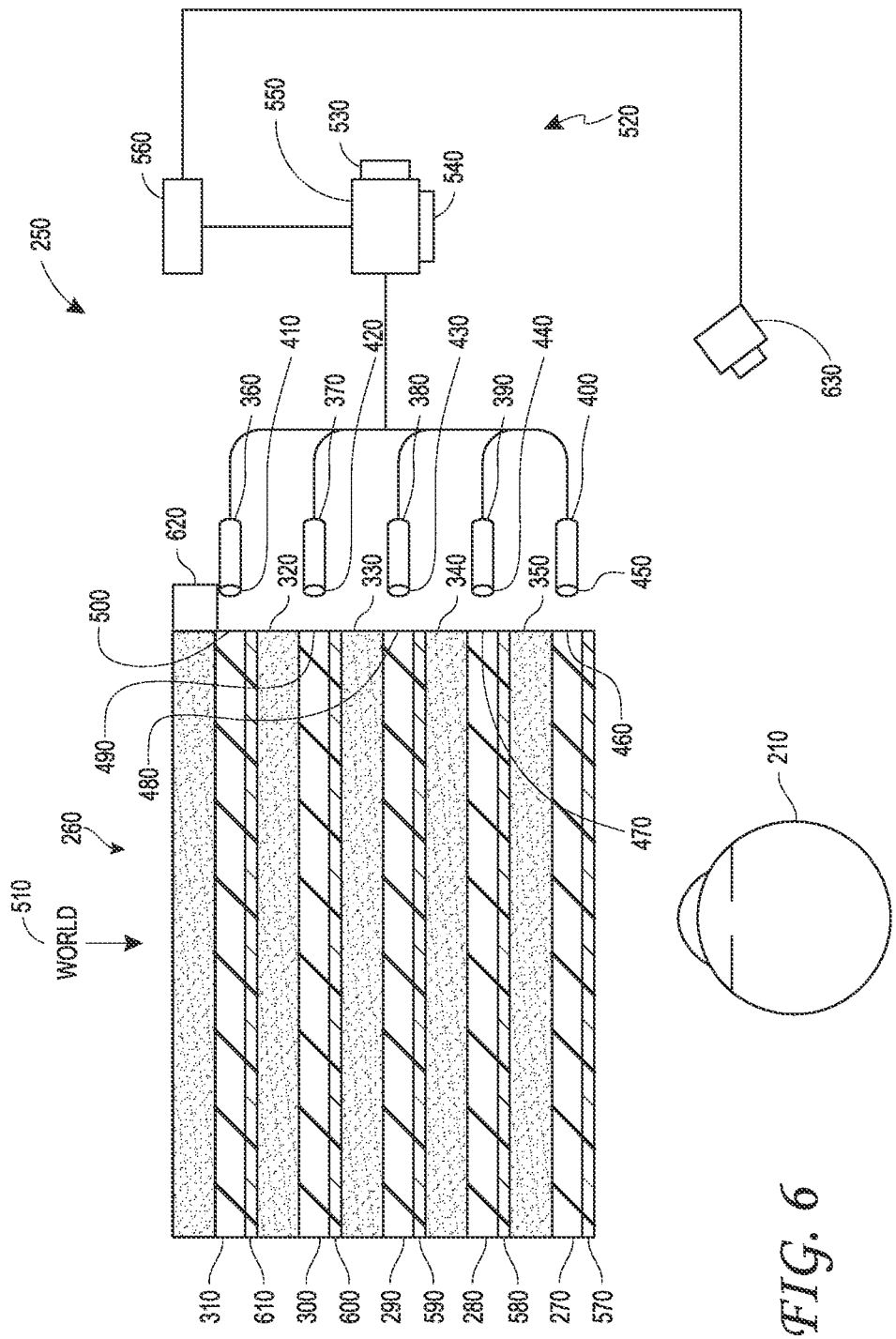
FIG. 6 illustrates an example of a waveguide stack for outputting image information to a user.

FIG. 6 illustrates an example of a waveguide stack for outputting image information to a user. A display system 250 includes a stack of waveguides, or stacked waveguide assembly, 260 that may be utilized to provide three-dimensional perception to the eye/brain using a plurality of waveguides 270, 280, 290, 300, 310. It will be appreciated that the display system 250 may be considered a light field display in some embodiments. In addition, the waveguide assembly 260 may also be referred to as an eyepiece.

In some embodiments, the display system 250 may be configured to provide substantially continuous cues to vergence and multiple discrete cues to accommodation. The cues to vergence may be provided by displaying different images to each of the eyes of the user, and the cues to accommodation may be provided by outputting the light that forms the images with selectable discrete amounts of wavefront divergence. Stated another way, the display system 250 may be configured to output light with variable levels of wavefront divergence. In some embodiments, each discrete level of wavefront divergence corresponds to a particular depth plane and may be provided by a particular one of the waveguides 270, 280, 290, 300, 310.

With continued reference to FIG. 6, the waveguide assembly 260 may also include a plurality of features 320, 330, 340, 350 between the waveguides. In some embodiments, the features 320, 330, 340, 350 may be one or more lenses. The waveguides 270, 280, 290, 300, 310 and/or the plurality of lenses 320, 330, 340, 350 may be configured to send image information to the eye with various levels of wavefront curvature or light ray divergence. Each waveguide level may be associated with a particular depth plane and may be configured to output image information corresponding to that depth plane. Image injection devices 360, 370, 380, 390, 400 may function as a source of light for the waveguides and may be utilized to inject image information into the waveguides 270, 280, 290, 300, 310, each of which may be configured, as described herein, to distribute incoming light across each respective waveguide, for output toward the eye 210. Light exits an output surface 410, 420, 430, 440, 450 of the image injection devices 360, 370, 380, 390, 400 and is injected into a corresponding input surface 460, 470, 480, 490, 500 of the waveguides 270, 280, 290, 300, 310. In some embodiments, each of the input surfaces 460, 470, 480, 490, 500 may be an edge of a corresponding waveguide, or may be part of a major surface of the corresponding waveguide (that is, one of the waveguide surfaces directly facing the world 510 or the viewer's eye 210). In some embodiments, a single beam of light (e.g. a collimated beam) may be injected into each waveguide to output an entire field of cloned collimated beams that are directed toward the eye 210 at particular angles (and amounts of divergence) corresponding to the depth plane associated with a particular waveguide. In some embodiments, a single one of the image injection devices 360, 370, 380, 390, 400 may be associated with and inject light into a plurality (e.g., three) of the waveguides 270, 280, 290, 300, 310.

In some embodiments, the image injection devices 360, 370, 380, 390, 400 are discrete displays that each produce image information for injection into a corresponding waveguide 270, 280, 290, 300, 310, respectively. In some other embodiments, the image injection devices 360, 370, 380, 390, 400 are the output ends of a single multiplexed display which may, e.g., pipe image information via one or more optical conduits (such as fiber optic cables) to each of the image injection devices 360, 370, 380, 390, 400. It will be appreciated that the image information provided by the image injection devices 360, 370, 380, 390, 400 may include light of different wavelengths, or colors (e.g., different component colors, as discussed herein).

In some embodiments, the light injected into the waveguides 270, 280, 290, 300, 310 is provided by a light projection system 520, which comprises a light module 530, which may include a light emitter, such as a light emitting diode (LED). The light from the light module 530 may be directed to and modified by a light modulator 540, e.g., a spatial light modulator, via a beam splitter 550. The light modulator 540 may be configured to change the perceived intensity of the light injected into the waveguides 270, 280, 290, 300, 310 to encode the light with image information. Examples of spatial light modulators include liquid crystal displays (LCD) including a liquid crystal on silicon (LCOS) displays. In some other embodiments, the spatial light modulator may be a MEMS device, such as a digital light processing (DLP) device. It will be appreciated that the image injection devices 360, 370, 380, 390, 400 are illustrated schematically and, in some embodiments, these image injection devices may represent different light paths and locations in a common projection system configured to output light into associated ones of the waveguides 270, 280, 290, 300, 310. In some embodiments, the waveguides of the waveguide assembly 260 may function as ideal lens while relaying light injected into the waveguides out to the user's eyes. In this conception, the object may be the spatial light modulator 540 and the image may be the image on the depth plane.

In some embodiments, the display system 250 may be a scanning fiber display comprising one or more scanning fibers configured to project light in various patterns (e.g., raster scan, spiral scan, Lissajous patterns, etc.) into one or more waveguides 270, 280, 290, 300, 310 and ultimately to the eye 210 of the viewer. In some embodiments, the illustrated image injection devices 360, 370, 380, 390, 400 may schematically represent a single scanning fiber or a bundle of scanning fibers configured to inject light into one or a plurality of the waveguides 270, 280, 290, 300, 310. In some other embodiments, the illustrated image injection devices 360, 370, 380, 390, 400 may schematically represent a plurality of scanning fibers or a plurality of bundles of scanning fibers, each of which are configured to inject light into an associated one of the waveguides 270, 280, 290, 300, 310. It will be appreciated that one or more optical fibers may be configured to transmit light from the light module 530 to the one or more waveguides 270, 280, 290, 300, 310. It will be appreciated that one or more intervening optical structures may be provided between the scanning fiber, or fibers, and the one or more waveguides 270, 280, 290, 300, 310 to, e.g., redirect light exiting the scanning fiber into the one or more waveguides 270, 280, 290, 300, 310.

A controller 560 controls the operation of one or more of the stacked waveguide assembly 260, including operation of the image injection devices 360, 370, 380, 390, 400, the light source 530, and the light modulator 540. In some embodiments, the controller 560 is part of the local data processing module 140. The controller 560 includes programming (e.g., instructions in a non-transitory medium) that regulates the timing and provision of image information to the waveguides 270, 280, 290, 300, 310 according to, e.g., any of the various schemes disclosed herein. In some embodiments, the controller may be a single integral device, or a distributed system connected by wired or wireless communication channels. The controller 560 may be part of the processing modules 140 or 150 (FIG. 9E) in some embodiments.

With continued reference to FIG. 6, the waveguides 270, 280, 290, 300, 310 may be configured to propagate light within each respective waveguide by total internal reflection (TIR). The waveguides 270, 280, 290, 300, 310 may each be planar or have another shape (e.g., curved), with major top and bottom surfaces and edges extending between those major top and bottom surfaces. In the illustrated configuration, the waveguides 270, 280, 290, 300, 310 may each include out-coupling optical elements 570, 580, 590, 600, 610 that are configured to extract light out of a waveguide by redirecting the light, propagating within each respective waveguide, out of the waveguide to output image information to the eye 210. Extracted light may also be referred to as out-coupled light and the out-coupling optical elements light may also be referred to light extracting optical elements. An extracted beam of light may be outputted by the waveguide at locations at which the light propagating in the waveguide strikes a light extracting optical element. The out-coupling optical elements 570, 580, 590, 600, 610 may, for example, be gratings, including diffractive optical features, as discussed further herein. While illustrated disposed at the bottom major surfaces of the waveguides 270, 280, 290, 300, 310, for ease of description and drawing clarity, in some embodiments, the out-coupling optical elements 570, 580, 590, 600, 610 may be disposed at the top and/or bottom major surfaces, and/or may be disposed directly in the volume of the waveguides 270, 280, 290, 300, 310, as discussed further herein. In some embodiments, the out-coupling optical elements 570, 580, 590, 600, 610 may be formed in a layer of material that is attached to a transparent substrate to form the waveguides 270, 280, 290, 300, 310. In some other embodiments, the waveguides 270, 280, 290, 300, 310 may be a monolithic piece of material and the out-coupling optical elements 570, 580, 590, 600, 610 may be formed on a surface and/or in the interior of that piece of material.

With continued reference to FIG. 6, as discussed herein, each waveguide 270, 280, 290, 300, 310 is configured to output light to form an image corresponding to a particular depth plane. For example, the waveguide 270 nearest the eye may be configured to deliver collimated light (which was injected into such waveguide 270), to the eye 210. The collimated light may be representative of the optical infinity focal plane. The next waveguide up 280 may be configured to send out collimated light which passes through the first lens 350 (e.g., a negative lens) before it may reach the eye 210; such first lens 350 may be configured to create a slight convex wavefront curvature so that the eye/brain interprets light coming from that next waveguide up 280 as coming from a first focal plane closer inward toward the eye 210 from optical infinity. Similarly, the third up waveguide 290 passes its output light through both the first 350 and second 340 lenses before reaching the eye 210; the combined optical power of the first 350 and second 340 lenses may be configured to create another incremental amount of wavefront curvature so that the eye/brain interprets light coming from the third waveguide 290 as coming from a second focal plane that is even closer inward toward the person from optical infinity than was light from the next waveguide up 280.

The other waveguide layers 300, 310 and lenses 330, 320 are similarly configured, with the highest waveguide 310 in the stack sending its output through all of the lenses between it and the eye for an aggregate focal power representative of the closest focal plane to the person. To compensate for the stack of lenses 320, 330, 340, 350 when viewing/interpreting light coming from the world 510 on the other side of the stacked waveguide assembly 260, a compensating lens layer 620 may be disposed at the top of the stack to compensate for the aggregate power of the lens stack 320, 330, 340, 350 below. Such a configuration provides as many perceived focal planes as there are available waveguide/lens pairings. Both the out-coupling optical elements of the waveguides and the focusing aspects of the lenses may be static (i.e., not dynamic or electro-active). In some alternative embodiments, either or both may be dynamic using electro-active features.

In some embodiments, two or more of the waveguides 270, 280, 290, 300, 310 may have the same associated depth plane. For example, multiple waveguides 270, 280, 290, 300, 310 may be configured to output images set to the same depth plane, or multiple subsets of the waveguides 270, 280, 290, 300, 310 may be configured to output images set to the same plurality of depth planes, with one set for each depth plane. This may provide advantages for forming a tiled image to provide an expanded field of view at those depth planes.

With continued reference to FIG. 6, the out-coupling optical elements 570, 580, 590, 600, 610 may be configured to both redirect light out of their respective waveguides and to output this light with the appropriate amount of divergence or collimation for a particular depth plane associated with the waveguide. As a result, waveguides having different associated depth planes may have different configurations of out-coupling optical elements 570, 580, 590, 600, 610, which output light with a different amount of divergence depending on the associated depth plane. In some embodiments, the light extracting optical elements 570, 580, 590, 600, 610 may be volumetric or surface features, which may be configured to output light at specific angles. For example, the light extracting optical elements 570, 580, 590, 600, 610 may be volume holograms, surface holograms, and/or diffraction gratings. In some embodiments, the features 320, 330, 340, 350 may not be lenses; rather, they may simply be spacers (e.g., cladding layers and/or structures for forming air gaps).

In some embodiments, the out-coupling optical elements 570, 580, 590, 600, 610 are diffractive features that form a diffraction pattern, or "diffractive optical element" (also referred to herein as a "DOE"). Preferably, the DOE's have a sufficiently low diffraction efficiency so that only a portion of the light of the beam is deflected away toward the eye 210 with each intersection of the DOE, while the rest continues to move through a waveguide via TIR. The light carrying the image information is thus divided into a number of related exit beams that exit the waveguide at a multiplicity of locations and the result is a fairly uniform pattern of exit emission toward the eye 210 for this particular collimated beam bouncing around within a waveguide.

In some embodiments, one or more DOEs may be switchable between "on" states in which they actively diffract, and "off" states in which they do not significantly diffract. For instance, a switchable DOE may comprise a layer of polymer dispersed liquid crystal, in which microdroplets comprise a diffraction pattern in a host medium, and the refractive index of the microdroplets may be switched to substantially match the refractive index of the host material (in which case the pattern does not appreciably diffract incident light) or the microdroplet may be switched to an index that does not match that of the host medium (in which case the pattern actively diffracts incident light).

In some embodiments, a camera assembly 630 (e.g., a digital camera, including visible light and infrared light cameras) may be provided to capture images of the eye 210 and/or tissue around the eye 210 to, e.g., detect user inputs and/or to monitor the physiological state of the user. As used herein, a camera may be any image capture device. In some embodiments, the camera assembly 630 may include an image capture device and a light source to project light (e.g., infrared light) to the eye, which may then be reflected by the eye and detected by the image capture device. In some embodiments, the camera assembly 630 may be attached to the frame or support structure 80 (FIG. 9E) and may be in electrical communication with the processing modules 140 and/or 150, which may process image information from the camera assembly 630. In some embodiments, one camera assembly 630 may be utilized for each eye, to separately monitor each eye.

The camera assembly 630 may, in some embodiments, observe movements of the user, such as the user's eye movements. As an example, the camera assembly 630 may capture images of the eye 210 to determine the size, position, and/or orientation of the pupil of the eye 210 (or some other structure of the eye 210). The camera assembly 630 may, if desired, obtain images (processed by processing circuitry of the type described herein) used to determine the direction the user is looking (e.g., eye pose or gaze direction). In some embodiments, camera assembly 630 may include multiple cameras, at least one of which may be utilized for each eye, to separately determine the eye pose or gaze direction of each eye independently. The camera assembly 630 may, in some embodiments and in combination with processing circuitry such as the controller 560 or the local data processing module 140, determine eye pose or gaze direction based on glints (e.g., reflections) of reflected light (e.g., infrared light) from a light source included in camera assembly 630.

Figure 7:
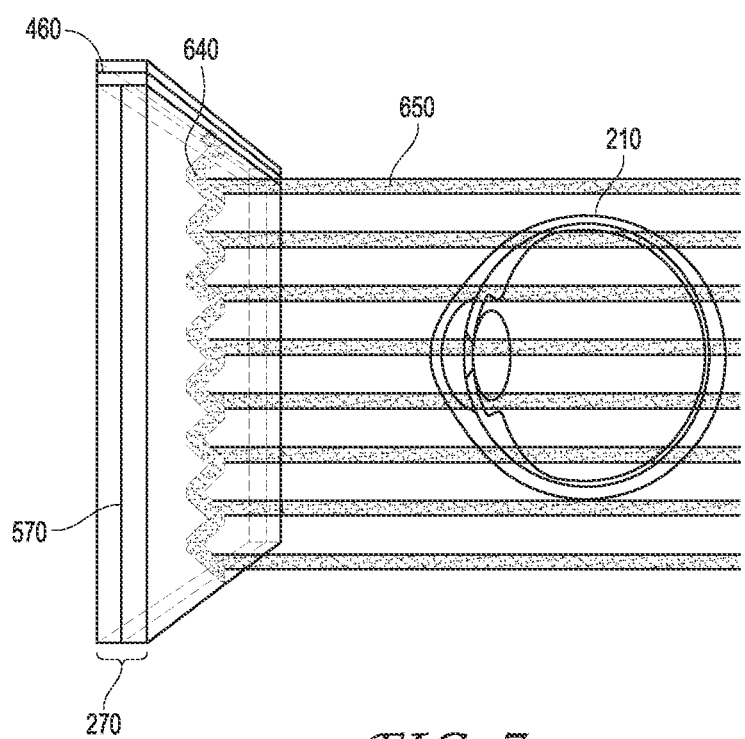
FIG. 7 illustrates an example of exit beams outputted by a waveguide.

With reference now to FIG. 7, an example of exit beams outputted by a waveguide is shown. One waveguide is illustrated, but it will be appreciated that other waveguides in the waveguide assembly 260 (FIG. 6) may function similarly, where the waveguide assembly 260 includes multiple waveguides. Light 640 is injected into the waveguide 270 at the input surface 460 of the waveguide 270 and propagates within the waveguide 270 by TIR. At points where the light 640 impinges on the DOE 570, a portion of the light exits the waveguide as exit beams 650. The exit beams 650 are illustrated as substantially parallel but, as discussed herein, they may also be redirected to propagate to the eye 210 at an angle (e.g., forming divergent exit beams), depending on the depth plane associated with the waveguide 270. It will be appreciated that substantially parallel exit beams may be indicative of a waveguide with out-coupling optical elements that out-couple light to form images that appear to be set on a depth plane at a large distance (e.g., optical infinity) from the eye 210. Other waveguides or other sets of out-coupling optical elements may output an exit beam pattern that is more divergent, which would require the eye 210 to accommodate to a closer distance to bring it into focus on the retina and would be interpreted by the brain as light from a distance closer to the eye 210 than optical infinity.

Figure 8:
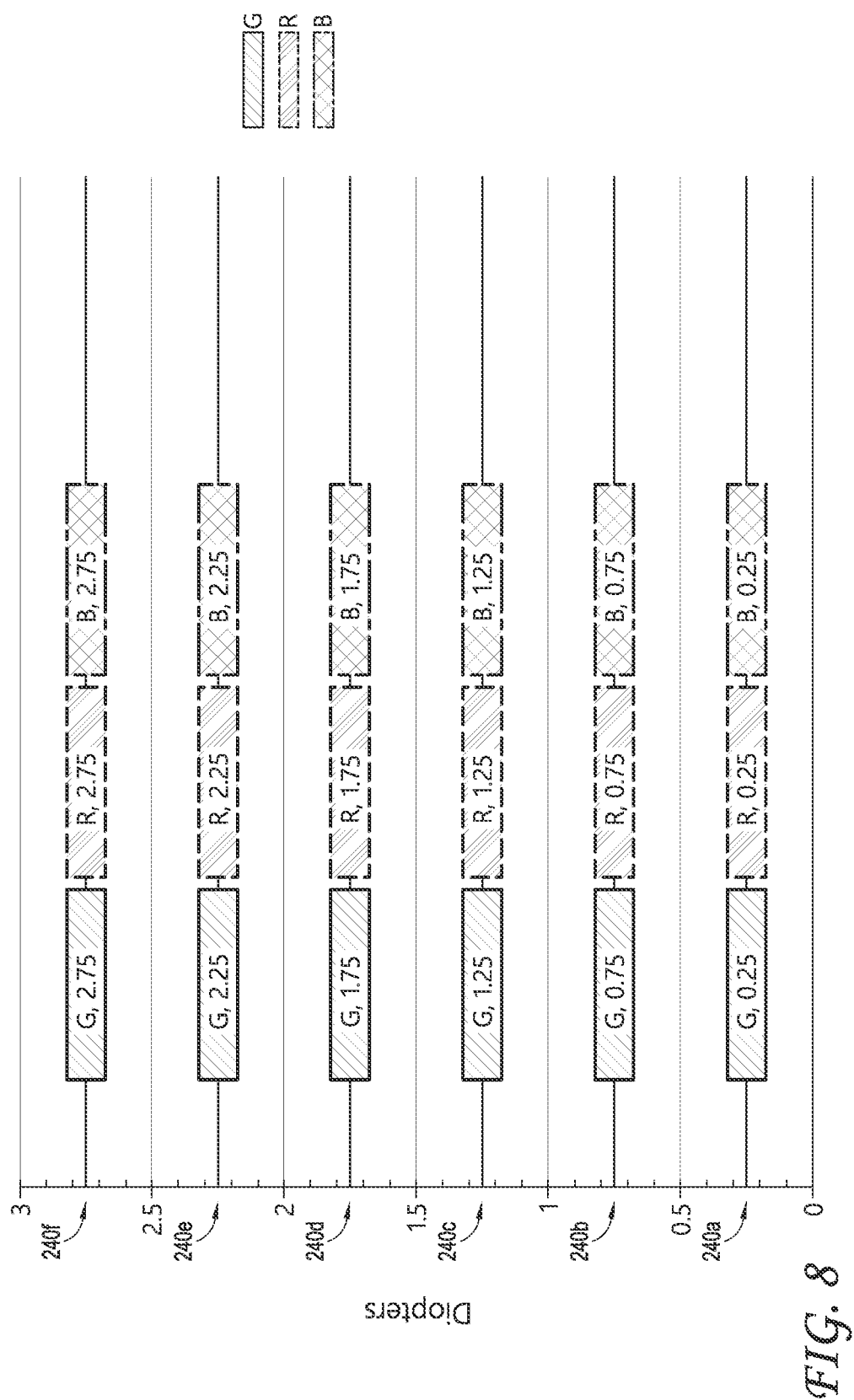
FIG. 8 illustrates an example of a stacked eyepiece in which each depth plane includes images formed using multiple different component colors.

In some embodiments, a full color image may be formed at each depth plane by overlaying images in each of the component colors, e.g., three or more component colors. FIG. 8 illustrates an example of a stacked waveguide assembly in which each depth plane includes images formed using multiple different component colors. The illustrated embodiment shows depth planes 240a-240f, although more or fewer depths are also contemplated. Each depth plane may have three or more component color images associated with it, including: a first image of a first color, G; a second image of a second color, R; and a third image of a third color, B. Different depth planes are indicated in the figure by different numbers for diopters (dpt) following the letters G, R, and B. Just as examples, the numbers following each of these letters indicate diopters (1/m), or inverse distance of the depth plane from a viewer, and each box in the figures represents an individual component color image. In some embodiments, to account for differences in the eye's focusing of light of different wavelengths, the exact placement of the depth planes for different component colors may vary. For example, different component color images for a given depth plane may be placed on depth planes corresponding to different distances from the user. Such an arrangement may increase visual acuity and user comfort and/or may decrease chromatic aberrations.

In some embodiments, light of each component color may be outputted by a single dedicated waveguide and, consequently, each depth plane may have multiple waveguides associated with it. In such embodiments, each box in the figures including the letters G, R, or B may be understood to represent an individual waveguide, and three waveguides may be provided per depth plane where three component color images are provided per depth plane. While the waveguides associated with each depth plane are shown adjacent to one another in this drawing for ease of description, it will be appreciated that, in a physical device, the waveguides may all be arranged in a stack with one waveguide per level. In some other embodiments, multiple component colors may be outputted by the same waveguide, such that, e.g., only a single waveguide may be provided per depth plane.

With continued reference to FIG. 8, in some embodiments, G is the color green, R is the color red, and B is the color blue. In some other embodiments, other colors associated with other wavelengths of light, including magenta and cyan, may be used in addition to or may replace one or more of red, green, or blue.

It will be appreciated that references to a given color of light throughout this disclosure will be understood to encompass light of one or more wavelengths within a range of wavelengths of light that are perceived by a viewer as being of that given color. For example, red light may include light of one or more wavelengths in the range of about 620-780 nm, green light may include light of one or more wavelengths in the range of about 492-577 nm, and blue light may include light of one or more wavelengths in the range of about 435-493 nm.

In some embodiments, the light source 530 (FIG. 6) may be configured to emit light of one or more wavelengths outside the visual perception range of the viewer, for example, infrared and/or ultraviolet wavelengths. In addition, the in-coupling, out-coupling, and other light redirecting structures of the waveguides of the display 250 may be configured to direct and emit this light out of the display towards the user's eye 210, e.g., for imaging and/or user stimulation applications.

Figure 9A:
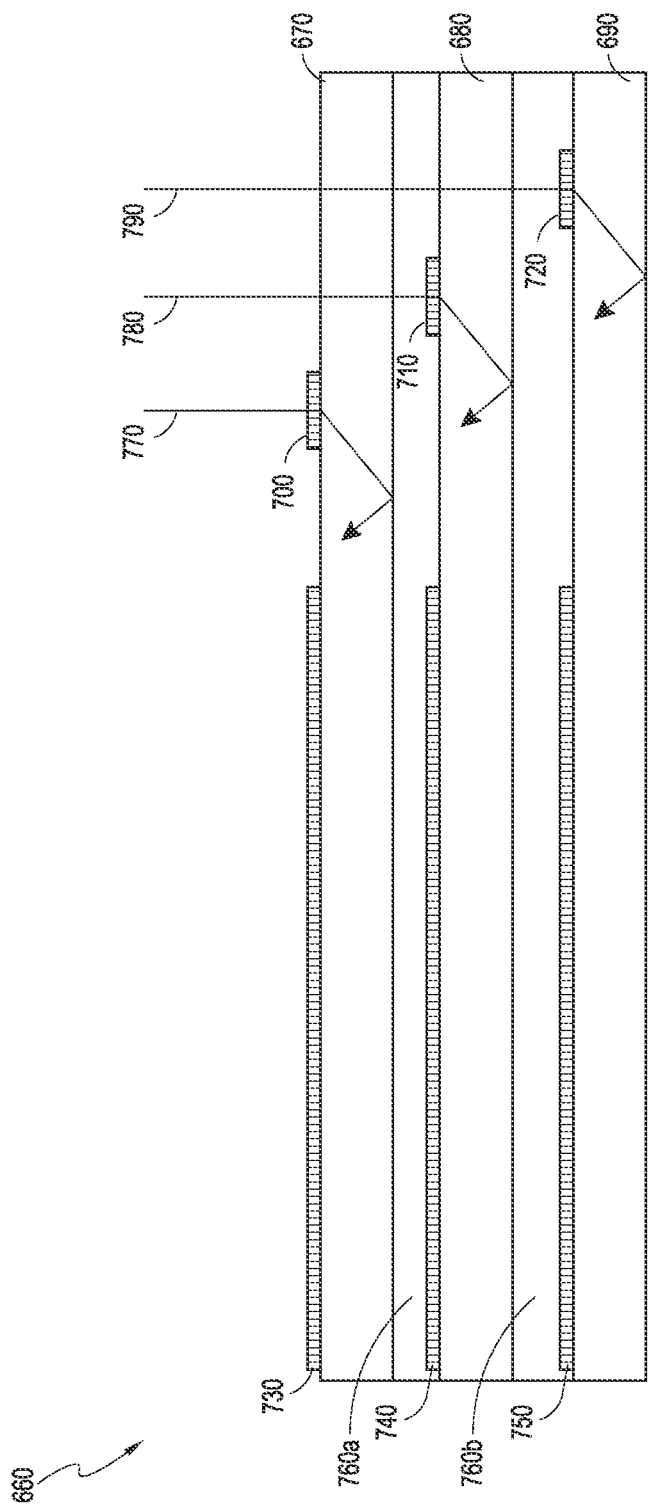
FIG. 9A illustrates a cross-sectional side view of an example of a set of stacked waveguides that each includes an in-coupling optical element.

With reference now to FIG. 9A, in some embodiments, light impinging on a waveguide may need to be redirected to in-couple that light into the waveguide. An in-coupling optical element may be used to redirect and in-couple the light into its corresponding waveguide. FIG. 9A illustrates a cross-sectional side view of an example of a plurality or set 660 of stacked waveguides that each includes an in-coupling optical element. The waveguides may each be configured to output light of one or more different wavelengths, or one or more different ranges of wavelengths. It will be appreciated that the stack 660 may correspond to the stack 260 (FIG. 6) and the illustrated waveguides of the stack 660 may correspond to part of the plurality of waveguides 270, 280, 290, 300, 310, except that light from one or more of the image injection devices 360, 370, 380, 390, 400 is injected into the waveguides from a position that requires light to be redirected for in-coupling.

The illustrated set 660 of stacked waveguides includes waveguides 670, 680, and 690. Each waveguide includes an associated in-coupling optical element (which may also be referred to as a light input area on the waveguide), with, e.g., in-coupling optical element 700 disposed on a major surface (e.g., an upper major surface) of waveguide 670, in-coupling optical element 710 disposed on a major surface (e.g., an upper major surface) of waveguide 680, and in-coupling optical element 720 disposed on a major surface (e.g., an upper major surface) of waveguide 690. In some embodiments, one or more of the in-coupling optical elements 700, 710, 720 may be disposed on the bottom major surface of the respective waveguide 670, 680, 690 (particularly where the one or more in-coupling optical elements are reflective, deflecting optical elements). As illustrated, the in-coupling optical elements 700, 710, 720 may be disposed on the upper major surface of their respective waveguide 670, 680, 690 (or the top of the next lower waveguide), particularly where those in-coupling optical elements are transmissive, deflecting optical elements. In some embodiments, the in-coupling optical elements 700, 710, 720 may be disposed in the body of the respective waveguide 670, 680, 690. In some embodiments, as discussed herein, the in-coupling optical elements 700, 710, 720 are wavelength selective, such that they selectively redirect one or more wavelengths of light, while transmitting other wavelengths of light. While illustrated on one side or corner of their respective waveguide 670, 680, 690, it will be appreciated that the in-coupling optical elements 700, 710, 720 may be disposed in other areas of their respective waveguide 670, 680, 690 in some embodiments.

As illustrated, the in-coupling optical elements 700, 710, 720 may be laterally offset from one another, as seen in the illustrated head-on view in a direction of light propagating to these in-coupling optical elements. In some embodiments, each in-coupling optical element may be offset such that it receives light without that light passing through another in-coupling optical element. For example, each in-coupling optical element 700, 710, 720 may be configured to receive light from a different image injection device 360, 370, 380, 390, and 400 as shown in FIG. 6, and may be separated (e.g., laterally spaced apart) from other in-coupling optical elements 700, 710, 720 such that it substantially does not receive light from the other ones of the in-coupling optical elements 700, 710, 720.

Each waveguide also includes associated light distributing elements, with, e.g., light distributing elements 730 disposed on a major surface (e.g., a top major surface) of waveguide 670, light distributing elements 740 disposed on a major surface (e.g., a top major surface) of waveguide 680, and light distributing elements 750 disposed on a major surface (e.g., a top major surface) of waveguide 690. In some other embodiments, the light distributing elements 730, 740, 750, may be disposed on a bottom major surface of associated waveguides 670, 680, 690, respectively. In some other embodiments, the light distributing elements 730, 740, 750, may be disposed on both top and bottom major surface of associated waveguides 670, 680, 690, respectively; or the light distributing elements 730, 740, 750, may be disposed on different ones of the top and bottom major surfaces in different associated waveguides 670, 680, 690, respectively.

The waveguides 670, 680, 690 may be spaced apart and separated by, e.g., gas, liquid, and/or solid layers of material. For example, as illustrated, layer 760a may separate waveguides 670 and 680; and layer 760b may separate waveguides 680 and 690. In some embodiments, the layers 760a and 760b are formed of low refractive index materials (that is, materials having a lower refractive index than the material forming the immediately adjacent one of waveguides 670, 680, 690). Preferably, the refractive index of the material forming the layers 760a, 760b is 0.05 or more, or 0.10 or less than the refractive index of the material forming the waveguides 670, 680, 690. Advantageously, the lower refractive index layers 760a, 760b may function as cladding layers that facilitate total internal reflection (TIR) of light through the waveguides 670, 680, 690 (e.g., TIR between the top and bottom major surfaces of each waveguide). In some embodiments, the layers 760a, 760b are formed of air. While not illustrated, it will be appreciated that the top and bottom of the illustrated set 660 of waveguides may include immediately neighboring cladding layers.

Preferably, for ease of manufacturing and other considerations, the material forming the waveguides 670, 680, 690 are similar or the same, and the material forming the layers 760a, 760b are similar or the same. In some embodiments, the material forming the waveguides 670, 680, 690 may be different between one or more waveguides, and/or the material forming the layers 760a, 760b may be different, while still holding to the various refractive index relationships noted above.

With continued reference to FIG. 9A, light rays 770, 780, 790 are incident on the set 660 of waveguides. It will be appreciated that the light rays 770, 780, 790 may be injected into the waveguides 670, 680, 690 by one or more image injection devices 360, 370, 380, 390, 400 (FIG. 6).

In some embodiments, the light rays 770, 780, 790 have different properties, e.g., different wavelengths or different ranges of wavelengths, which may correspond to different colors. The in-coupling optical elements 700, 710, 720 each deflect the incident light such that the light propagates through a respective one of the waveguides 670, 680, 690 by TIR. In some embodiments, the in-coupling optical elements 700, 710, 720 each selectively deflect one or more particular wavelengths of light, while transmitting other wavelengths to an underlying waveguide and associated in-coupling optical element.

For example, in-coupling optical element 700 may be configured to deflect ray 770, which has a first wavelength or range of wavelengths, while transmitting rays 780 and 790, which have different second and third wavelengths or ranges of wavelengths, respectively. The transmitted ray 780 impinges on and is deflected by the in-coupling optical element 710, which is configured to deflect light of a second wavelength or range of wavelengths. The ray 790 is deflected by the in-coupling optical element 720, which is configured to selectively deflect light of third wavelength or range of wavelengths.

With continued reference to FIG. 9A, the deflected light rays 770, 780, 790 are deflected so that they propagate through a corresponding waveguide 670, 680, 690; that is, the in-coupling optical elements 700, 710, 720 of each waveguide deflects light into that corresponding waveguide 670, 680, 690 to in-couple light into that corresponding waveguide. The light rays 770, 780, 790 are deflected at angles that cause the light to propagate through the respective waveguide 670, 680, 690 by TIR. The light rays 770, 780, 790 propagate through the respective waveguide 670, 680, 690 by TIR until impinging on the waveguide's corresponding light distributing elements 730, 740, 750.

Figure 9B:
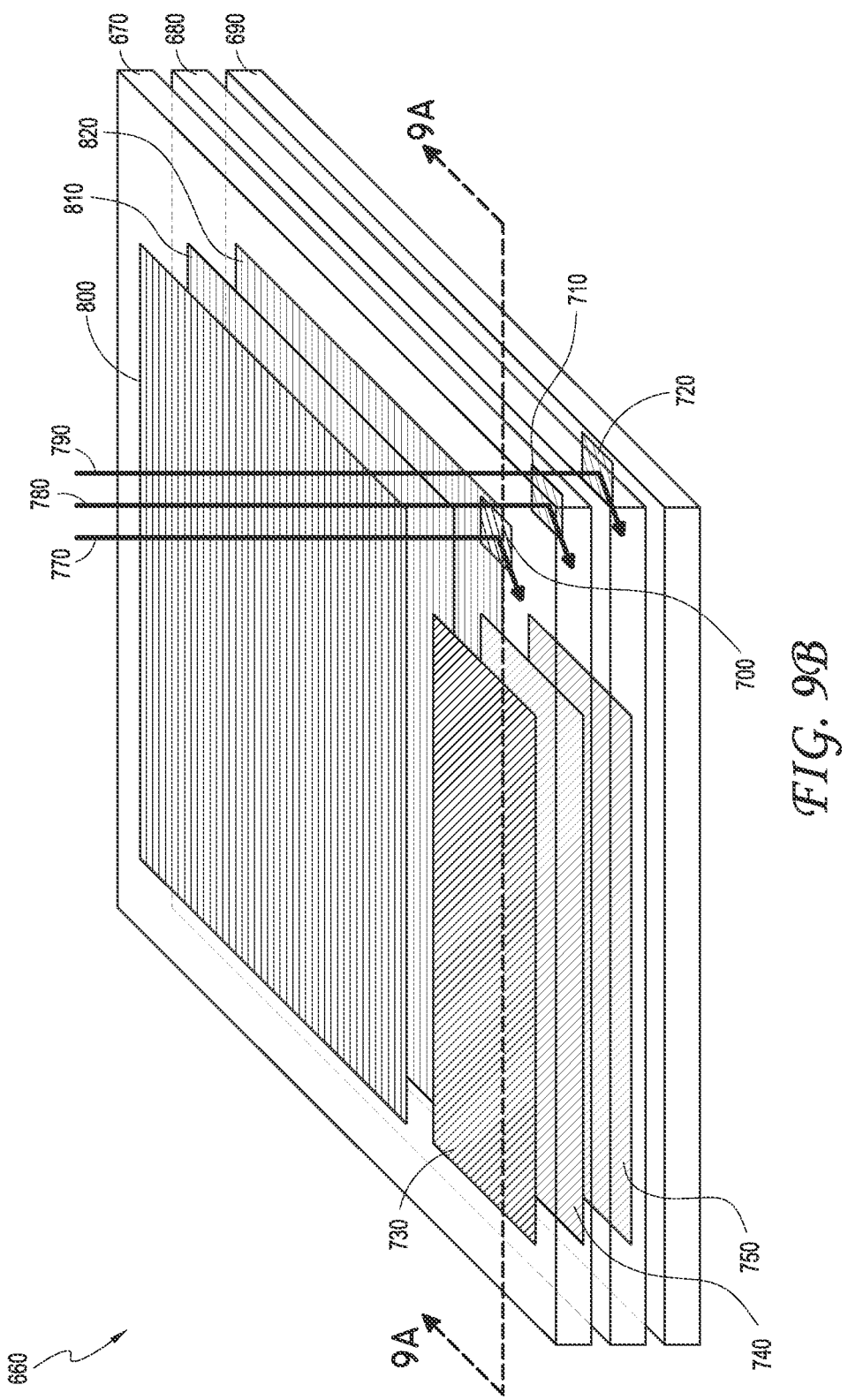
FIG. 9B illustrates a perspective view of an example of the plurality of stacked waveguides of FIG. 9A.

With reference now to FIG. 9B, a perspective view of an example of the plurality of stacked waveguides of FIG. 9A is illustrated. As noted above, the in-coupled light rays 770, 780, 790, are deflected by the in-coupling optical elements 700, 710, 720, respectively, and then propagate by TIR within the waveguides 670, 680, 690, respectively. The light rays 770, 780, 790 then impinge on the light distributing elements 730, 740, 750, respectively. The light distributing elements 730, 740, 750 deflect the light rays 770, 780, 790 so that they propagate towards the out-coupling optical elements 800, 810, 820, respectively.

In some embodiments, the light distributing elements 730, 740, 750 are orthogonal pupil expanders (OPE's). In some embodiments, the OPE's deflect or distribute light to the out-coupling optical elements 800, 810, 820 and, in some embodiments, may also increase the beam or spot size of this light as it propagates to the out-coupling optical elements. In some embodiments, the light distributing elements 730, 740, 750 may be omitted and the in-coupling optical elements 700, 710, 720 may be configured to deflect light directly to the out-coupling optical elements 800, 810, 820. For example, with reference to FIG. 9A, the light distributing elements 730, 740, 750 may be replaced with out-coupling optical elements 800, 810, 820, respectively. In some embodiments, the out-coupling optical elements 800, 810, 820 are exit pupils (EP's) or exit pupil expanders (EPE's) that direct light in a viewer's eye 210 (FIG. 7). It will be appreciated that the OPE's may be configured to increase the dimensions of the eye box in at least one axis and the EPE's may be to increase the eye box in an axis crossing, e.g., orthogonal to, the axis of the OPEs. For example, each OPE may be configured to redirect a portion of the light striking the OPE to an EPE of the same waveguide, while allowing the remaining portion of the light to continue to propagate down the waveguide. Upon impinging on the OPE again, another portion of the remaining light is redirected to the EPE, and the remaining portion of that portion continues to propagate further down the waveguide, and so on. Similarly, upon striking the EPE, a portion of the impinging light is directed out of the waveguide towards the user, and a remaining portion of that light continues to propagate through the waveguide until it strikes the EP again, at which time another portion of the impinging light is directed out of the waveguide, and so on. Consequently, a single beam of in-coupled light may be "replicated" each time a portion of that light is redirected by an OPE or EPE, thereby forming a field of cloned beams of light, as shown in FIG. 6. In some embodiments, the OPE and/or EPE may be configured to modify a size of the beams of light.

Accordingly, with reference to FIGS. 9A and 9B, in some embodiments, the set 660 of waveguides includes waveguides 670, 680, 690; in-coupling optical elements 700, 710, 720; light distributing elements (e.g., OPE's) 730, 740, 750; and out-coupling optical elements (e.g., EP's) 800, 810, 820 for each component color. The waveguides 670, 680, 690 may be stacked with an air gap/cladding layer between each one. The in-coupling optical elements 700, 710, 720 redirect or deflect incident light (with different in-coupling optical elements receiving light of different wavelengths) into its waveguide. The light then propagates at an angle which will result in TIR within the respective waveguide 670, 680, 690. In the example shown, light ray 770 (e.g., blue light) is deflected by the first in-coupling optical element 700, and then continues to bounce down the waveguide, interacting with the light distributing element (e.g., OPE's) 730 and then the out-coupling optical element (e.g., EPs) 800, in a manner described earlier. The light rays 780 and 790 (e.g., green and red light, respectively) will pass through the waveguide 670, with light ray 780 impinging on and being deflected by in-coupling optical element 710. The light ray 780 then bounces down the waveguide 680 via TIR, proceeding on to its light distributing element (e.g., OPEs) 740 and then the out-coupling optical element (e.g., EP's) 810. Finally, light ray 790 (e.g., red light) passes through the waveguide 690 to impinge on the light in-coupling optical elements 720 of the waveguide 690. The light in-coupling optical elements 720 deflect the light ray 790 such that the light ray propagates to light distributing element (e.g., OPEs) 750 by TIR, and then to the out-coupling optical element (e.g., EPs) 820 by TIR. The out-coupling optical element 820 then finally out-couples the light ray 790 to the viewer, who also receives the out-coupled light from the other waveguides 670, 680.

Figure 9C:
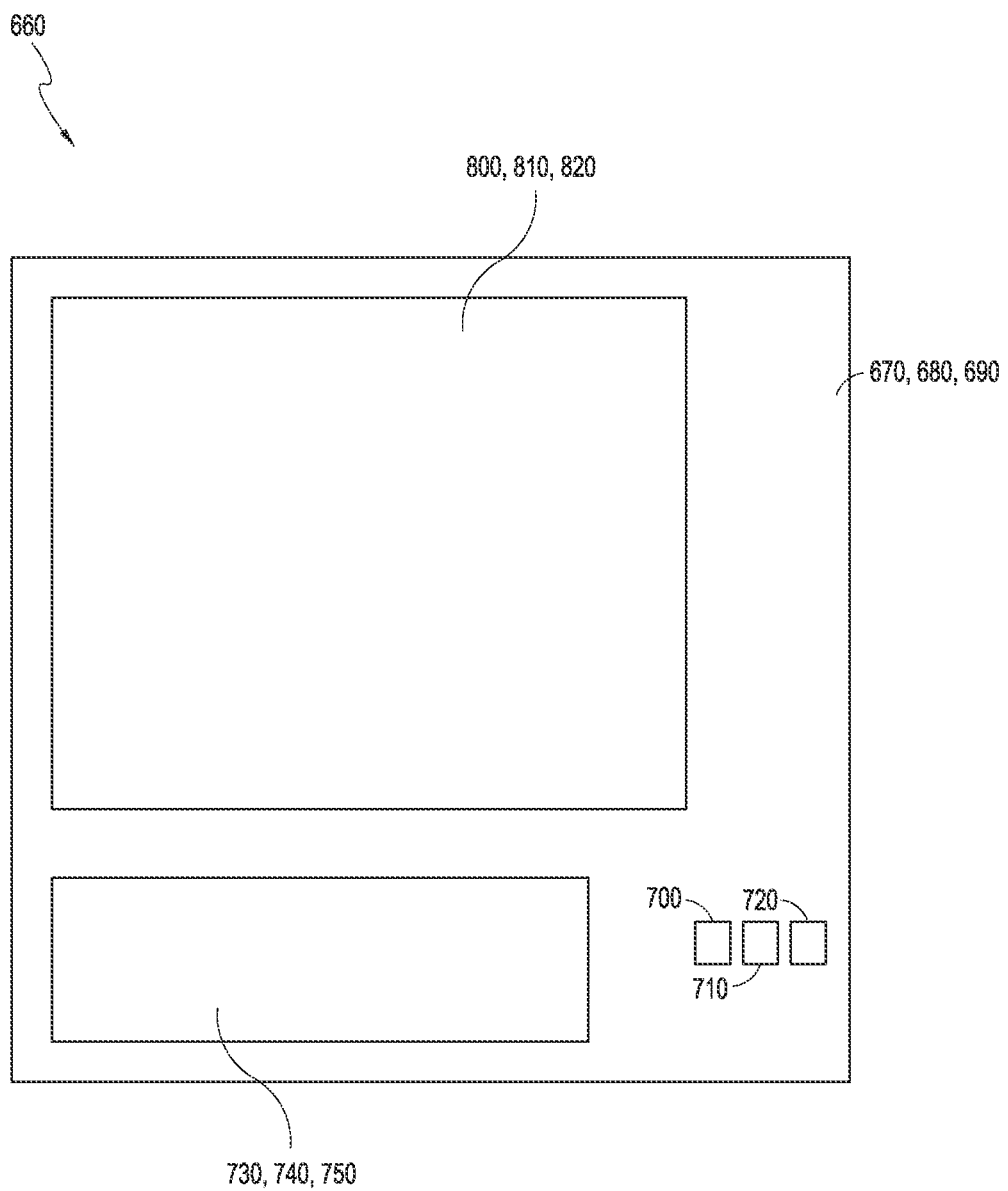
FIG. 9C illustrates a top-down plan view of an example of the plurality of stacked waveguides of FIGS. 9A and 9B.

FIG. 9C illustrates a top-down plan view of an example of the plurality of stacked waveguides of FIGS. 9A and 9B. It will be appreciated that this top-down view may also be referred to as a head-on view, as seen in the direction of propagation of light towards the in-coupling optical elements 800, 810, 820; that is, the top-down view is a view of the waveguides with image light incident normal to the page. As illustrated, the waveguides 670, 680, 690, along with each waveguide's associated light distributing element 730, 740, 750 and associated out-coupling optical element 800, 810, 820, may be vertically aligned. However, as discussed herein, the in-coupling optical elements 700, 710, 720 are not vertically aligned; rather, the in-coupling optical elements are preferably non-overlapping (e.g., laterally spaced apart as seen in the top-down view). As discussed further herein, this nonoverlapping spatial arrangement facilitates the injection of light from different sources into different waveguides on a one-to-one basis, thereby allowing a specific light source to be uniquely coupled to a specific waveguide. In some embodiments, arrangements including nonoverlapping spatially-separated in-coupling optical elements may be referred to as a shifted pupil system, and the in-coupling optical elements within these arrangements may correspond to sub-pupils.

It will be appreciated that the spatially overlapping areas may have lateral overlap of 70% or more, 80% or more, or 90% or more of their areas, as seen in the top-down view. On the other hand, the laterally shifted areas of less than 30% overlap, less than 20% overlap, or less than 10% overlap of their areas, as seen in top-down view. In some embodiments, laterally shifted areas have no overlap.

Figure 9D:
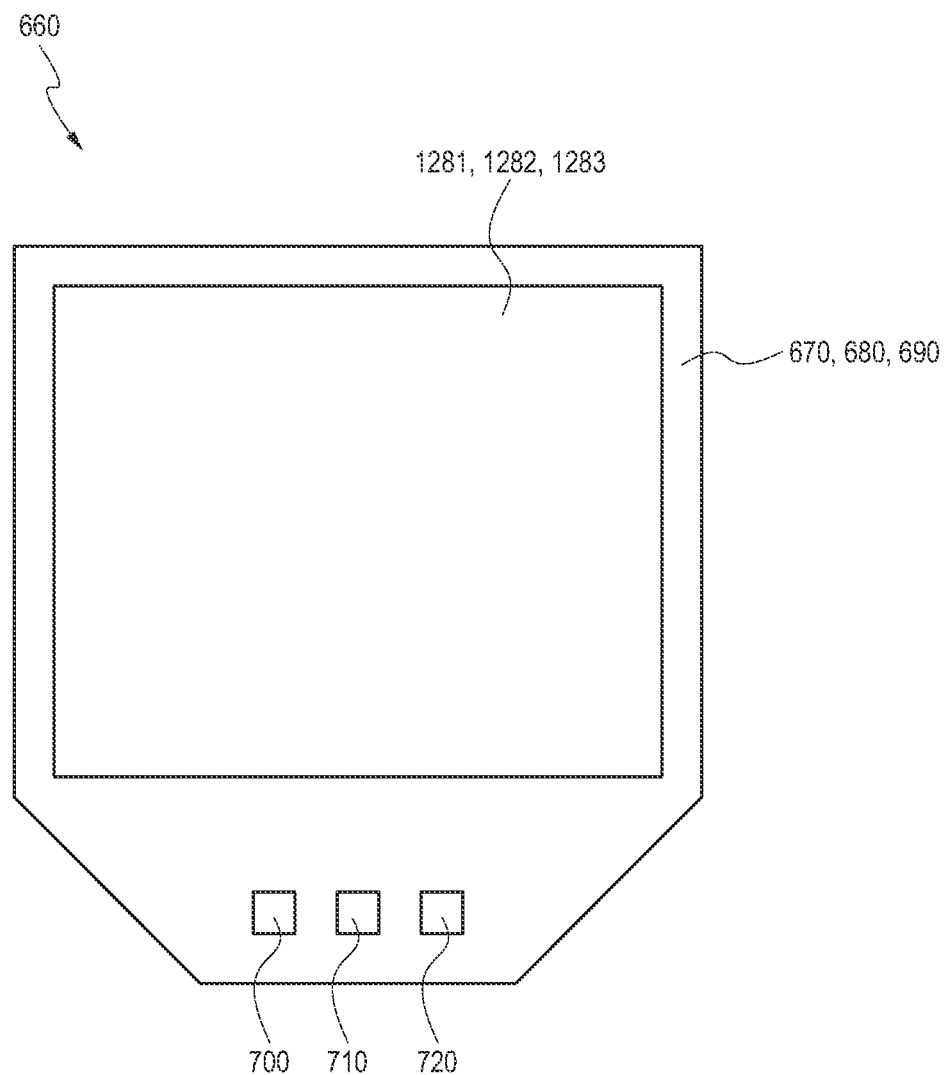
FIG. 9D illustrates a top-down plan view of another example of a plurality of stacked waveguides.

FIG. 9D illustrates a top-down plan view of another example of a plurality of stacked waveguides. As illustrated, the waveguides 670, 680, 690 may be vertically aligned. However, in comparison to the configuration of FIG. 9C, separate light distributing elements 730, 740, 750 and associated out-coupling optical elements 800, 810, 820 are omitted. Instead, light distributing elements and out-coupling optical elements are effectively superimposed and occupy the same area as seen in the top-down view. In some embodiments, light distributing elements (e.g., OPE's) may be disposed on one major surface of the waveguides 670, 680, 690 and out-coupling optical elements (e.g., EPE's) may be disposed on the other major surface of those waveguides. Thus, each waveguide 670, 680, 690 may have superimposed light distributing and out coupling optical elements, collectively referred to as combined OPE/EPE's 1281, 1282, 1283, respectively. Further details regarding such combined OPE/EPE's may be found in U.S. application Ser. No. 16/221,359, filed on Dec. 14, 2018, the entire disclosure of which is incorporated by reference herein. The in-coupling optical elements 700, 710, 720 in-couple and direct light to the combined OPE/EPE's 1281, 1282, 1283, respectively. In some embodiments, as illustrated, the in-coupling optical elements 700, 710, 720 may be laterally shifted (e.g., they are laterally spaced apart as seen in the illustrated top-down view) in have a shifted pupil spatial arrangement. As with the configuration of FIG. 9C, this laterally-shifted spatial arrangement facilitates the injection of light of different wavelengths (e.g., from different light sources) into different waveguides on a one-to-one basis.

Figure 9E:
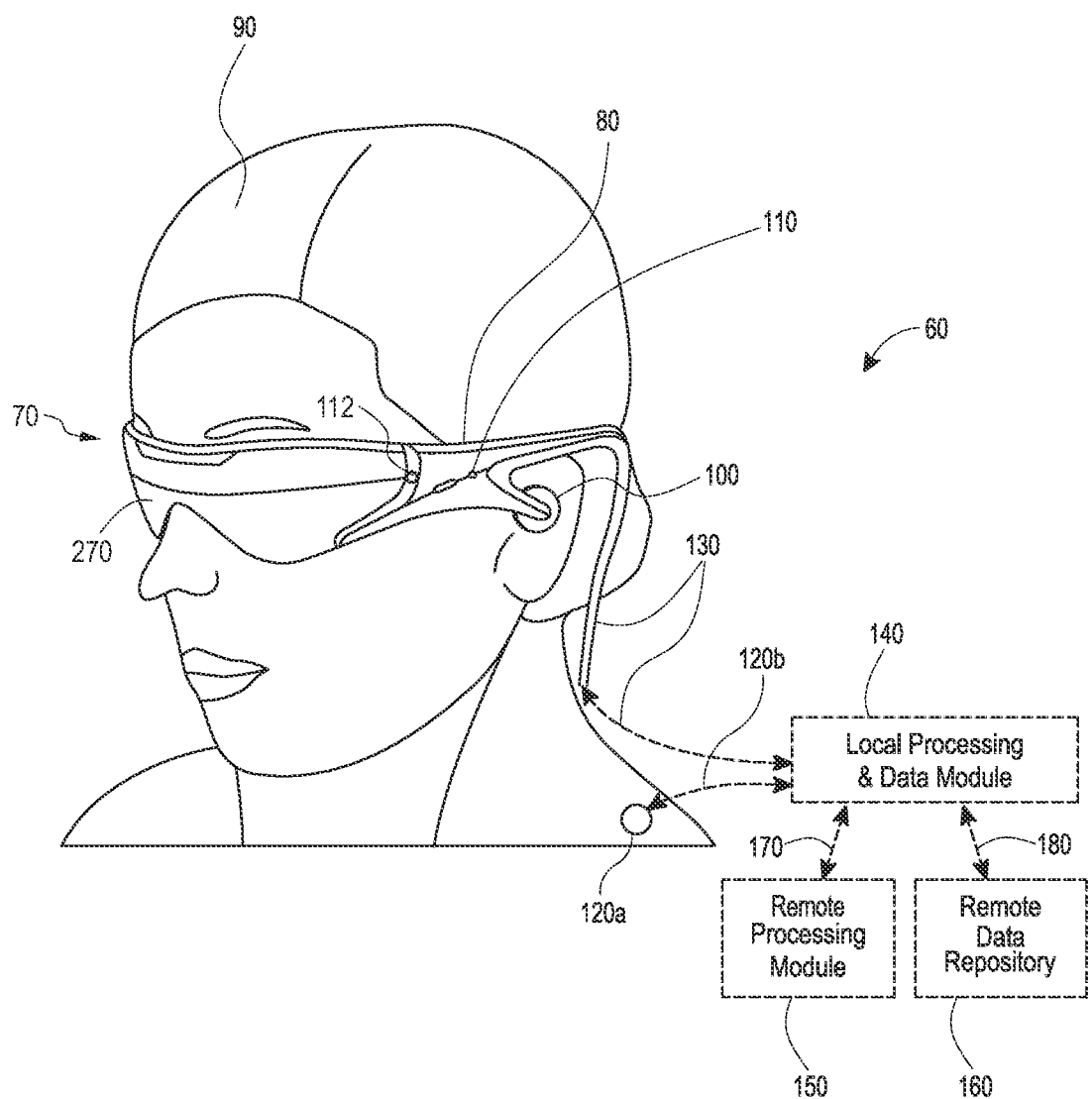
FIG. 9E illustrates an example of wearable display system.

FIG. 9E illustrates an example of wearable display system 60 into which the various waveguides and related systems disclosed herein may be integrated. In some embodiments, the display system 60 is the system 250 of FIG. 6, with FIG. 6 schematically showing some parts of that system 60 in greater detail. For example, the waveguide assembly 260 of FIG. 6 may be part of the display 70.

With continued reference to FIG. 9E, the display system 60 includes a display 70, and various mechanical and electronic modules and systems to support the functioning of that display 70. The display 70 may be coupled to a frame 80, which is wearable by a display system user or viewer 90 and which is configured to position the display 70 in front of the eyes of the user 90. The display 70 may be considered eyewear in some embodiments. The display 70 may include one or more waveguides, such as the waveguide 270, configured to relay in-coupled image light and to output that image light to an eye of the user 90. In some embodiments, a speaker 100 is coupled to the frame 80 and configured to be positioned adjacent the ear canal of the user 90 (in some embodiments, another speaker, not shown, may optionally be positioned adjacent the other ear canal of the user to provide stereo/shapeable sound control). The display system 60 may also include one or more microphones 110 or other devices to detect sound. In some embodiments, the microphone is configured to allow the user to provide inputs or commands to the system 60 (e.g., the selection of voice menu commands, natural language questions, etc.), and/or may allow audio communication with other persons (e.g., with other users of similar display systems. The microphone may further be configured as a peripheral sensor to collect audio data (e.g., sounds from the user and/or environment). In some embodiments, the display system 60 may further include one or more outwardly-directed environmental sensors 112 configured to detect objects, stimuli, people, animals, locations, or other aspects of the world around the user. For example, environmental sensors 112 may include one or more cameras, which may be located, for example, facing outward so as to capture images similar to at least a portion of an ordinary field of view of the user 90. In some embodiments, the display system may also include a peripheral sensor 120a, which may be separate from the frame 80 and attached to the body of the user 90 (e.g., on the head, torso, an extremity, etc. of the user 90). The peripheral sensor 120a may be configured to acquire data characterizing a physiological state of the user 90 in some embodiments. For example, the sensor 120a may be an electrode.

With continued reference to FIG. 9E, the display 70 is operatively coupled by communications link 130, such as by a wired lead or wireless connectivity, to a local data processing module 140 which may be mounted in a variety of configurations, such as fixedly attached to the frame 80, fixedly attached to a helmet or hat worn by the user, embedded in headphones, or otherwise removably attached to the user 90 (e.g., in a backpack-style configuration, in a belt-coupling style configuration). Similarly, the sensor 120a may be operatively coupled by communications link 120b, e.g., a wired lead or wireless connectivity, to the local processor and data module 140. The local processing and data module 140 may comprise a hardware processor, as well as digital memory, such as non-volatile memory (e.g., flash memory or hard disk drives), both of which may be utilized to assist in the processing, caching, and storage of data. Optionally, the local processor and data module 140 may include one or more central processing units (CPUs), graphics processing units (GPUs), dedicated processing hardware, and so on. The data may include data a) captured from sensors (which may be, e.g., operatively coupled to the frame 80 or otherwise attached to the user 90), such as image capture devices (such as cameras), microphones, inertial measurement units, accelerometers, compasses, GPS units, radio devices, gyros, and/or other sensors disclosed herein; and/or b) acquired and/or processed using remote processing module 150 and/or remote data repository 160 (including data relating to virtual content), possibly for passage to the display 70 after such processing or retrieval. The local processing and data module 140 may be operatively coupled by communication links 170, 180, such as via a wired or wireless communication links, to the remote processing module 150 and remote data repository 160 such that these remote modules 150, 160 are operatively coupled to each other and available as resources to the local processing and data module 140. In some embodiments, the local processing and data module 140 may include one or more of the image capture devices, microphones, inertial measurement units, accelerometers, compasses, GPS units, radio devices, and/or gyros. In some other embodiments, one or more of these sensors may be attached to the frame 80, or may be standalone structures that communicate with the local processing and data module 140 by wired or wireless communication pathways.

With continued reference to FIG. 9E, in some embodiments, the remote processing module 150 may comprise one or more processors configured to analyze and process data and/or image information, for instance including one or more central processing units (CPUs), graphics processing units (GPUs), dedicated processing hardware, and so on. In some embodiments, the remote data repository 160 may comprise a digital data storage facility, which may be available through the internet or other networking configuration in a "cloud" resource configuration. In some embodiments, the remote data repository 160 may include one or more remote servers, which provide information, e.g., information for generating virtual content, to the local processing and data module 140 and/or the remote processing module 150. In some embodiments, all data is stored and all computations are performed in the local processing and data module, allowing fully autonomous use from a remote module. Optionally, an outside system (e.g., a system of one or more processors, one or more computers) that includes CPUs, GPUs, and so on, may perform at least a portion of processing (e.g., generating image information, processing data) and provide information to, and receive information from, modules 140, 150, 160, for instance via wireless or wired connections.

B. Example Operation and Interfaces of Wearable Display Systems

A wearable system may employ various mapping-related techniques to provide content for rendered light fields. In mapping out the virtual world, it is advantageous to know reference features and points in the real world to accurately portray virtual objects in relation to the real world. To this end, FOV images captured from users of the wearable system may be added to a world model by including new pictures that convey information about various points and features of the real world. For example, the wearable system may collect a set of map points (such as 2D points or 3D points) and find new map points to render a more accurate version of the world model. The world model of a first user may be communicated (e.g., over a network such as a cloud network) to a second user so that the second user may experience the world surrounding the first user.

Figure 10:
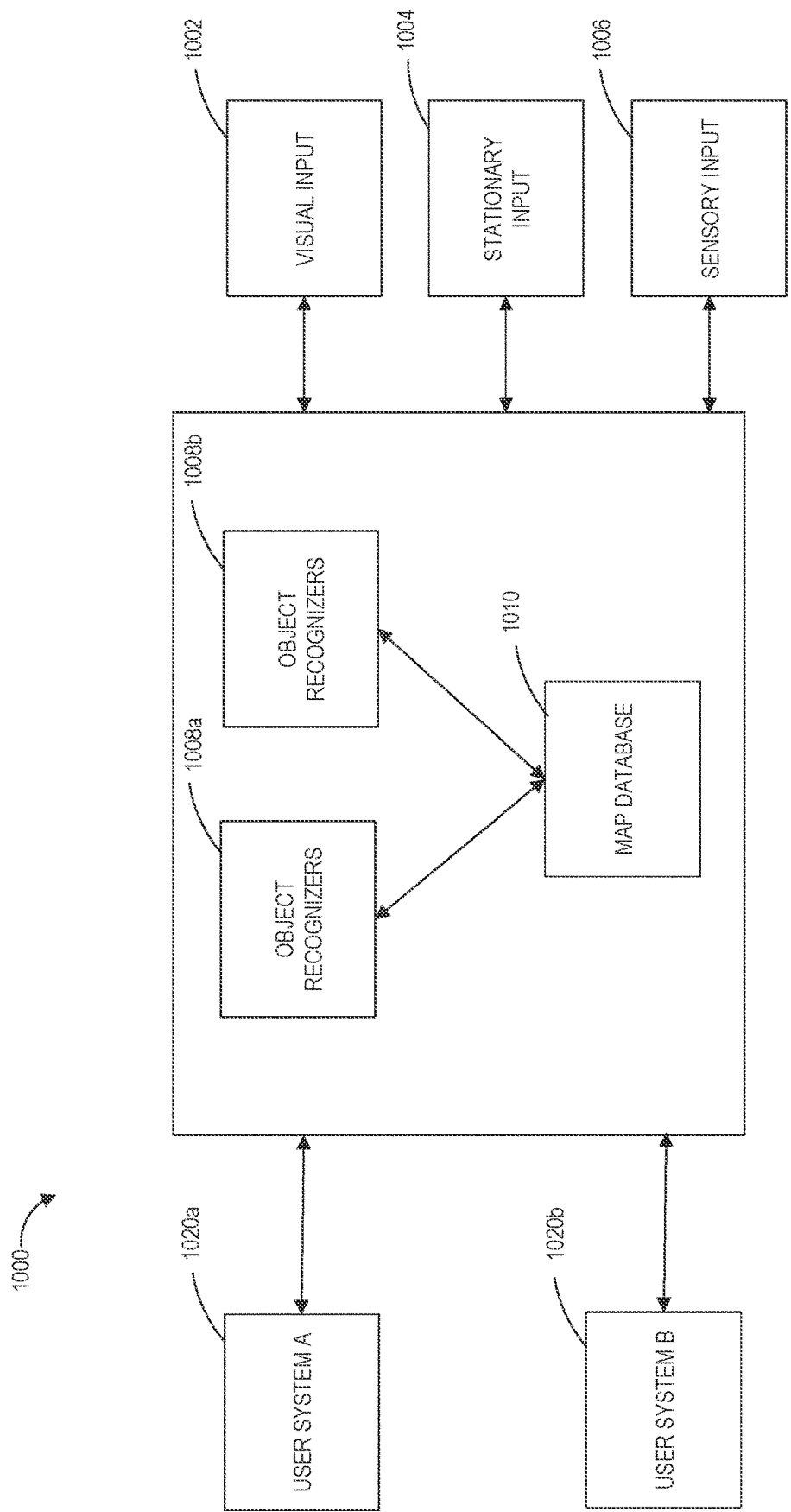
FIG. 10 is a block diagram of an example of a mixed reality system, showing features for the operation of a wearable display system.

FIG. 10 is a block diagram of an example of an MR system 1000, including various features involved in the operation of a wearable display system. The MR system 1000 may be configured to receive input (e.g., visual input 1002 from one or more wearable systems 1020, stationary input 1004 such as room cameras, sensory input 1006 from various sensors, gestures, totems, eye tracking, user input from the user input device 466 etc.) from one or more user wearable systems (e.g., wearable system 60 or display system 220) or stationary room systems (e.g., room cameras, etc.). The wearable systems may use various sensors (e.g., accelerometers, gyroscopes, temperature sensors, movement sensors, depth sensors, GPS sensors, inward-facing imaging system, outward-facing imaging system, etc.) to determine the location and various other attributes of the environment of the user. This information may further be supplemented with information from stationary cameras in the room that may provide images or various cues from a different point of view. The image data acquired by the cameras (such as the room cameras and/or the cameras of the outward-facing imaging system) may be reduced to a set of mapping points.

One or more object recognizers 1008 may crawl through the received data (e.g., the collection of points) and recognize or map points, tag images, attach semantic information to objects with the help of a map database 1010. The map database 1010 may comprise various points collected over time and their corresponding objects. The various devices and the map database may be connected to each other through a network (e.g., LAN, WAN, etc.), e.g. as interconnected remote databases stored in the "cloud".

Based on this information and collection of points in the map database, the object recognizers 1008a to 1008n may recognize objects in an environment. For example, the object recognizers may recognize faces, persons, windows, walls, user input devices, televisions, other objects in the user's environment, etc. One or more object recognizers may be specialized for object with certain characteristics. For example, the object recognizer 1008a may be used to recognizer faces, while another object recognizer may be used recognize totems.

The object recognitions may be performed using a variety of computer vision techniques. For example, the wearable system may analyze the images acquired by the outward-facing imaging system 112 (shown in FIG. 9E) to perform scene reconstruction, event detection, video tracking, object recognition, object pose estimation, learning, indexing, motion estimation, or image restoration, etc. One or more computer vision algorithms may be used to perform these tasks. Non-limiting examples of computer vision algorithms include: Scale-invariant feature transform (SIFT), speeded up robust features (SURF), oriented FAST and rotated BRIEF (ORB), binary robust invariant scalable keypoints (BRISK), fast retina keypoint (FREAK), Viola-Jones algorithm, Eigenfaces approach, Lucas-Kanade algorithm, Horn-Schunk algorithm, Mean-shift algorithm, visual simultaneous location and mapping (vSLAM) techniques, a sequential Bayesian estimator (e.g., Kalman filter, extended Kalman filter, etc.), bundle adjustment, Adaptive thresholding (and other thresholding techniques), Iterative Closest Point (ICP), Semi Global Matching (SGM), Semi Global Block Matching (SGBM), Feature Point Histograms, various machine learning algorithms (such as e.g., support vector machine, k-nearest neighbors algorithm, Naive Bayes, neural network (including convolutional or deep neural networks), or other supervised/unsupervised models, etc.), and so forth.

The object recognitions may additionally or alternatively be performed by a variety of machine learning algorithms. Once trained, the machine learning algorithm may be stored on the wearable display system, in some embodiments. Some examples of machine learning algorithms may include supervised or non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, a-priori algorithms), artificial neural network algorithms (such as, for example, Perceptron), deep learning algorithms (such as, for example, Deep Boltzmann Machine, or deep neural network), dimensionality reduction algorithms (such as, for example, Principal Component Analysis), ensemble algorithms (such as, for example, Stacked Generalization), and/or other machine learning algorithms. In some embodiments, individual models may be customized for individual data sets. For example, the wearable display system may generate or store a base model. The base model may be used as a starting point to generate additional models specific to a data type (e.g., a particular user in the telepresence session), a data set (e.g., a set of additional images obtained of the user in the telepresence session), conditional situations, or other variations. In some embodiments, the wearable HMD may be configured to utilize a plurality of techniques to generate models for analysis of the aggregated data. Other techniques may include using pre-defined thresholds or data values.

Based on this information and collection of points in the map database, the object recognizers 1008a to 1008n may recognize objects and supplement objects with semantic information to give life to the objects. For example, if the object recognizer recognizes a set of points to be a door, the system may attach some semantic information (e.g., the door has a hinge and has a 90 degree movement about the hinge). If the object recognizer recognizes a set of points to be a mirror, the system may attach semantic information that the mirror has a reflective surface that may reflect images of objects in the room. Over time the map database grows as the system (which may reside locally or may be accessible through a wireless network) accumulates more data from the world. Once the objects are recognized, the information may be transmitted to one or more wearable systems. For example, the MR system 1000 may include information about a scene happening in California. The system 1000 may be transmitted to one or more users in New York. Based on data received from an FOV camera and other inputs, the object recognizers and other software components may map the points collected from the various images, recognize objects etc., such that the scene may be accurately "passed over" to a second user, who may be in a different part of the world. The environment 1000 may also use a topological map for localization purposes.

Figure 11A:
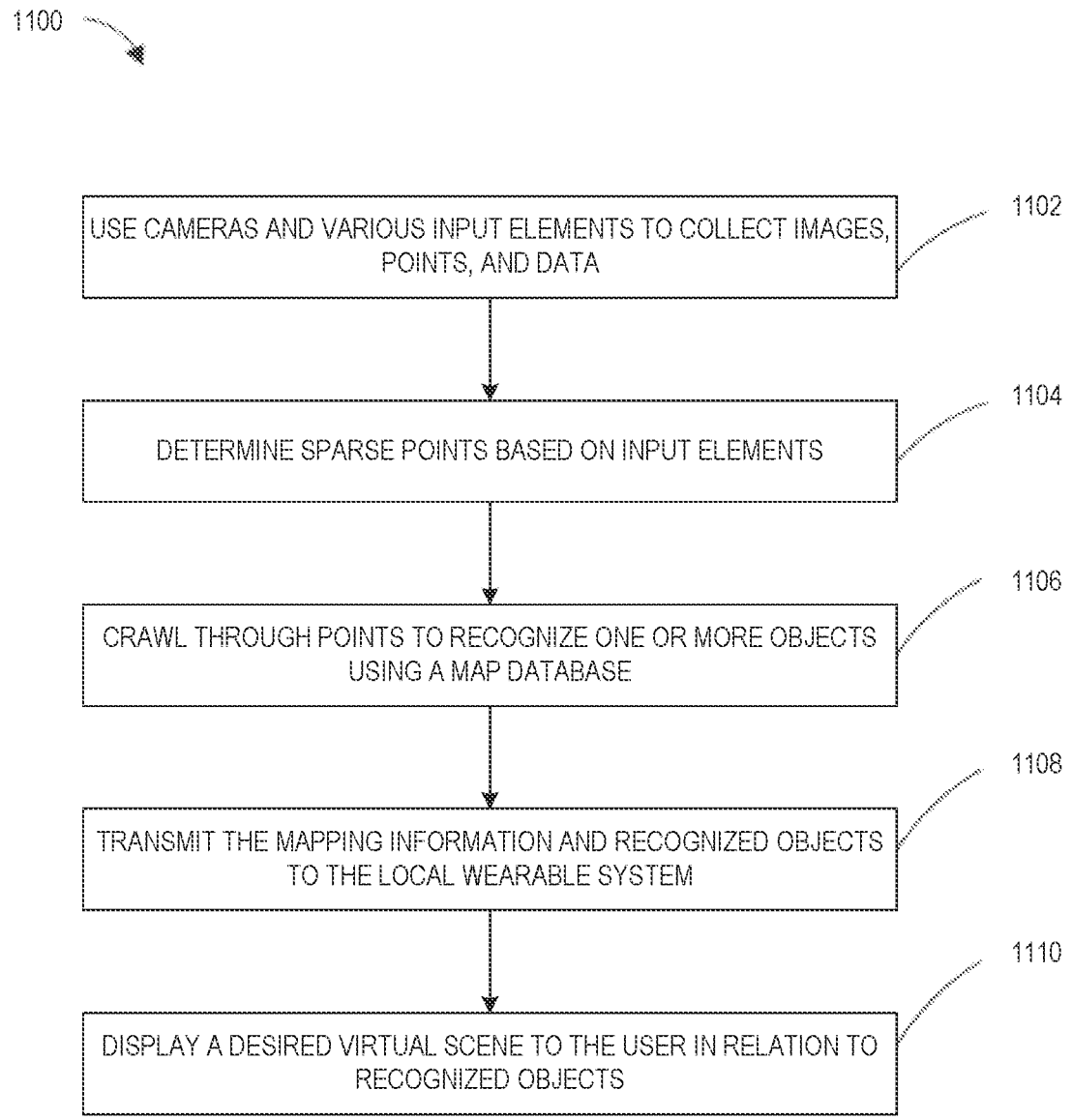
FIG. 11A is a process flow diagram of an example of a method of rendering virtual content in relation to recognized objects.

FIG. 11A is a process flow diagram of an example of a method 800 of rendering virtual content in relation to recognized objects. The method 800 describes how a virtual scene may be represented to a user of the wearable system. The user may be geographically remote from the scene. For example, the user may be New York, but may want to view a scene that is presently going on in California, or may want to go on a walk with a friend who resides in California.

At block 1102, the wearable system may receive input from the user and other users regarding the environment of the user. This may be achieved through various input devices, and knowledge already possessed in the map database. The user's FOV camera, sensors, GPS, eye tracking, etc., convey information to the system at block 1102. The system may determine sparse points based on this information at block 1104. The sparse points may be used in determining pose data (e.g., head pose, eye pose, body pose, or hand gestures) that may be used in displaying and understanding the orientation and position of various objects in the user's surroundings. The object recognizers 708a-708n may crawl through these collected points and recognize one or more objects using a map database at block 1106. This information may then be conveyed to the user's individual wearable system at block 1108, and the desired virtual scene may be accordingly displayed to the user at block 1110. For example, the desired virtual scene (e.g., user in CA) may be displayed at the appropriate orientation, position, etc., in relation to the various objects and other surroundings of the user in New York.

Figure 11B:
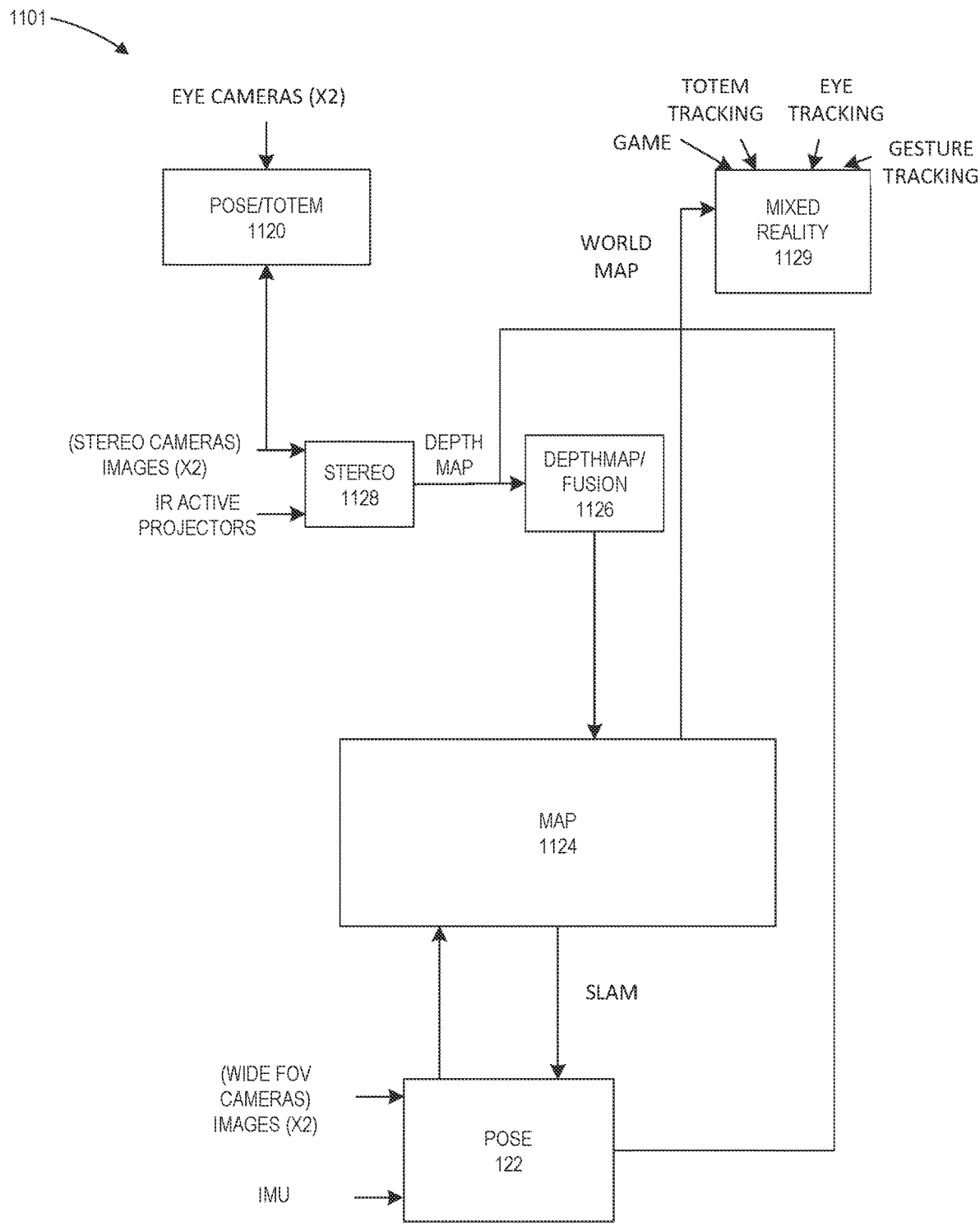
FIG. 11B is a block diagram of another example of a wearable display system.

FIG. 11B is a block diagram of another example of a wearable system (which may correspond to the display system 60 of FIG. 9E). In this example, the wearable system 1101 comprises a map, which may include map data for the world. The map may partly reside locally on the wearable system, and may partly reside at networked storage locations accessible by wired or wireless network (e.g., in a cloud system). A pose process 1122 may be executed on the wearable computing architecture (e.g., processing module 260 or controller 460) and utilize data from the map to determine position and orientation of the wearable computing hardware or user. Pose data may be computed from data collected on the fly as the user is experiencing the system and operating in the world. The data may comprise images, data from sensors (such as inertial measurement units, which generally comprise accelerometer and gyroscope components) and surface information pertinent to objects in the real or virtual environment.

A sparse point representation may be the output of a simultaneous localization and mapping (SLAM or V-SLAM, referring to a configuration wherein the input is images/visual only) process. The system may be configured to not only find out where in the world the various components are, but what the world is made of. Pose may be a building block that achieves many goals, including populating the map and using the data from the map.

In one embodiment, a sparse point position may not be completely adequate on its own, and further information may be needed to produce a multifocal AR, VR, or MR experience. Dense representations, generally referring to depth map information, may be utilized to fill this gap at least in part. Such information may be computed from a process referred to as Stereo 1128, wherein depth information is determined using a technique such as triangulation or time-of-flight sensing. Image information and active patterns (such as infrared patterns created using active projectors) may serve as input to the Stereo process 1128. A significant amount of depth map information may be fused together, and some of this may be summarized with a surface representation. For example, mathematically definable surfaces may be efficient (e.g., relative to a large point cloud) and digestible inputs to other processing devices like game engines. Thus, the output of the stereo process (e.g., a depth map) 1128 may be combined in the fusion process 1126. Pose may be an input to this fusion process 1126 as well, and the output of fusion 1126 becomes an input to populating the map process 1124. Sub-surfaces may connect with each other, such as in topographical mapping, to form larger surfaces, and the map becomes a large hybrid of points and surfaces.

To resolve various aspects in a mixed reality process 1129, various inputs may be utilized. For example, in the embodiment depicted in FIG. 11B, Game parameters may be inputs to determine that the user of the system is playing a monster battling game with one or more monsters at various locations, monsters dying or running away under various conditions (such as if the user shoots the monster), walls or other objects at various locations, and the like. The world map may include information regarding where such objects are relative to each other, to be another valuable input to mixed reality. Pose relative to the world becomes an input as well and plays a key role to almost any interactive system.

Controls or inputs from the user are another input to the wearable system 1101. As described herein, user inputs may include visual input, gestures, totems, audio input, sensory input, etc. In order to move around or play a game, for example, the user may need to instruct the wearable system 1101 regarding what he or she wants to do. Beyond just moving oneself in space, there are various forms of user controls that may be utilized. In one embodiment, a totem (e.g. a user input device), or an object such as a toy gun may be held by the user and tracked by the system. The system preferably will be configured to know that the user is holding the item and understand what kind of interaction the user is having with the item (e.g., if the totem or object is a gun, the system may be configured to understand location and orientation, as well as whether the user is clicking a trigger or other sensed button or element which may be equipped with a sensor, such as an IMU, which may assist in determining what is going on, even when such activity is not within the field of view of any of the cameras.)

Hand gesture tracking or recognition may also provide input information. The wearable system 1101 may be configured to track and interpret hand gestures for button presses, for gesturing left or right, stop, grab, hold, etc. For example, in one configuration, the user may want to flip through emails or a calendar in a non-gaming environment, or do a "fist bump" with another person or player. The wearable system 1101 may be configured to leverage a minimum amount of hand gesture, which may or may not be dynamic. For example, the gestures may be simple static gestures like open hand for stop, thumbs up for ok, thumbs down for not ok; or a hand flip right, or left, or up/down for directional commands.

Eye tracking is another input (e.g., tracking where the user is looking to control the display technology to render at a specific depth or range). In one embodiment, vergence of the eyes may be determined using triangulation, and then using a vergence/accommodation model developed for that particular person, accommodation may be determined.

With regard to the camera systems, the example wearable system 1101 shown in FIG. 11B may include three pairs of cameras: a relative wide FOV or passive SLAM pair of cameras arranged to the sides of the user's face, a different pair of cameras oriented in front of the user to handle the stereo imaging process 1128 and also to capture hand gestures and totem/object tracking in front of the user's face. The FOV cameras and the pair of cameras for the stereo process 1128 may be a part of the outward-facing imaging system 112 (shown in FIG. 9E). The wearable system 1101 may include eye tracking cameras (which may be a part of an inward-facing imaging system 630 shown in FIG. 6) oriented toward the eyes of the user in order to triangulate eye vectors and other information. The wearable system 1101 may also comprise one or more textured light projectors (such as infrared (IR) projectors) to inject texture into a scene.

Figure 11C:
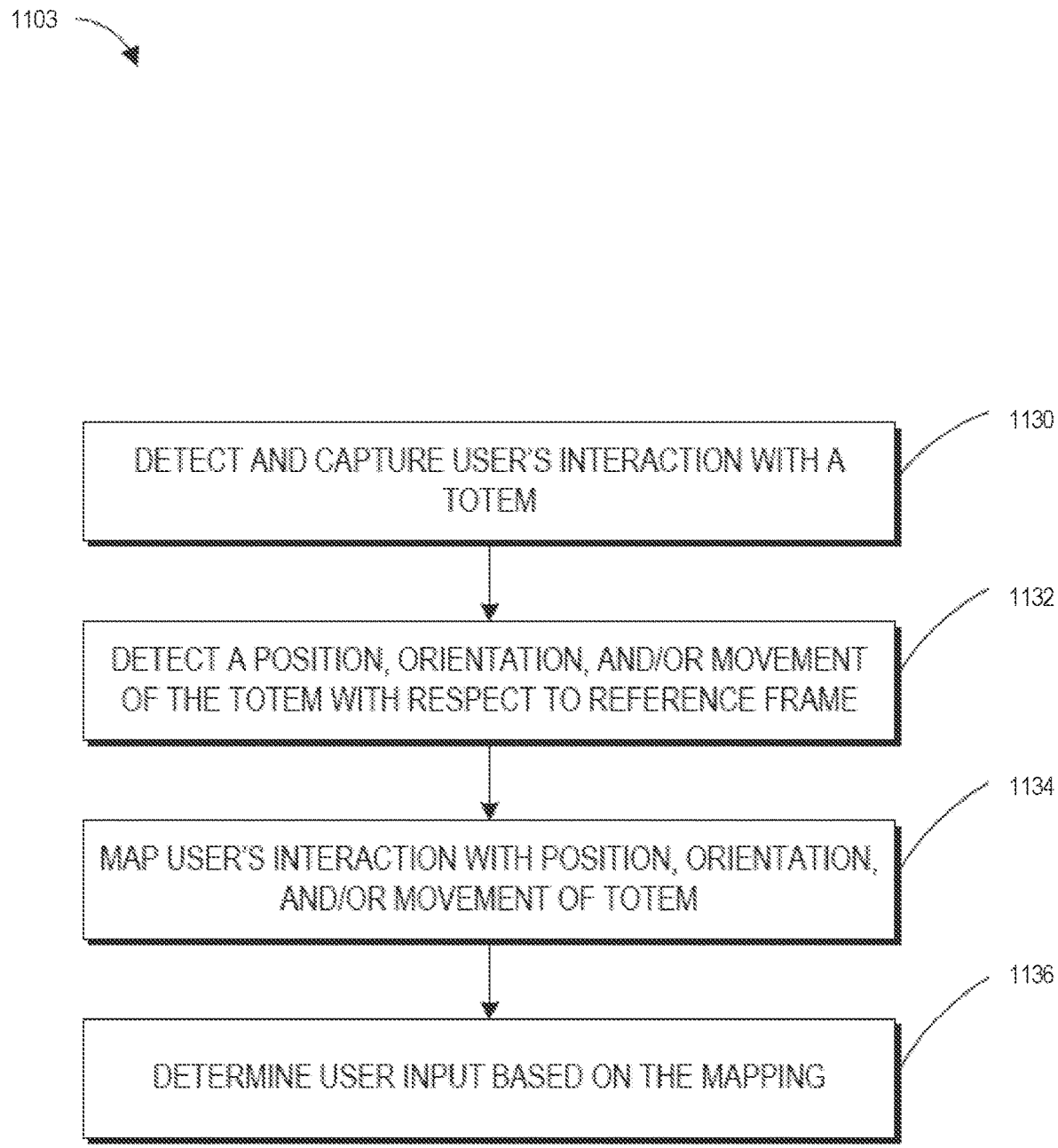
FIG. 11C is a process flow diagram of an example of a method for determining user input to a wearable system.

FIG. 11C is a process flow diagram of an example of a method 1103 for determining user input to a wearable system. In this example, the user may interact with a totem. The user may have multiple totems. For example, the user may have designated one totem for a social media application, another totem for playing games, etc. At block 1130, the wearable system may detect a motion of a totem. The movement of the totem may be recognized through the outward facing system or may be detected through sensors (e.g., haptic glove, image sensors, hand tracking devices, eye-tracking cameras, head pose sensors, etc.).

Based at least partly on the detected gesture, eye pose, head pose, or input through the totem, the wearable system detects a position, orientation, and/or movement of the totem (or the user's eyes or head or gestures) with respect to a reference frame, at block 1132. The reference frame may be a set of map points based on which the wearable system translates the movement of the totem (or the user) to an action or command. At block 1134, the user's interaction with the totem is mapped. Based on the mapping of the user interaction with respect to the reference frame 1132, the system determines the user input at block 1136.

For example, the user may move a totem or physical object back and forth to signify turning a virtual page and moving on to a next page or moving from one user interface (UI) display screen to another UI screen. As another example, the user may move their head or eyes to look at different real or virtual objects in the user's FOR. If the user's gaze at a particular real or virtual object is longer than a threshold time, the real or virtual object may be selected as the user input. In some implementations, the vergence of the user's eyes may be tracked and an accommodation/vergence model may be used to determine the accommodation state of the user's eyes, which provides information on a depth plane on which the user is focusing. In some implementations, the wearable system may use ray casting techniques to determine which real or virtual objects are along the direction of the user's head pose or eye pose. In various implementations, the ray casting techniques may include casting thin, pencil rays with substantially little transverse width or casting rays with substantial transverse width (e.g., cones or frustums).

The user interface may be projected by the display system as described herein (such as the display 220 in FIG. 2). It may also be displayed using a variety of other techniques such as one or more projectors. The projectors may project images onto a physical object such as a canvas or a globe. Interactions with user interface may be tracked using one or more cameras external to the system or part of the system (such as, e.g., using the inward-facing imaging system 630, FIG. 6, or the outward-facing imaging system 112, FIG. 9E).

Figure 11D:
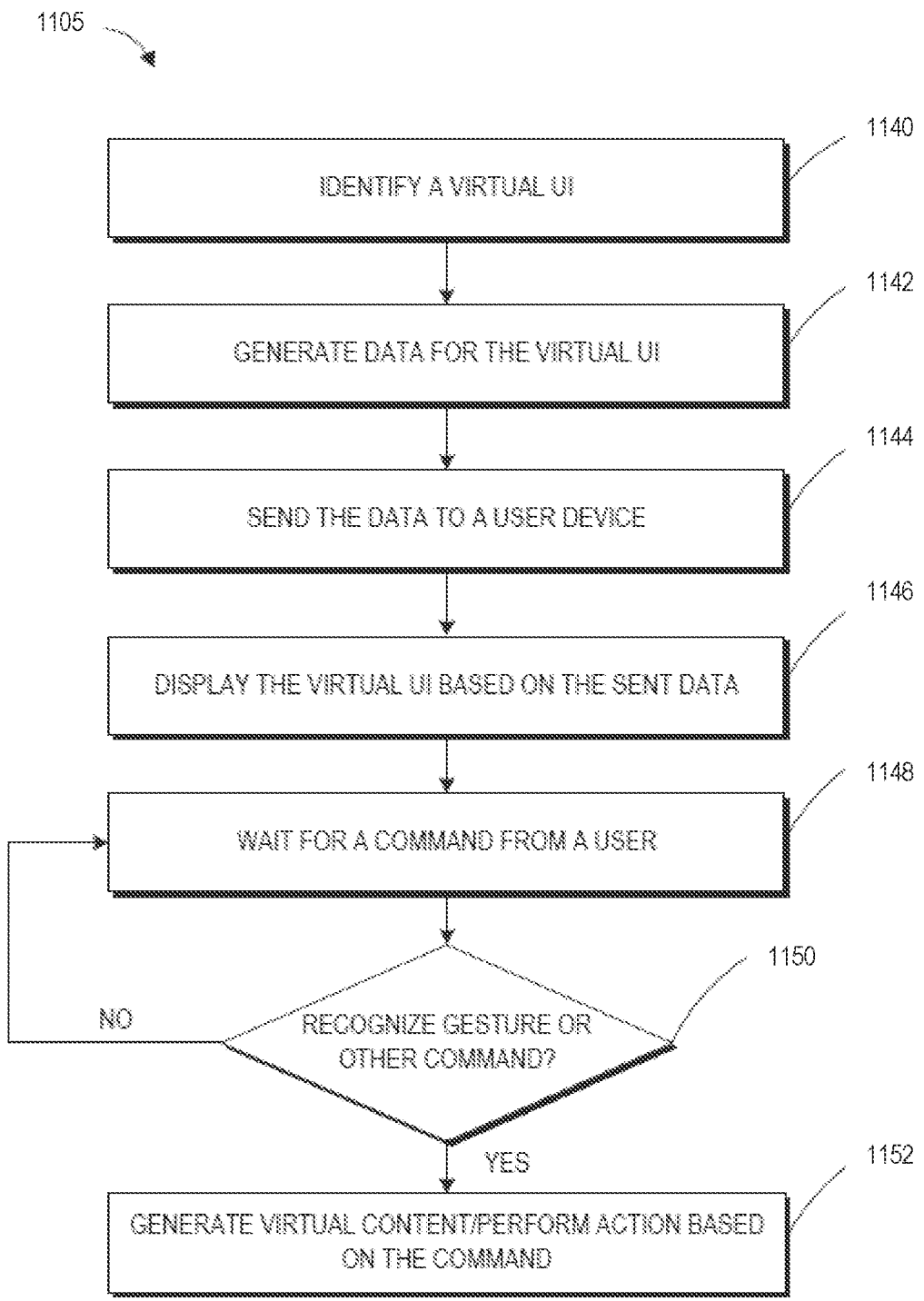
FIG. 11D is a process flow diagram of an example of a method for interacting with a virtual user interface.

FIG. 11D is a process flow diagram of an example of a method 1105 for interacting with a virtual user interface. The method 1105 may be performed by the wearable system described herein, e.g., the display system 60 of FIG. 9E.

At block 1140, the wearable system may identify a particular UI. The type of UI may be predetermined by the user. The wearable system may identify that a particular UI needs to be populated based on a user input (e.g., gesture, visual data, audio data, sensory data, direct command, etc.). At block 1142, the wearable system may generate data for the virtual UI. For example, data associated with the confines, general structure, shape of the UI etc., may be generated. In addition, the wearable system may determine map coordinates of the user's physical location so that the wearable system may display the UI in relation to the user's physical location. For example, if the UI is body centric, the wearable system may determine the coordinates of the user's physical stance, head pose, or eye pose such that a ring UI may be displayed around the user or a planar UI may be displayed on a wall or in front of the user. If the UI is hand centric, the map coordinates of the user's hands may be determined. These map points may be derived through data received through the FOV cameras, sensory input, or any other type of collected data.

At block 1144, the wearable system may send the data to the display from the cloud or the data may be sent from a local database to the display components. At block 1146, the UI is displayed to the user based on the sent data. For example, a light field display may project the virtual UI into one or both of the user's eyes. Once the virtual UI has been created, the wearable system may simply wait for a command from the user to generate more virtual content on the virtual UI at block 1148. For example, the UI may be a body centric ring around the user's body. The wearable system may then wait for the command (a gesture, a head or eye movement, input from a user input device, etc.), and if it is recognized (block 1150), virtual content associated with the command may be displayed to the user (block 1152). As an example, the wearable system may wait for user's hand gestures before mixing multiple steam tracks.

Additional examples of wearable systems, UIs, and user experiences (UX) are described in U.S. Patent Publication No. 2015/0016777, which is incorporated by reference herein in its entirety.

C. Examples of Eye Tracking Calibration

As described herein, a user may interact with a wearable display system using eye gaze, which may include the direction that a user's eye is pointed toward. Eye gaze (sometimes also referred to herein as eye pose) may be measured from a fiducial direction (typically the forward direction to which the user's eyes naturally point) and is often measured with two angles (e.g., elevation and azimuth relative to the fiducial direction) or three angles (e.g., elevation, azimuth, and additionally a roll angle). To provide a realistic and intuitive interaction with objects in the user's environment using eye gaze, the wearable system may use an eye tracking calibration to calibrate the wearable display system to incorporate uniqueness of user's eye features and other conditions that may have some effect on eye measurements.

Eye tracking calibration involves a process for enabling a computing device to learn how to associate a user's eye gaze (e.g., as identified in eye images) with gaze points in a 3D space. An eye gaze may be associated with a single point in the 3D space. An eye gaze may also be associated with multiple points in the 3D space, which may describe a movement of a virtual object (e.g., a series of points describing movement of the virtual avatar 140 described above with reference to FIG. 1 or the virtual butterfly described below with reference to FIG. 12B).

The wearable system may determine a user's eye gaze based on eye images in some embodiments. The wearable system may obtain eye images using sensors (e.g., eye cameras) in the inward-facing imaging system 630 (FIG. 6). The wearable system may image one or both eyes of the user while the user changes his or her eye gazes (such as, e.g., when the user is looking around to follow a moving calibration target). To map a user's eye image with a point of gaze, the wearable system may present a virtual target for the user to look at. The virtual target may be associated with one or more known points of gaze in the 3D space. While the user is looking at the target, the wearable system may acquire eye image(s) and associate the image(s) with gaze point(s). The wearable system may calculate a mapping matrix based on the associations of an eye image and a point of gaze associated with the target. The mapping matrix may provide an association between measurements of the user's eye gaze and a gaze vector (which may indicate the user's direction of gaze).

The mapping matrix may be generated using various machine learning techniques described with reference to FIG. 11C. For example, a component of the wearable system, such as the local processing and data module 140 and/or the remote processing module 150 (FIG. 9E), may receive eye images and target's positions as input and generate the mapping matrix as an output by analyzing associations of eye images and gaze points using machine learning techniques. Eye gaze calculation techniques that may be used include feature-based techniques that detect and localize image features (e.g., iris features or the shape of the pupillary or limbic boundaries) or model-based approaches that do not explicitly identify features but rather calculate a best fitting eye model that is consistent with the obtained eye image(s). Some techniques (e.g., starburst) are hybrid approaches that include aspects of both feature-based and model-based eye gaze techniques.

Once trained, the wearable system may apply the mapping matrix to determine the user's direction of gaze. For example, the wearable system may observe an eye gaze while a user is interacting with a virtual object and input the eye gaze into the mapping matrix to determine the user's gaze points. The gaze points may be used in ray casting to identify an object of interest which intersects with the user's direction of gaze. For example, the wearable system may cast a ray in the user's direction of gaze to identify and select virtual objects that are "hit" by the ray. In some cases, the ray may be a line with negligible lateral width, whereas in other cases, the ray may be a cone subtending a solid angle and having a lateral width. The wearable system may accordingly allow the user to select or perform other user interface operations based on the determined object of interest.

The calibration result may reflect uniqueness in each person's eyes. For example, the wearable system may generate a mapping matrix customized to one or both eyes of a specific individual. For example, the users may have different amounts of eye movements or eye gazes in response to a specific target. As a result, by generating a calibration result specific to an individual user, the wearable system may allow more accurate user interactions with eye gazes.

Figure 12A:
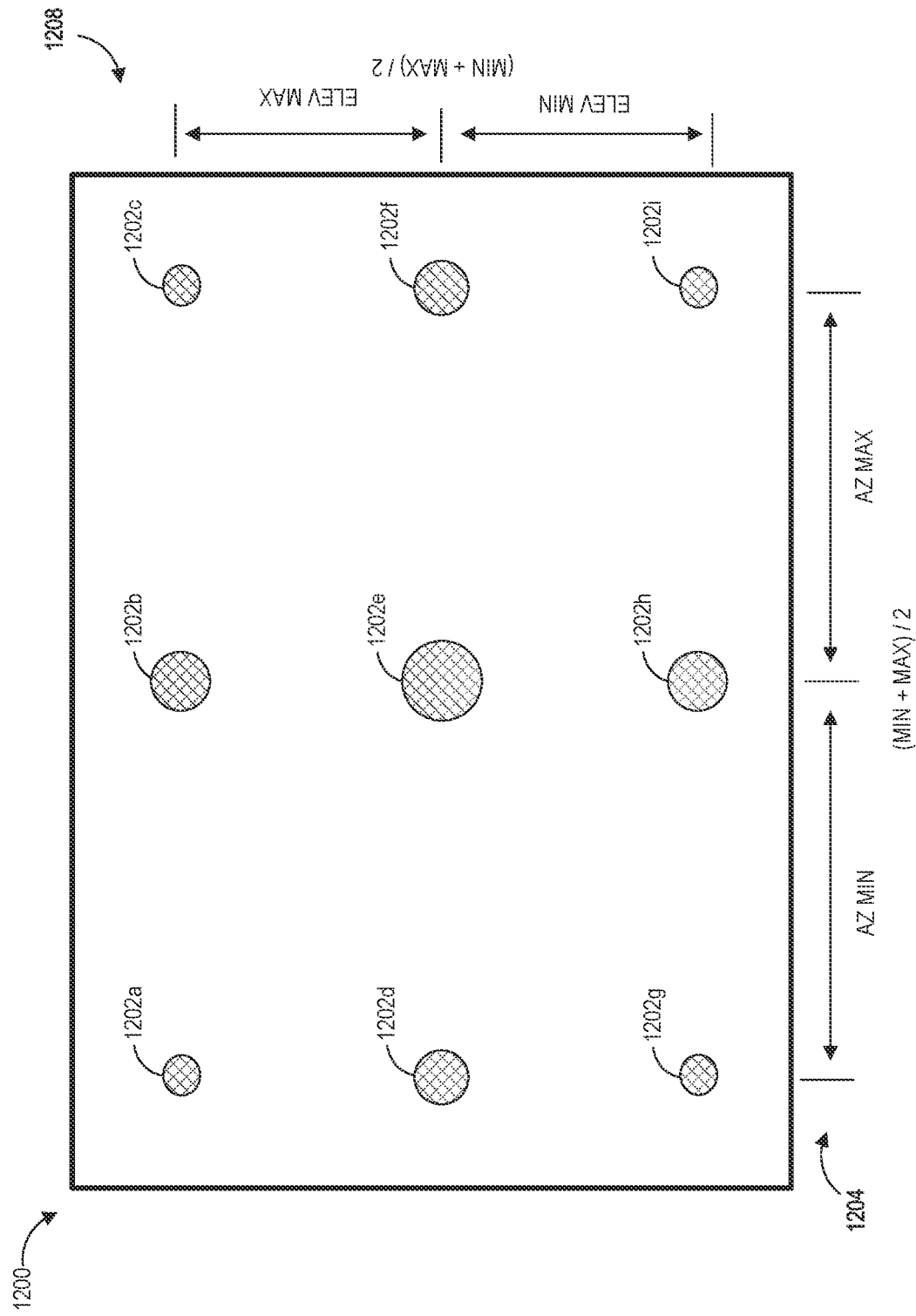
FIG. 12A illustrates example targets in an eye-tracking calibration process.

FIG. 12A illustrates example targets in an eye tracking calibration process. FIG. 12A illustrates nine virtual targets in a user's Field of View (FOV) 1200. The user's FOV 1200 may include a portion of the user's Field of Regard (FOR) that the user may perceive at a given time. The nine targets 1202a-1202i may be rendered at different depths. For example, the target 1202e is at a depth plane that appears closer to the user than the target 1202a. As a result, the target 1202e appears larger than the target 1202a to the user. The nine targets may be rendered sequentially to a user during the eye tracking calibration process. For example, the wearable system may render target 1202e first, followed by the target 1202c, then followed by the target 1202b, and so forth. As described further below with reference to FIG. 12B, in some embodiments, a single target is displayed to the user, and the target moves around the user's field of view (for example, passing or temporarily stopping at the positions 1202a-1202i during the target's movement). The wearable system may acquire an image of the user's eyes while the user is looking at these targets. For example, the wearable system may acquire a first image when the user is looking at the target 1202e while acquiring a second image when the user is looking at the target 1202c, and a third image when the user is looking at the target 1202b, and so forth. The wearable system may accordingly match the first image to the position of the target 1202e and match the second image to the position of the target 1202c, and match the third image to the position of the target 1202b, and so forth. Although nine targets are shown in FIG. 12A, this is for illustration and in other implementations, fewer or more targets (or target locations) may be used, and their positions may be different than shown.

The locations of the targets may be represented by positions in a rig space. The rig space may include a coordinate system fixed with reference to the wearable display system (e.g., the HMD described herein). The coordinate system may be represented as a Cartesian x-y-z coordinate system. In this example, the horizontal axis (x) is represented by the axis 1204 (also referred to as azimuth) and the vertical axis (y) is represented by the axis 1208 (also referred to as elevation). The axis (z) associated with the depth from the user is not shown in FIG. 12A.

As illustrated, the target 1202e is in the center of the nine virtual targets. Therefore, the x-axis position of the target 1202e may be calculated by 0.5 times the sum of the x-axis 1204 value of the left most virtual objects (e.g., objects 1202a, 1202d, 1202g) and the x-axis 1204 value of the right most virtual objects (e.g., objects 1202c, 1202f, 1202i). Similarly, the y-axis position of the target 1202e may be calculated by 0.5 times the sum of the y-axis 1208 value of the virtual objects on the top of the FOV (e.g., objects 1202a, 1202b, 1202c) and the y-axis 1208 value of the virtual objects on the bottom of the FOV (e.g., objects 1202g, 1202h, 1202i).

The wearable system may present a target in various eye pose regions of the display 220. The target may be shown as a graphic (such as a realistic or animated butterfly or bumble bee, or an avatar). A graphic may be a still image that appears at a position in the FOV or appears to move from position to position within the FOV.

The target may be displayed in various eye pose regions of the display 220 until an eye image of a sufficient eye image quality is obtained for one or more eye pose regions of the display 220. For example, the quality of an eye image may be determined and compared to an image quality threshold to determine that the eye image has an image quality that may be used for a biometric application (e.g., the generation of iris codes). If an eye image in a certain eye pose region does not pass or satisfy an image quality threshold, the display 220 may be configured to continue display one or more graphics in that particular region, until an eye image of a sufficient eye image quality is obtained. The one or more graphics displayed in one particular region may be the same or different in different implementations. For example, the graphic may be displayed at the same or different locations or in the same or different orientations in that particular region.

A graphic may be displayed in the various eye pose regions of the display 220 using a story mode or a mode that may direct or attract a wearer's one or both eyes toward different regions of the display 220. For example, in one embodiment described below with reference to FIG. 12B, a virtual avatar (e.g., a butterfly) may be shown to move across the various regions of the display 220. The instances of the graphic displayed in various regions of the display 220 may have properties (for example, different depths, colors, or sizes) that attract or direct a wearer's one or both eyes toward one or more eye pose regions in which the instances of the graphic are displayed. In some embodiments, the graphics displayed in various regions of the display 220 may appear to have varying depths so that a wearer's one or both eyes are attracted toward eye pose regions in which the instances of the graphic are displayed.

Figure 12B:
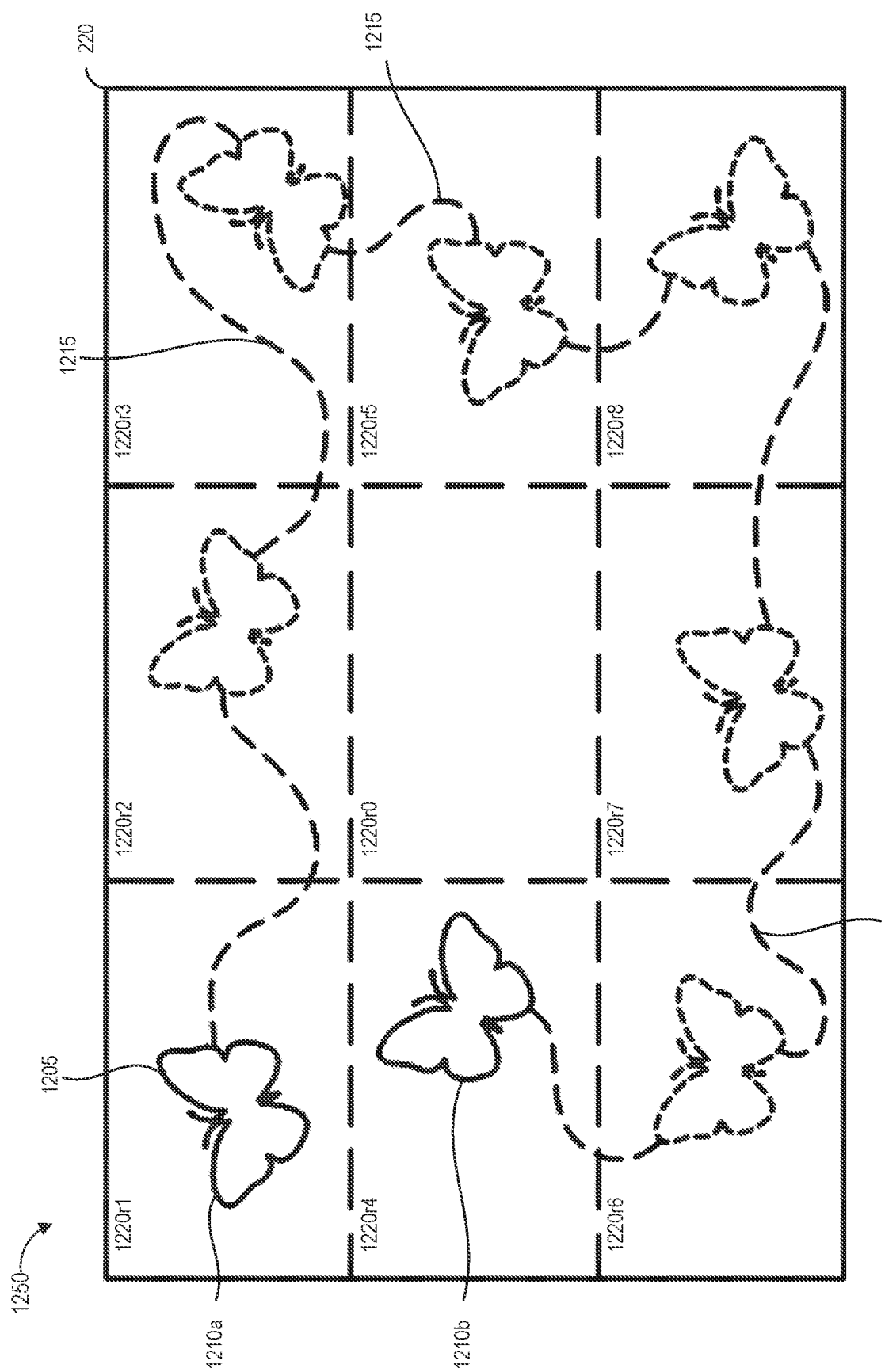
FIG. 12B schematically illustrates an example scene for an eye-tracking calibration process.

FIG. 12B schematically illustrates an example scene 1250 on a display 220 of a head mounted display system. As depicted in FIG. 12B, the display 220 may display a scene 1250 with a moving graphic 1205. For example, as depicted, the graphic 1205 may be a butterfly that is displayed to the user as flying throughout the scene 1250. The graphic 1205 may be displayed over or as part of a background image or scene (not shown in FIG. 12B). In various embodiments, the graphic may be an avatar (e.g., a personification of a person, animal, or things such as, e.g., a butterfly or the bumble bee 140 shown in FIG. 1), or any other image or animation that may be configured to be displayed in a particular eye pose region of the display 220. The graphic 1205 may be tailored to the user (e.g., based on age, anxiety level, maturity, interests, etc.). For example, to avoid causing anxiety in a child, the graphic 1205 may be a child-friendly character (such as the butterfly or the friendly bumble bee 50 (FIG. 1)). As another example, for a user who is an automobile enthusiast, the graphic 1205 may be a car such as a racing car. Thus, in moving in various regions of the display 220, the graphic 1205 may be displayed as and appear as a video animation to a wearer 210 using the wearable display system 200. The graphic 1205 may start in an initial position 1210a and proceed to a final position 1210b along a path 1215. For example, as depicted, the graphic 1205 may move across the display (e.g., along the dotted line) into different regions of the display 220 in a clockwise manner. As another example, the graphic 1205 may appear as zigzagging or moving randomly across the different regions of the display 220. One possible zigzagging pattern may be regions 1220r1, 1220r2, 1220r4, 1220r0, 1220r3, 1220r5, 1220r7, and 1220r8.

The display 220 is shown in FIG. 12B to have nine regions 1220r0-1220r8 of identical size for illustration only. The number of regions 1220r0-1220r8 of the display 220 may be different in different implementations. Any number of regions of a display may be used to capture eye images while a graphic proceeds from region to region, to direct the eye toward that respective region. For example, the number of eye pose regions may be 2, 3, 4, 5, 6, 9, 12, 18, 24, 36, 49, 64, 128, 256, 1000, or more. Eye images may be captured for some or all of the eye pose region. The shapes of the regions 1220r0-1220r8 of the display 220 may be different in different implementations, such as rectangular, square, circular, triangular, oval, diamond. In some embodiments, the sizes of different regions of the display 220 may be different. For example, regions closer to the center of the display 220 may be smaller or bigger than the regions further away from the center of the display 220. As another example, the eye pose regions may comprise halves, quadrants, or any segmentation of the display 220.

The path 1215 may move in, across, or around eye pose regions where it is desirable to obtain good quality eye images, and the path 1215 may avoid eye pose regions where eye images are undesirable (e.g., generally poor quality) or unneeded (e.g., for a particular biometric application). For example, a biometric application (e.g., iris code generation) may tend to use eye images where the eye of the user is pointed straight forward (e.g., through the eye pose region 1220r0). In such a case the graphic 1205 may tend to move primarily within the eye pose region 1220r0 and not move (or move less frequently) in eye pose regions 1220r1-1220r8. The path 1215 may be more concentrated in the center of the scene 1250 as compared to the peripheral regions of the scene 1250. In other biometric applications (e.g., diagnosis of the retina of the eye), it may be desirable to obtain eye images where the user is looking toward directions away from the region 1220r0 (e.g., away from the natural resting eye pose) so that images of the medial or lateral regions of the retina (away from the fovea) are obtained. In such an application, the graphic 1205 may tend to move around the periphery of the scene 1250 (e.g., the regions 1220r1-1220r8) as compared to the center of the scene (e.g., the region 1220r0). The path 1215 may be more concentrated around the periphery of the scene and tend to avoid the center of the scene (e.g., similar to the path 1215 shown in FIG. 12B).

The eye pose regions 1220r0-1220r8 of the display 220 are depicted as being separated by horizontal and vertical dotted lines in the display 220 for illustration only. Such eye pose regions 1220r0-1220r8 are delineated for convenience of description and may represent regions of the display 220 where the wearer's eyes should point so that an eye image may be obtained. In some implementations, the horizontal and vertical dotted lines shown in FIG. 12B are not visible to the user. In some implementations, the horizontal or dotted lines shown in FIG. 12B may be visible to the user to direct the wear's one or more eyes toward particular regions of display 220.

The path 1215 shown in FIG. 12B is illustrative and not intended to be limiting. The path 1215 may have a different shape than shown in FIG. 12B. For example, the path 1215 may cross, re-cross, or avoid one or more of the eye pose regions 1220r0-1220r1 and may be rectilinear, polygonal, or curved, etc. The speed of the moving graphic 1215 may be substantially constant or may be variable. For example, the graphic 1205 may slow down or stop in certain eye pose regions (e.g., where one or more eye images are taken) or the graphic 1205 may speed up or skip through other eye pose regions (e.g., where eye images are not needed or desired). The path 1215 may be continuous or discontinuous (e.g., the graphic 1205 may skip over or around certain eye pose regions). For example, with reference to FIG. 12B, if the graphic 1205 is at position 1210b in the eye pose region 1220r4, and a biometric application needs an eye image with the user's eye directed toward the eye pose region 1220r8, the display system could display the graphic 1205 so that it moves continuously to the region 1220r8 (e.g., the butterfly flies across the scene from the region 1220r4 through the region 1220r0 and into the region 1220r8) or the display system could simply stop displaying the graphic 1205 in the region 1220r4 and then start displaying the graphic 1205 in the region 1220r8 (e.g., the butterfly would appear to have jumped from the region 1220r4 to 1220r8).

An eye pose region may be considered as a connected subset of a real two-dimensional coordinate space $\mathbb{R}^2$ or a positive integer two-dimensional coordinate space $(\mathbb{N}_{>0})^2$, which specifies that eye pose region in terms of the angular space of the wearer's eye pose. For example, in one embodiment, an eye pose region may be between a particular $\theta_{min}$ and a particular $\theta_{max}$ in azimuthal deflection (e.g., the horizontal axis 1204 in FIG. 12A) and between a particular $\phi_{min}$ and a particular $\phi_{max}$ in elevation deflection (e.g., the vertical axis 1208 in FIG. 12A). Additionally, an eye pose region may be associated with a particular region assignment. Such region assignments may not appear on the display 220 to a wearer 210, but are shown in FIG. 12B for illustrative purposes. The regions may be assigned in any suitable manner. For example, as depicted in FIG. 12B, the center region may be assigned region 1220r0. In the depicted embodiment, the numbering of the regions may proceed in a generally horizontally sequential manner, with the center region assigned region 1220r0, ending with bottom right region assigned region 1220r8. Such regions 1220r0-1220r8 may be referred to as eye pose regions. In other implementations, the regions may be numbered or referenced differently than shown in FIG. 12B. For example, the upper left region may be assigned region 1220r0 and the bottom right region may be assigned region 1220r8.

The scene 1250 may be presented by the wearable display system in a VR mode of display, where the wearer 210 sees the graphic 1205, but not the outside world. Alternatively, the scene 1250 may be presented in an AR/VR/MR mode of display, where the wearer 210 sees the visual graphic 1205 superimposed on the outside world. While the graphic 1205 is being displayed in an eye pose region, eye images may be captured by an image capture device (e.g. the inward-facing imaging system 630 in FIG. 6) coupled to the wearable display system 200. As but one example, one or more eye images may be captured in one or more of the eye pose regions 1220r0-1220r8 of the display 220. For example, as depicted, the graphic 1205 may start in the initial position 1210a and move within that upper-left eye pose region (e.g., region 1220r1) of the display 220. With the graphic 1205 moving in that upper-left eye pose region, the wearer 210 may direct their eyes toward that region of the display 220. One or more eye images captured by the camera, while the graphic 1205 is in the upper left eye pose region of the display 220, may include the eye in a certain eye pose when looking in that direction.

Continuing in this example, the graphic 1205 may move along the path 1215 to the upper middle eye pose region (e.g., region 1220r2), where an eye image with an eye pose that is directed to the upper middle region may be captured. The graphic 1205 may move along in the various eye pose regions 1220r0-1220r8 of the display 220, while eye images are captured intermittently or continuously during this process, until the graphic 1205 reaches the final position 1210b in the region 1220r4. One or more eye images may be captured for each of the regions, or eye images may be captured in fewer than all of the regions that graphic 1205 moves through. Accordingly, eye images captured may include at least one image of the eye in one or more different eye poses. An eye pose may be represented as an expression of two angles, as will be described further below.

The graphic 1205 may also remain in an eye pose region of the display 220 until an image of a certain image quality is obtained or captured. As described herein, various image quality metrics are available to determine whether a certain eye image passes an image quality threshold (Q). For example, the image quality threshold may be a threshold that corresponds to an image metric level for generating an iris code. Accordingly, if an eye image captured, while the graphic 1205 is in a certain eye pose region of display 220, passes an image quality threshold, the graphic 1205 may remain in that eye pose region (or return to that eye pose region) until an image is obtained that meets or passes the image quality threshold. Image quality thresholds may also be defined for a particular eye pose region of the display. For example, a particular biometric application may require darkening of certain regions of the display 220. Thus, the image quality threshold for those regions may be higher than the image quality threshold of a region that has not been darkened. During this image collection process, the graphic 1205 may continue in a story mode or animations that continue to direct a wearer's eye toward that region.

An eye image collection routine may also be used to correct for fragile bits in an iris code. Fragile bits refers to bits of an iris code that are inconsistent between eye images (e.g., there is a substantial probability the bit is zero for some eye images and one for other images of the same iris). More specifically, fragile bits may be weakly defined bits in an iris code of the eye image, which may represent empirical unreliability in measurement. Fragile bits may be quantified, for example, utilizing a Bayesian model for the uncertainty in parameters of a Bernoulli distribution. Fragile bits may also be identified, for example, as those bits representing areas typically covered by the eyelid or occluded by eyelashes. An eye image collection routine may utilize the graphic 1205 to actively guide an eye to different eye poses, thereby reducing the impact of fragile bits on the resulting iris code. As but one example, the graphic 1205 may guide an eye to eye pose regions not occluded by eyelids or eyelashes. Additionally or alternatively, a mask may be applied to an eye image to reduce the impact of fragile bits. For example, the mask may be applied so that eye regions identified as producing fragile bits (e.g., upper or lower portions of the iris where occlusion is more likely to occur) may be disregarded for iris generation. As yet another example, the graphic 1205 may return to eye pose regions that are more likely to generate fragile bits to obtain more eye images from those region(s), thereby reducing the impact of fragile bits on the resulting iris code.

The graphic 1205 may also remain in (or return to) an eye pose region of the display 220 until a number of images are captured or obtained for a particular eye pose region. That is, instead of comparing an image quality metric of each eye image with an image quality threshold "on-the-fly," or in real time a certain number of eye images may be obtained from each eye pose region. Then, each of the eye images obtained for that eye pose region may be processed to obtain an image quality metric which is in turn compared to a respective image quality threshold. As may be seen, eye pose regions of the eye image collection process may be performed in parallel or sequence, depending on application needs or requirements.

During this eye image collection routine, a graphic may be displayed in one or more eye pose regions of display 220 in a variety of modes. For example, a graphic may be displayed in a particular eye pose region (or across two or more eye pose regions) of the display in a random mode, a flight mode, a blinking mode, a fluctuating mode, or a story mode. The story mode may contain various animations that the graphic may engage in. As but one example of a story mode, a butterfly may emerge from a cocoon and fly around a particular region of the display 220. As the butterfly flies around, a flower may appear that the butterfly may retrieve nectar. As may be seen, a story of the butterfly may be displayed in a particular region of the display 220 or across two or more regions of the display 220.

In a fluctuating mode, a butterfly's wings may appear to be fluctuating in size as it flies around in a particular region of the display 220. In a random mode, the exact location of the graphic 1205 within a particular region may be randomized. For example, the graphic 1205 may simply appear in different locations of the upper left region. As another example, the graphic 1205 may move in a partially random manner within the upper left eye pose region, starting from the initial position 1210a. In a blinking mode, a butterfly or a party of a butterfly may appear as blinking within a particular region or across two or more regions of the display 220. Various modes are possible in the various eye pose regions of display 220. For example, the graphic 1205 may appear in the upper left region in an initial position 1210a in a story mode; while the graphic 1205 may appear in the middle left region in the final position 1210b using a blinking mode.

Graphics may also be displayed throughout the eye pose regions 1220r0-1220r8 of the display 220 in a variety of modes. For example, graphics may appear in a random or sequential manner (referred to as a random mode or a sequential mode respectively). As described herein, a graphic 1205 may move across in sequential manner through the various regions of the display 220. Continuing in that example, the graphic 220 may move along the path 1215 using intervening animations between the eye pose regions of the display 220. As another example, the graphic 1205 may appear in different regions of the display 220 without intervening animations. As yet another example, a first graphic (e.g., a butterfly) may appear in a first eye pose region, while another graphic (e.g., a bumblebee) may appear in a second eye pose region.

Different graphics may appear in series from one region to the next. Or, in another embodiment, various graphics may be used in a story mode as different graphics appear in different eye pose regions to tell a story. For example, a cocoon may appear in one eye pose region, and then the butterfly in another. In various implementations, different graphics may also appear randomly distributed through the eye pose regions, as the eye image collection process may direct an eye from one eye pose region to another with a different graphic appearing in each eye pose region.

Eye images may also be obtained in a random manner. Thus, the graphic 1205 may also be displayed in the various eye pose regions of display 220 in a random manner. For example, the graphic 1205 may appear in the upper middle region, and once an eye image is obtained for that region, the graphic 1205 may thereafter appear in the bottom right eye pose region (e.g., assigned region 1220r8) of the display 220 in FIG. 12B. As another example, the graphic 1205 may be displayed in a seemingly random way, displaying the graphic 1205 on each eye pose region at least once, with no duplication on an individual region until the graphic 1205 has been displayed in the other regions. Such a pseudo-random manner of display may occur until a sufficient number of eye images are obtained for an image quality threshold or some other application. Accordingly, the various eye poses for a wearer's one or both eyes may be obtained in a random manner, rather than a sequential manner.

In some cases, if an eye image cannot be obtained for a certain eye pose region after a threshold number of attempts (e.g., three eye images captured for the eye pose region do not pass the image quality threshold), the eye image collection routine may skip or pause collection on that eye pose region for a period of time, while obtaining eye images from one or more other eye pose regions first. In one embodiment, the eye image collection routine may not obtain an eye image for a certain eye pose region if an eye image cannot be obtained after a threshold number of attempts.

Eye pose may be described with respect to a natural resting pose (e.g., in which the user's face and gaze are both oriented as they would be toward a distant object directly ahead of the user). The natural resting pose of the eye may be indicated by a natural resting position, which is a direction orthogonal to the surface of the eye when in the natural resting pose (e.g., directly out of the plane of an eye). As the eye moves to look toward different objects, the eye pose changes relative to the natural resting position. Thus, a current eye pose may be measured with reference to an eye pose direction, which is a direction orthogonal to the surface of the eye (and centered in the pupil) but oriented toward the object at which the eye is currently directed.

With reference to an example coordinate system, the pose of an eye may be expressed as two angular parameters indicating an azimuthal deflection and a zenithal deflection of the eye pose direction of the eye, both relative to the natural resting position of the eye. These angular parameters may be represented as θ (azimuthal deflection, measured from a fiducial azimuth) and φ (elevation deflection, sometimes also referred to as a polar deflection). In some implementations, angular roll of the eye around the eye pose direction may be included in the measurement of eye pose, and angular roll may be included in the following analysis. In other implementations, other techniques for measuring eye pose may be used, for example, a pitch, yaw, and optionally roll system. Using such representations for eye pose, an eye pose expressed as an azimuthal deflection and a zenithal deflection may be associated with a particular eye pose region. Accordingly, an eye pose may be determined from each eye image obtained during the eye image collection process. Such associations between the eye pose, the eye region, of the eye image may be stored in the data modules 260, 280, or made accessible to the processing modules 260, 270 (e.g., accessible via cloud storage).

Eye images may also be selectively obtained. For example, certain eye images of a particular wearer may already be stored or accessible by the processing modules 260, 270. As another example, certain eye images for particular wearer may already be associated with certain eye pose regions. In such cases, a graphic 1205 may appear in only one eye pose region or particular eye pose regions that do not have eye images associated with that eye pose region or particular eye pose regions. Illustratively, eye images may have been obtained for eye regions numbers 1, 3, 6, and, 8, but not the other eye pose regions 2, 4, 5, and 7. Accordingly, a graphic 1205 may appear in the latter pose regions 2, 4, 5, and 7 until eye images are obtained for each respective eye pose region that passes an image quality metric threshold.º

Detailed examples of eye image collection and analysis for eye gaze are further described in U.S. application Ser. No. 15/408,277, titled "Eye Image Collection", filed on Jan. 17, 2017, the disclosure of which is hereby incorporated by reference in its entirety.

D. Examples of Validating Eye Gaze

Although the wearable system may acquire eye images during the eye tracking calibration process described with reference to FIGS. 12A and 12B, one challenge in the eye tracking calibration process is that users may not look at the targets as expected. For example, when a wearable system renders a target (e.g., the virtual butterfly 1205 or one of the targets 1202a-i) in a rig space, the user may look at another direction instead of the graphic. For example, in one laboratory-based experiment, ten percent of the users did not look at some of the targets during calibration, even under laboratory testing conditions. User compliance with a calibration protocol may be substantially less when a user is alone in a home or office environment. As a result, the wearable system may not get accurate eye tracking results from the calibration and, consequently, the user's visual experiences with the wearable system may be affected.

Figure 12C:
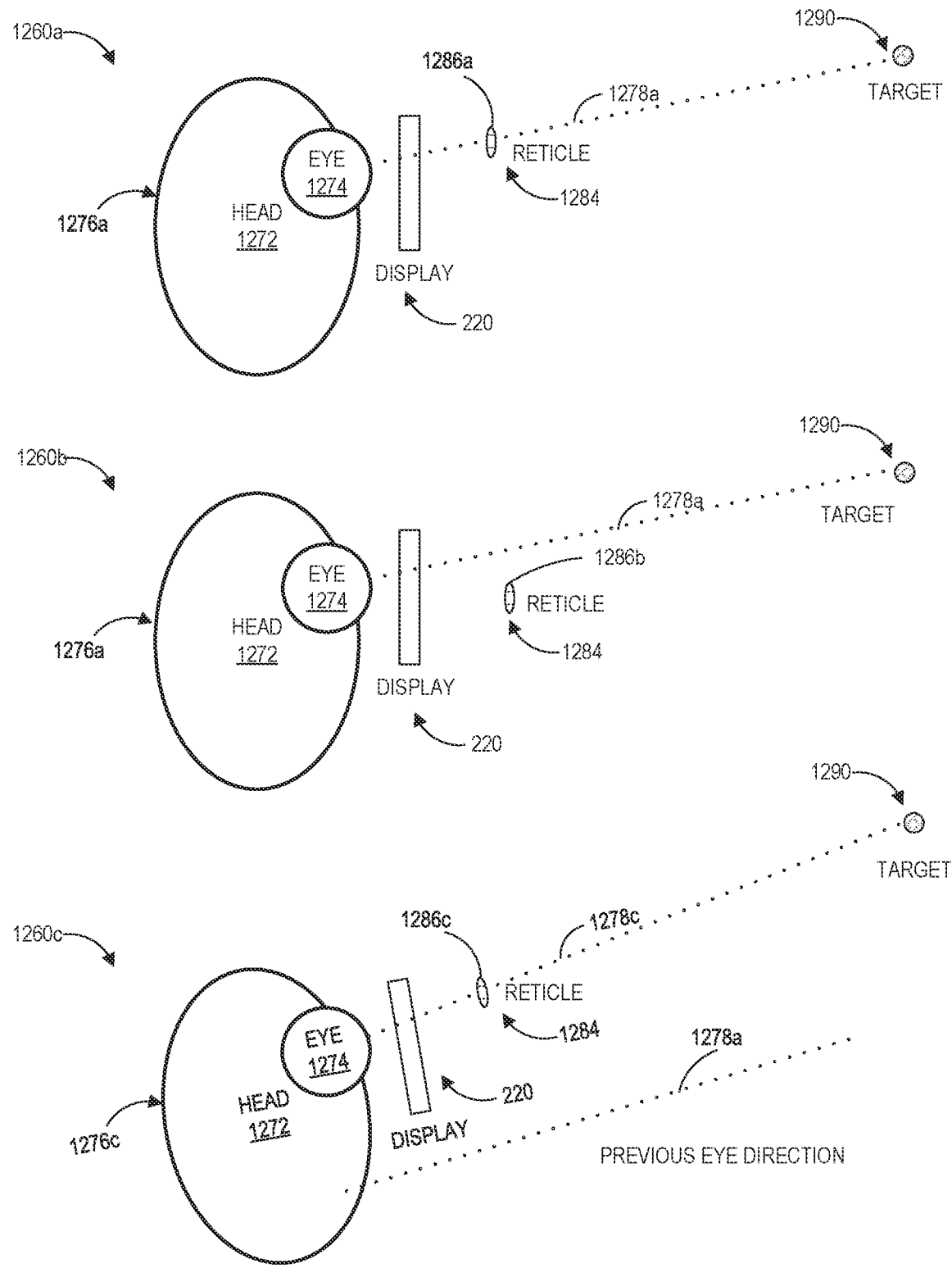
FIG. 12C illustrates an example of validating whether a user is looking a target using the user's head pose.

To ameliorate this challenge and to improve the quality of data acquired for eye gazes, the wearable system may validate the user's eye gaze before adjusting the mapping matrix for calibration. During the eye gaze validation, the wearable system may use head pose (e.g., head position or rotation information) to validate that the user is indeed looking at the target. FIG. 12C illustrates an example of validating whether a user is looking a target using the user's head pose. FIG. 12C illustrates three scenes 1260a, 1260b, and 1260c. In these three scenes, a user may perceive a reticle 1284 and a target 1282 via the display 220. The reticle 1284 represents a virtual object in the rig space while the target 1282 represents a virtual or a physical object which is at a given location in the user's environment. The location of the target 1290 may be represented by a position in a world space which is associated with a world coordinate system. The world coordinate system may be with respect to the user's 3D space rather than the user's HMD. As a result, an object in the world coordinate system may not necessarily align with an object in the rig space.

During an eye gaze validation process, a user needs to align the reticle 1284 with the target 1290, and the wearable system may instruct the user to "aim" the reticle 1284 at the target 1290. As the reticle 1284 moves in the rig space, a user needs to move the head and eyeballs to be able to align the reticle 1284 with the target again. The wearable system may check whether the reticle 1284 aligns with the target 1290 (e.g., by comparing measured user head pose or eye gaze with the known position of the target) and provide feedback to the user (e.g., indicating whether the reticle 1284 aligns or misaligns with the target 1290). Advantageously, in some embodiments, the wearable system may be configured to only collect eye images for eye tracking calibration when there is sufficient alignment between the reticle 1284 and the target 1290. For example, the wearable system may determine there is sufficient alignment when an offset between the positions of the target and the reticle differs by less than a threshold amount (e.g., smaller than an angular threshold such as less than 10°, less than 5°, less than 1°, etc.).

With reference to FIG. 12C, the head 1272 is initially at the position 1276*a* and the eye 1274 is gazing in the direction 1278*a* in scene 1260*a*. The user may perceive that the reticle 1284 is located at the position 1286*a* via the display system 220. As illustrated in the scene 1260*a*, the reticle 1284 is aligned with the target 1290.

During the calibration process, the wearable system may render the reticle 1284 at different locations in the user's FOV. In the scene 1260*b*, the reticle 1284 is moved to the position 1286*b*. As a result of this movement, the reticle 1284 is no longer aligned with the target 1290.

The user may need to rotate his or her eye balls and/or move his or her head 1272 to realign the reticle 1284 with the target 1290. As depicted in the scene 1260*c*, the user's head is tilted to the position 1276*c*. In the scene 1260*c*, the wearable system may analyze the user's head pose and eye gaze, and determine that the user's direction of gaze is now at the direction 1278*c* as compared to the direction 1278*a*. Because of the user's head movement, the reticle 1284 is moved to the position 1286*c* and is aligned with the target 1290 as shown in the scene 1260*c*.

In FIG. 12C, the location of the reticle 1284 may be associated with a position in the rig space. The location of the target 1290 may be associated with a position in a world space. As a result, the relative positions between the reticle 1284 and the display 220 do not change even though the user's head pose has changed in scenes 1260*b* and 1260*c*. The wearable systems may align the reticle and the target may align the position of the reticle in the rig space with the position of the reticle in the world space.

Advantageously, in some embodiments, the wearable system may exploit the user's vestibulo-ocular reflex to reduce discomfort and eyestrain caused by the calibration process. The wearable system may automatically track and deduce the eye gaze based on the head pose. For example, when the user's head moves to the right, the wearable system may track and deduct that the eyes move to the left naturally under the vestibulo-ocular reflex.

Figure 13A:
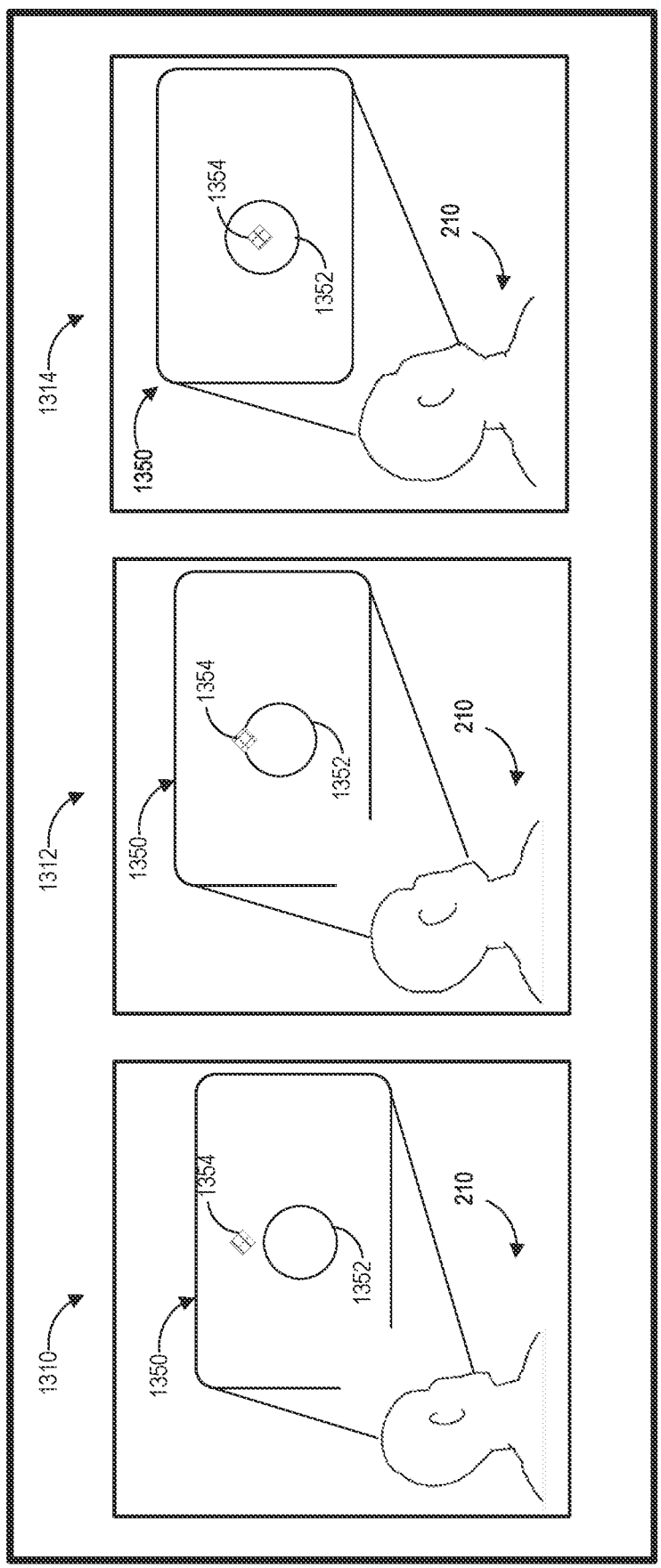
FIG. 13A illustrates an example of validating eye gaze where a reticle is in the center of the user's FOV.

FIG. 13A illustrates an example of validating eye gaze where the reticle is in the center of the user's FOV 1350. In FIG. 13A, three time-sequential scenes, 1310, 1312, and 1314 are shown. In this example, the user may perceive an eye calibration target 1354 and a reticle 1352. The target 1354 (e.g., a diamond-shaped graphic) is displayed as being fixed in the three-dimensional space of the user's environment and is located away from the virtual reticle (e.g., off-center in the user's FOV). The reticle 1352 (e.g., a hoop or ring-shaped graphic) is displayed as being fixed at or near the center of the user's FOV 1350. For example, at or near the center of the FOV may comprise an angular offset less than 10°, less than 5°, less than 1°, etc.

In the scene 1310, the reticle 1352 is not aligned with the target 1354, where the reticle 1352 is slightly below the target 1354. As described with reference to FIG. 12C, the user may move his or her head around to align the reticle 1352 with the target 1354. The wearable system may detect the user's head movement using the IMUS described with reference to FIG. 2. In certain embodiments, the head poses may be determined based on data acquired from other sources, such as from a sensor external to an HMD (e.g., a camera in the user's room) or from an reflected image of the user's head as observed by the outward-facing imaging system 112 (FIG. 9E). As illustrated in the scene 1312, the user may move his or her head upward to attempt to align the reticle 1352 with the target 1354. Once the reticle reaches the position as illustrated in the scene 1314, the wearable system may determine that the reticle 1352 is adequately aligned with the eye calibration target 1354, and thus the user's head is properly positioned for viewing the eye calibration target.

The wearable system may use a variety of techniques to calculate alignments between the reticle and the eye calibration target. As one example, the wearable system may determine the relative positions between the reticle and the eye calibration target. If the eye calibration target is within the reticle or a portion of eye calibration target overlaps with the reticle, the wearable system may determine that the reticle has aligned with the eye calibration target. The wearable system may also determine that the reticle and the target are aligned if the center of the reticle and the target coincide sufficiently. In certain embodiments, because the reticle is in the rig space while the target is in the world space, the wearable system may be configured to align the coordinate system associated with the rig space with the coordinate system associated with the world space to determine whether the reticle aligns with the target. The wearable system may determine whether the reticle and target overlap or coincide by determining that the relative offset between them is smaller than a threshold (e.g., an angular threshold as described above). In some examples, this threshold may correspond to one or more thresholds associated with user head pose, as described in further detail below with reference to FIGS. 14A and 14B.

The wearable system may also identify a target head pose which represents the head pose where an alignment between the reticle and the eye calibration target occurs. The wearable system may compare the user's current head pose with the target head pose to validate that the user is indeed looking at the target. A target head pose may be specific to a reticle's position in the 3D space or a target's position. In some embodiments, the target head pose may be estimated based on data associated with the user or other people (such as, e.g., previous users of the wearable system, users of other similar wearable systems in network communication with one or more servers or other computing devices with which the wearable system communicates, and so on).

In certain embodiments, the wearable system may use ray casting or cone casting techniques to determine the alignment between the target and the reticle. For example, the wearable system may cast a ray or a cone (which includes a volume transverse to the ray) and determine the alignment by detecting a collision between the ray/cone and the target. The wearable system may detect the collision if a portion of the ray/cone intersects with the target or when the target falls within the volume of the cone. The direction of the ray/cone may be based on the user's head or eye gaze. For example, the wearable system may cast a ray from a location that is in-between the user's eyes. The reticle may reflect a portion of the ray/cone. For example, the shape of the reticle may match the shape on a distal end of the cone (e.g., the end of the cone that is away from the user). Where the cone is a geometric cone, the reticle may have a circular or oval shape (which may represent a portion of the cone, such as a cross-section of the cone). In certain implementations, because the reticle is rendered in the rig space, as the user moves around, the wearable system may update the direction of the ray/cone even though the relative positions between the ray and the user's HMD do not change.

Once the wearable system determines that the user is looking at the target (e.g., because the reticle aligns with the target), the wearable system may begin to collect eye gaze data for purposes of calibration using, e.g., the inward-facing imaging system 630 (FIG. 6). In some examples, the wearable system may initially store the output of one or more eye tracking sensors or processing modules (e.g., the local processing data module) to a temporary data store (such as, e.g., a cache memory) that is routinely flushed. In response to determining that the user is indeed looking at the target, the wearable system may proceed to transfer the output data from the temporary data store to another data store such as, e.g., disk or another memory location for further analysis or for long term storage.

After the eye gaze data is collected, the system may either conclude the eye tracking calibration process, or may proceed to render another eye calibration target or reticle such that additional eye gaze data may be collected. For example, the wearable system may present the reticle 1352 at a different location within the user's FOV 1350 as shown in the scene 1320 in FIG. 13B after the wearable system has collected the eye data in the scene 1314 shown in FIG. 13A. In some embodiments, the wearable system may evaluate each frame collected against a set of criteria so as to determine whether each frame represents data that is suitable for use in eye tracking calibration processes. For a given frame, such an evaluation may, for example, include determining whether the user was blinking at the time of the collection of the frame, determining whether the target and reticle were adequately aligned with one another at the time of the collection of the frame, determining whether the user's eye was successfully detected at the time of the collection of the frame, etc. In these embodiments, the wearable system may determine whether a threshold quantity of frames (e.g., 120 frames) have been collected that satisfy the set of criteria and, in response to determining that the threshold quantity of frames has been met, the wearable system may conclude the eye tracking calibration process. The wearable system may proceed to render another eye calibration target or reticle in response to determining that the threshold quantity of frames has not yet been met.

Figure 13B:
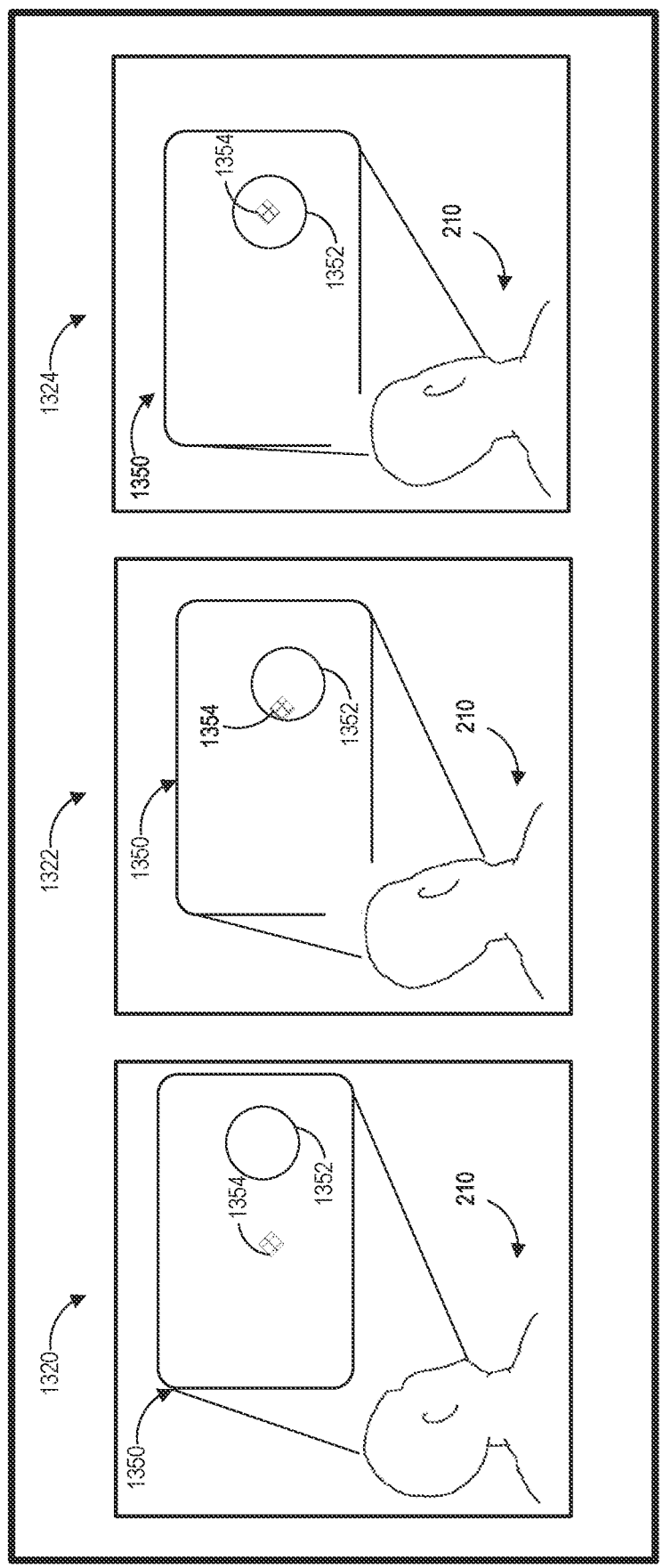
FIG. 13B illustrates an example of validating eye gaze where the reticle is rendered at an off-center location in the user's FOV.

FIG. 13B illustrates an example of validating eye gaze where the reticle is rendered at an off-center location in the user's FOV 1350. The location of the virtual reticle in FIG. 13B is different from the location of the virtual reticle in FIG. 13A. For example, in FIG. 13A, the location of the virtual reticle is at or near the center of the user's FOV, while in FIG. 13B, the location of the virtual reticle is off-center from the center of the user's FOV. Likewise, the location of the target is different in FIG. 13A (e.g., toward the top of the FOV) than the location of the target in FIG. 13B (e.g., at or near the center of the FOV). In FIG. 13B, three time-sequential scenes, 1320, 1322, and 1324 are shown. In this example, the reticle 1352 is rendered on the right side of the user's FOV 1350, and the target 1354 is rendered near the center of the user's FOV 1350. It may be seen that, from scene 1314 to scene 1320, the location in the user's FOV 1350 at which the reticle 1352 is rendered has been updated, but the location in the environment at which the target 1354 is rendered has remained substantially the same. To align the reticle 1352 with the target 1354, the user may rotate his or her head to the left so as to align the reticle with the eye calibration target (see example scenes 1322 and 1324). Once the wearable system has determined that the target 1354 is within the reticle 1352, the wearable system may begin to collect eye gaze data in a manner similar to the example described above with reference to FIG. 13A. If the user's eye gaze moves (e.g., such that the target and reticle are no longer sufficiently aligned), the wearable system may stop collecting eye gaze data, since the user is no longer looking at the target and any acquired data would be of lower quality.

In certain embodiments, the wearable system may calculate a target head pose at which the reticle 1352 is aligned with the target 1354. The wearable system may track the user's head pose as the user moves. Once the wearable system determines that the user has assumed the target head pose (e.g., the head pose shown in the scenes 1314 or 1324), the wearable system may determine that the target 1354 and the reticle 1352 are aligned and the wearable system may collect eye images when the head is at the target head pose.

E. Example Processes of Eye Tracking Calibration With Eye Gaze Validation

Figure 14A:
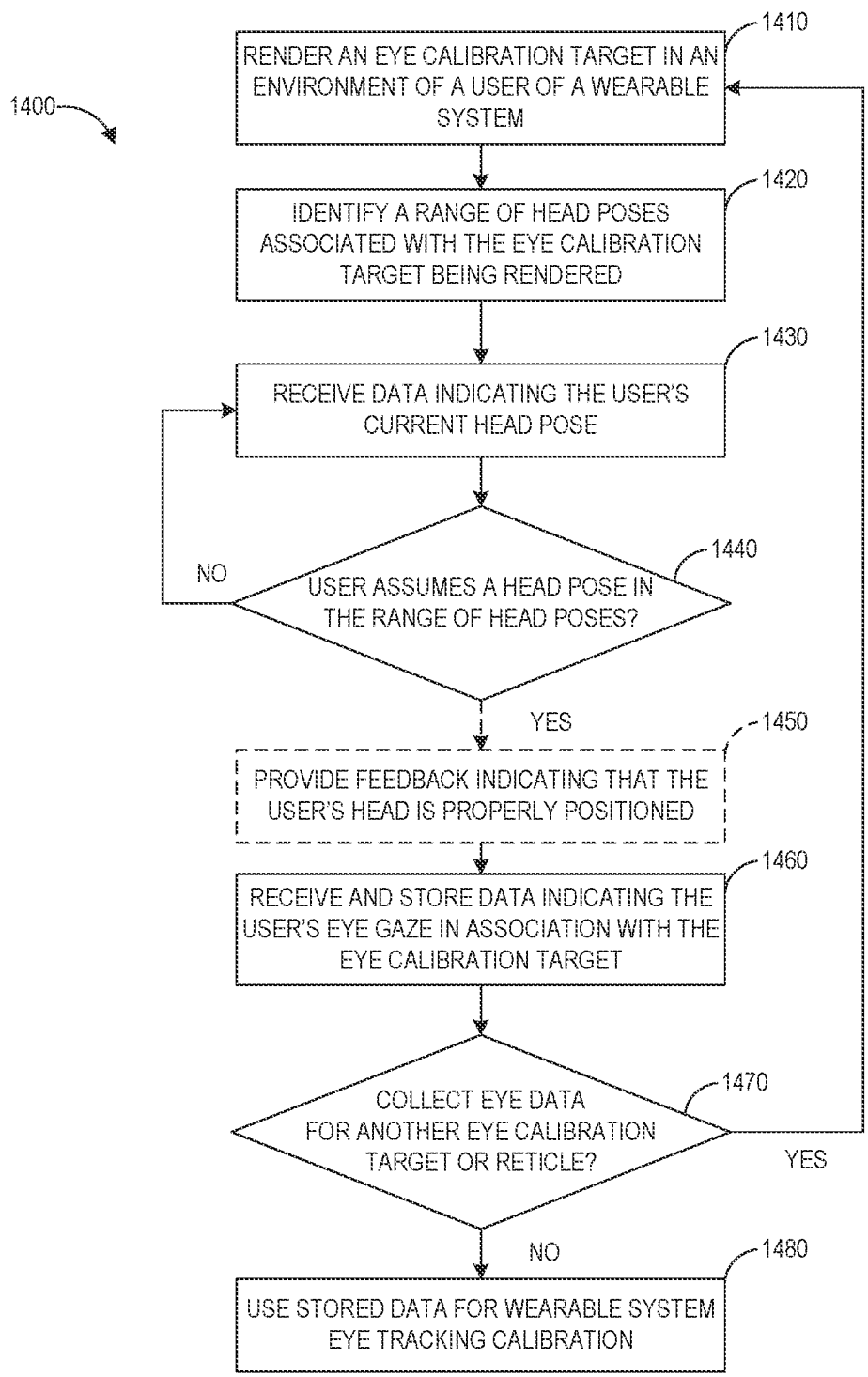
FIG. 14A illustrates a flowchart for an example eye-tracking calibration process with eye gaze validation.

FIG. 14A illustrates an example flowchart for an eye tracking calibration process with eye gaze validation. The example process 1400 may be performed by one or more components of the wearable system 200 such as, e.g., the remote processing module 270 or the local processing and data module 260, alone or in combination. The display 220 of the wearable system 200 may present the targets or reticles to the user, the inward-facing imaging system 630 (FIG. 6) may obtain the eye images for eye gaze determination, and IMUs, accelerometers, or gyroscopes may determine head pose.

At block 1410, the wearable system may render an eye calibration target in an environment of a user. The eye calibration target may be rendered in a world space (which may be represented by a coordinate system with respect to the environment. The eye calibration target may be represented in a variety of graphical forms, which may include 1D, 2D, and 3D images. The eye calibration target may also include still or moving images (such as, e.g., animations). With reference to FIG. 13A, the eye calibration target is schematically represented by a diamond.

At block 1420, the wearable system may identify a head pose range associated with the eye calibration target being rendered. A head pose range may include a plurality of head poses (e.g., 2, 3, 4, 5, 10, or more). A head pose may describe a position and an orientation of the user's head. The position may be represented by translational coordinate values. The orientation may be represented by angular values relative to a natural resting state of the head. For example, the angular values may represent the head tilting forward and backward (e.g., pitching), turning left and right (e.g., yawing), and tilting side to side (e.g., rolling). The wearable system may identify a range of head positions and a range of head orientations, which together may specify a range of head poses for which the reticle and target are deemed to be sufficiently aligned with one another. The bounds of such ranges may be seen as corresponding to thresholds. The head poses that fall within this range may correspond to target head poses in order for a user to align the target and the reticle while the reticle appears in different regions of the user's FOV. With reference to FIGS. 13A and 13B, the range of head poses may encompass head poses 1314 and 1324, and the wearable system may determine that the head positions and orientations corresponding head poses 1314 and 1324, respectively, fall within the identified range of head positions and range of head orientations, and thus satisfy one or more thresholds or other requirements of sufficient reticle-target alignment.

The wearable system may track the head poses using sensors internal to an HMD such as, e.g., an IMU or an outward-facing imaging system (e.g., to track a reflected image of the user's head) or external to the HMD (such as, e.g., a camera mounted to a wall in the user's room). At block 1430, the wearable system may receive data indicating the user's current head pose. The data may include the current position and orientation of the user's head or the movements of the user's head in the 3D space. For example, in FIG. 13A, as the user moves the head from the position shown in the scene 1310 to the position shown in the scene 1314, the wearable system may track and record the user's head movements.

At block 1440, the wearable system may determine, based on the data acquired from block 1430, whether the user has assumed a head pose that falls within the identified range of head poses. The wearable system may determine whether the user's head pose is at a position or orientation that may cause the reticle to align with the target. As an example, the wearable system may determine whether both the head position and head orientation associated with the user's head pose fall within the identified range of head positions and the identified range of head orientations. The wearable system may make such a determination by comparing the head position associated with the user's head pose with threshold values that define the bounds of the identified range of head positions (e.g., translational coordinate values), and by comparing the head orientation associated with the user's head pose with threshold values that define the bounds of the identified range of head orientations (e.g., angular values). With reference to FIG. 13A, the wearable system may determine whether the user has assumed the head pose shown in 1314. If the user has not assumed a head pose that falls within the identified range of head poses, and thus has not assumed a head pose for which the reticle and the target are deemed to be sufficiently aligned with one another, the wearable system may continue acquire and analyze data associated with the user's head pose as shown in block 1430.

Optionally at block 1450, the wearable system may provide the user with feedback (e.g., visual, audible, haptic, etc.) to indicate that the user's head is properly positioned. For example, the visual feedback may include a color change or blinking effect of the target or the reticle which may indicate that the user's head is properly positioned such that the reticle aligns with the target by causing the reticle and/or eye calibration target to blink or change color. In some embodiments, blocks 1410-1450 are part of an eye gaze validation process.

If it is determined that the user's head is in one of the identified head poses, at block 1460, the wearable system may receive and store data indicating the user's eye gaze in association with the eye calibration target. Within the context of FIG. 13A, when the wearable system detects that the users head pose is at the position and orientation shown in the scene 1314, the wearable system may receive and store data from one or more eye tracking sensors (e.g., eye cameras in the inward-facing imaging system 630 (FIG. 6)).

At block 1470, the wearable system may determine whether additional data should be collected during the eye tracking calibration. For example, the wearable system may determine whether eye images at another eye gaze direction should be collected to update or complete the calibration process. If it is determined that additional eye calibration data should be collected, the wearable system may go back to block 1410 to repeat the process 1400. With reference to FIGS. 13A and 13B, for example, the wearable system may render the target 1354 as shown in the scene 1322 after the wearable system has collected the eye images when the user 210 is in the position illustrated in the scene 1314.

In certain embodiments, even though the user is indeed gazing at the target, the images acquired by the wearable system may be deemed unsatisfactory (e.g., because the user blinks). As a result, the process may go back to the block 1460 to take additional images.

If it is determined that additional eye calibration data does not need to be collected, at block 1480, the wearable system may conclude the process 1400 and use the stored eye gaze data for eye tracking calibration. For example, the stored data may be used to generate the mapping matrix described above.

Figure 14B:
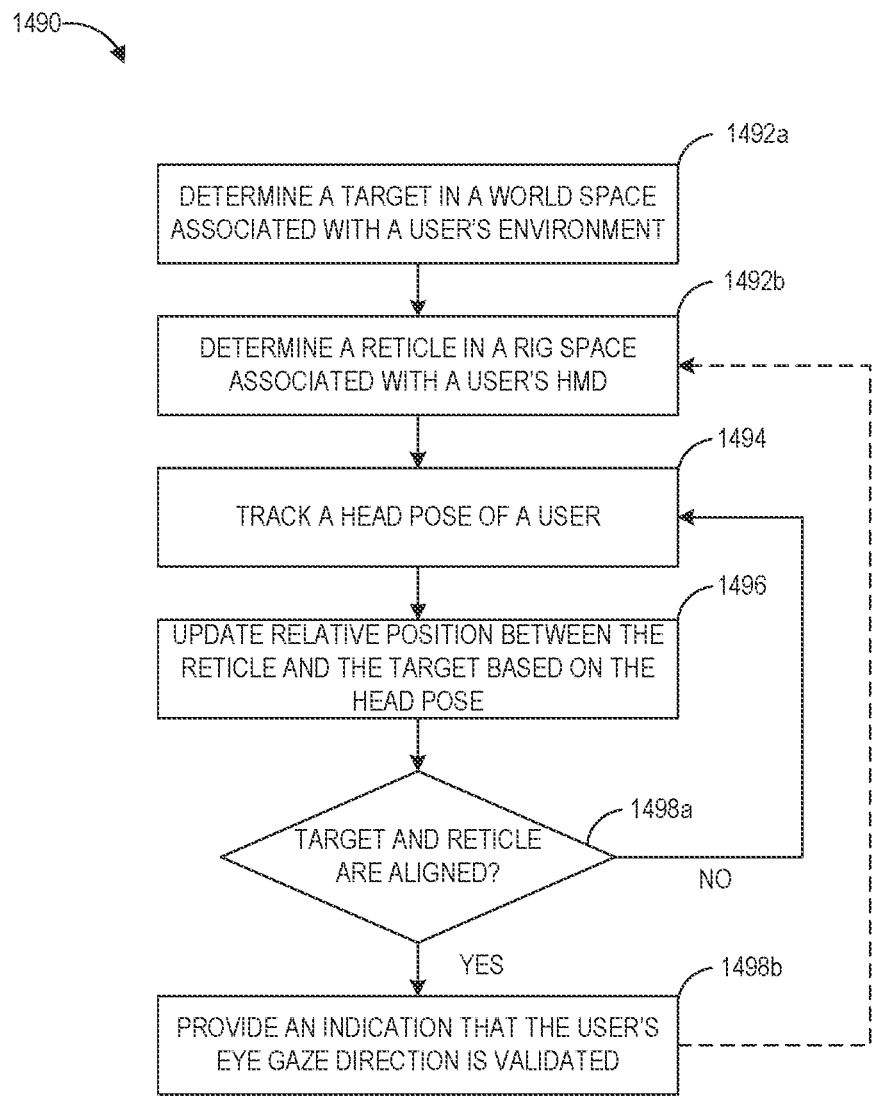
FIG. 14B illustrates a flowchart for an example eye gaze validation process.

FIG. 14B illustrates an example eye gaze validation process. The example process 1490 may be performed by one or more components of the wearable system, such as, e.g., the remote processing module 270 and the local processing and data module 260, alone or in combination. The wearable system may include an HMD. The display 220 of the wearable system 200 may present the targets or reticles to the user, the inward-facing imaging system 630 (FIG. 6) may obtain the eye images for eye gaze determination, and IMUs, accelerometers, or gyroscopes may determine head pose.

At block 1492a, the wearable system may determine a target in a world space associated with a user's environment. The target may be fixed at a given position in the world space. The target may be a virtual object rendered by the display 220 or a physical object in the user's environment (e.g., a vase, a shelf, a pot, a book, a painting, etc.). The virtual target may have a variety of appearances as described with reference to FIGS. 12A, 12B, and 18. The world space may include the world map 920 shown in FIG. 11B. The location of the target in the world space may be represented by a position in a 3D world coordinate system.

At block 1492b, the wearable system determines a reticle in a rig space associated with the user's HMD. The reticle may be rendered by the HMD at a predetermined location in the user's FOV. The rig space may be associated with a coordinate system separate from the world coordinate system.

At block 1494, the wearable system may track a head pose of a user. The wearable system may track the head pose based on an IMU or an outward-facing imaging system in the user's HMD. The wearable system may also track the head pose using other devices, such as a web camera in the user's room or a totem (which may be configured to image the user's environment). As the user's head pose changes, the relative position between the reticle and the target may also change.

At block 1496, the wearable system may update the relative position between the reticle and the target based on the head pose. For example, where the target is to the right of the reticle and the user turns his or her head rightward, the reticle may appear to become closer to the target. However, if the user turns his or her head leftward, the reticle may appear to move farther away from the target.

At block 1498a, the wearable system may determine whether the target and the reticle are aligned. The alignment may be performed using ray/cone casting. For example, the wearable system may cast a ray from the reticle and determine whether the target intersects with the ray. If the target intersects the ray, the wearable system may determine that the target and the reticle are aligned. The wearable system may also determine an offset between a position in the rig space and a position in the world space based on the user's head pose. The wearable system may align the location of the target in the world space and the location of the reticle in the rig space by applying the offset to the reticle (or to the target) and determine the position of the reticle coincide with the position of the target. In some situations, the offset may be used to translate the position of the reticle from the rig space to a corresponding position in the world space. The alignment between the reticle and the target may be determined based on the coordinate values of the reticle and the target with reference to the world space.

If the target and the reticle are not aligned, the wearable system may continue tracking the head pose at block 1494. If the target and the reticle are aligned, the wearable system may determine that the user is indeed looking at the target and can, at block 1498b, provide an indication that the user's eye gaze direction is validated. The indication may include an audio, visual, or tactical effect.

In some embodiments, the wearable system may present a series of reticles (e.g., each in a different eye gaze region shown in FIG. 12B) for eye tracking calibration. As a result, after block 1498b, the wearable system may optionally restart at the block 1492a and present the reticle at a new location in the rig space. The user may attempt to align the reticle at the new location with the target again by changing the user's head pose.

F. Example Object Movement

Long eye calibration processes may be fatiguing for users. Additionally, lengthy eye calibration processes may result in users becoming distracting during calibration, resulting in poor data quality for the eye calibration. The length of an eye calibration process may be dictated by the speed of movement of an eye calibration target and the ability of a user to track the movement of the eye calibration target. Additionally, the human eye may overshoot the eye calibration target, necessitating corrective eye movements to align an eye gaze with the location of the eye calibration target. These corrective eye movements may add to the length of the eye calibration process and additionally increase user fatigue. Apart from calibration targets, similar discomfort may result when users are presented with virtual objects that move, for example, at a constant speed, and then abruptly stop.

Figure 15A:
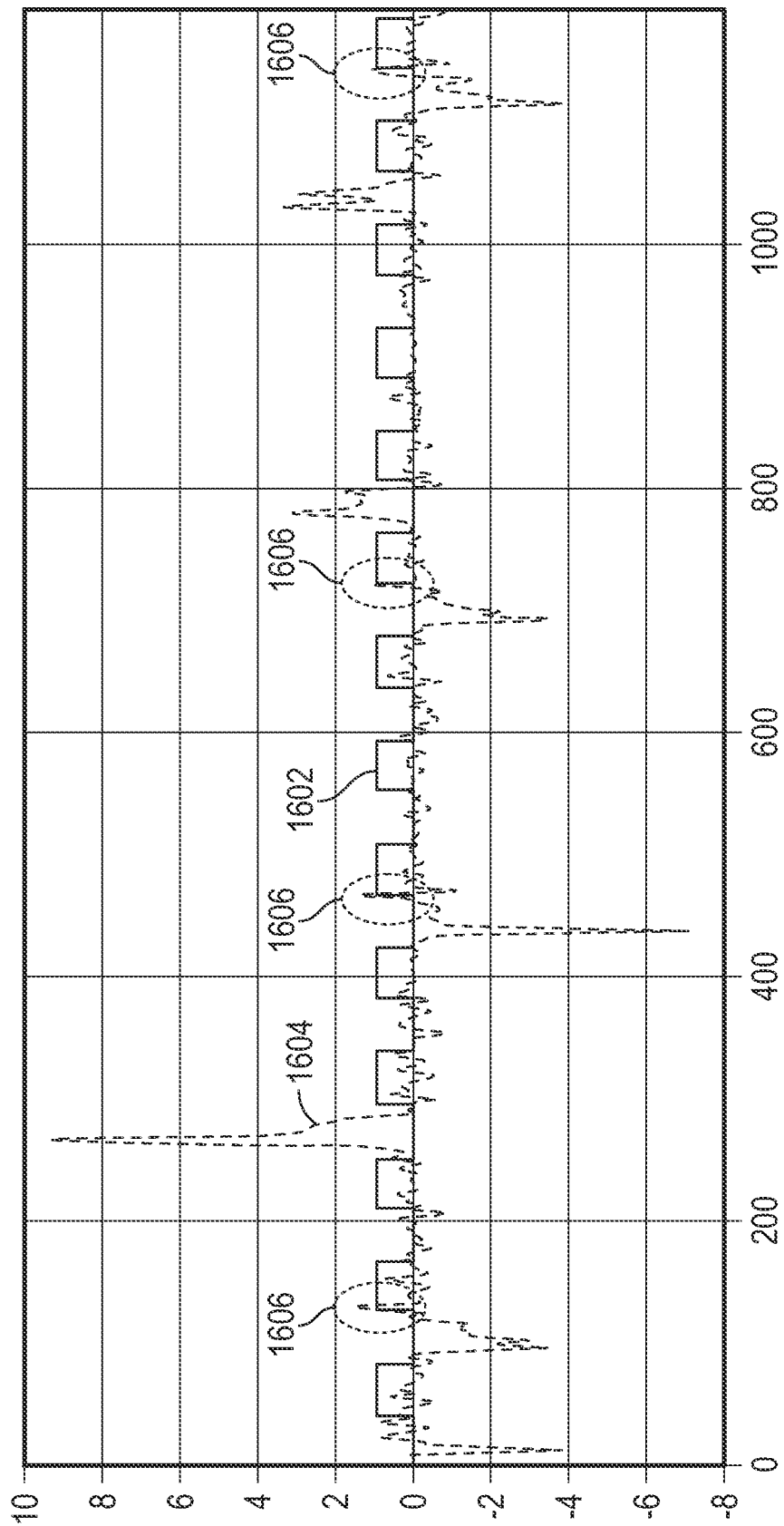
FIGS. 15A and 15B illustrate graphs of an example of pupil velocity as a function of time as an eye moves to track a moving target.

FIG. 15A show graphs of an example pupil velocity 1604 as a function of time for an eye presented with a moving virtual object, or eye target. For example, the target may be displayed to a user in one or more locations in their field of view, such as by a head mounted display of a display system. The target may move periodically and with constant speed from one location to another. As illustrated in FIG. 15A, the target may move with abrupt starts and stops that make out a square wave, as represented by line 1602. From a stop, the eye tracks the moving target with velocity 1604. This velocity 1604 may vary as the target is moved. As illustrated in FIG. 15A, the velocity 1604 of the eye may have a slight local peak 1606 when the target comes to rest. The peak 1606 is understood to correspond to an eye overshoot. The eye overshoot may occur when the eye continues to travel past the location of the resting target and then corrects and travels back to the location of the resting target. In calibration systems with a target moving at constant speed between target locations, the rest time for the target (in other words, the time at each target location between target movements) may take into account the time it takes for an eye to make this overshoot correction. As discussed above, the added time and corrective eye movements as a result of overshoot may cause discomfort and fatigue for the user, result in more inaccurate calibration, and/or prolong the calibration process.

Figure 15B:
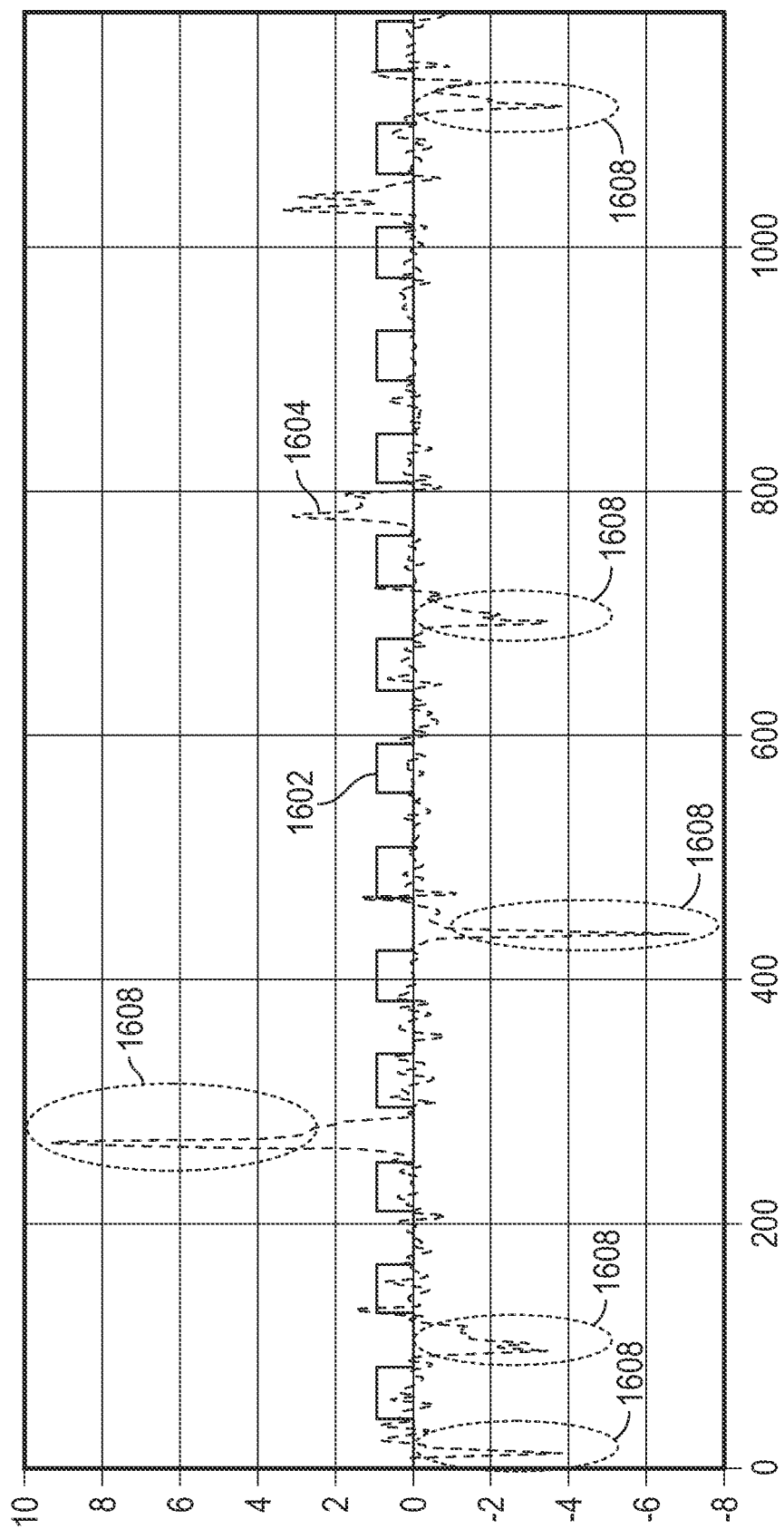

FIG. 15B illustrates the same graph as FIG. 15A, but is provided with labels for different parts of the graph to facilitate discussion of those parts. As illustrated in FIG. 15B, a target may move with a period represented by line 1602. The velocity 1604 of an eye tracking the target may have increased speed when an eye target first moves. For example, as illustrated in FIG. 15B, an eye velocity 1604 may have a peak 1608 at the beginning of travelling to a new target location. Without being bound by theory, as shown in FIG. 15B, the human eye is believed to be able move fast angularly and/or have increased speed when first beginning to move its gaze to a new target location. However, as also shown in FIG. 15B, the human eye is believed to less quickly respond by stopping at the stationary endpoint of a target movement.

In some embodiments, systems and methods are provided for moving eye targets that may help reduce time and fatigue involved with the viewing of virtual objects that a user's eyes are expected to track. For example, the eye target movement process disclosed herein may adjust the speed of movement of virtual objects based upon target position and/or depth. For example, rather than moving virtual objects at a constant speed, the display system may present a virtual object such that its movement progressively decreases in speed as it gets closer to an end position at which the virtual object stops moving. Without being bound by theory, this is believed to enable greater stability in eye movement and to reduce the occurrence of a correction by the eye due to eye overshoot. Advantageously, this may result in a significant reduction of total eye calibration duration and may help reduce eye fatigue and/or contribute to higher eye calibration quality. Additionally, shorter eye calibration may result in less distraction and less eye fatigue, which in turn contributes to higher eye calibration quality.

Figure 16:
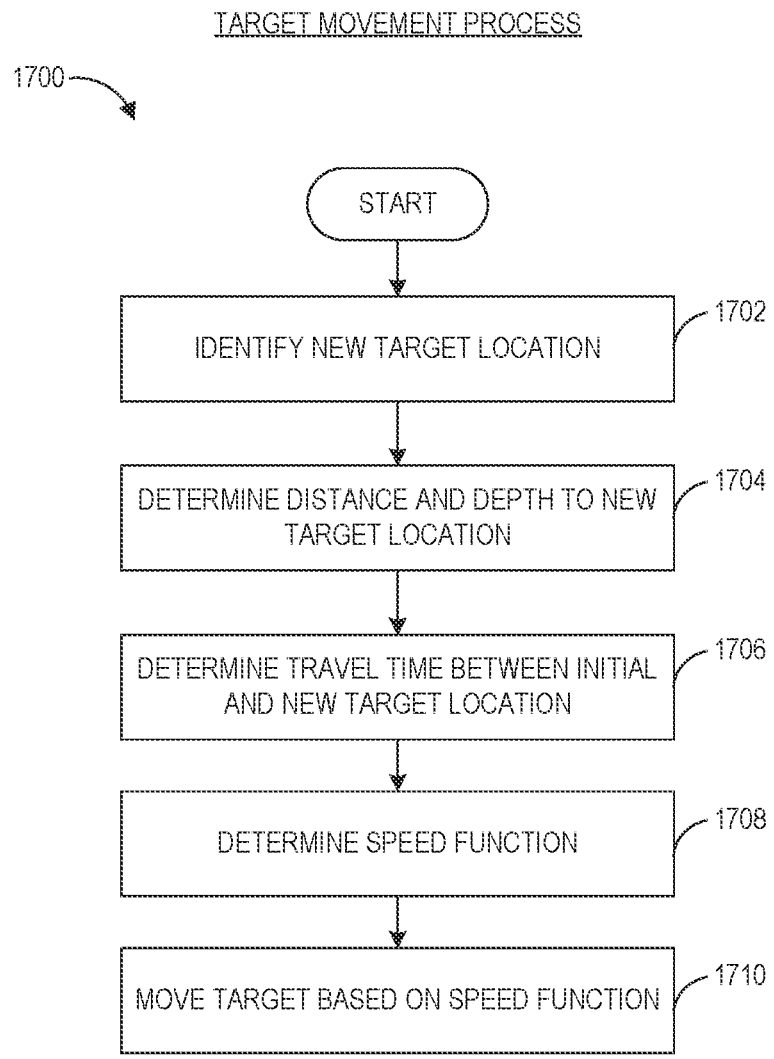
FIG. 16 illustrates an example virtual object movement process that may be implemented by an augmented reality display system.

With reference now to FIG. 16, an example is illustrated of a virtual object movement process 1700 that may be implemented by a display system 60 (such as illustrated in FIG. 9E). It will be appreciated that the virtual object may be at an initial target location, or a first target location. At block 1702 of process 1700, a display system may identify a new target location, or a second target location, for the virtual object to move to. For example, the initial target location may be a first perceived 3D location of the user's 3D environment, and the new target location may be a new perceived 3D location of the user's 3D environment. Preferably, the new target location is within the user's field of view, such that the user does not need to move his/her head in order to perceive an object at the new location.

With continued reference to FIG. 16, at block 1704, the display system may determine a distance and/or depth from the initial target location to the new target location for the virtual object. In some examples, the distance may include an angular distance between the initial target location and the new target location as perceived by the user. In some embodiments, a vertex, point of reference, defining the angle for determining the angular distance may be a point associated with the user or the user's gaze, such as a center of rotation of a user's eye or a point on a head mounted display worn by the user that is configured to display the eye target(s), such a point between the user's eyes. It will be appreciated that angular distance may be used to define distances extending across (laterally and/or vertically) the user's field of view. Preferably, the angular distances define distances between locations on the same depth plane. In some embodiments, the angular distances define distances between locations displaced laterally and/or vertically within the user's field of view and also across two or more depth planes.

Figure 17:
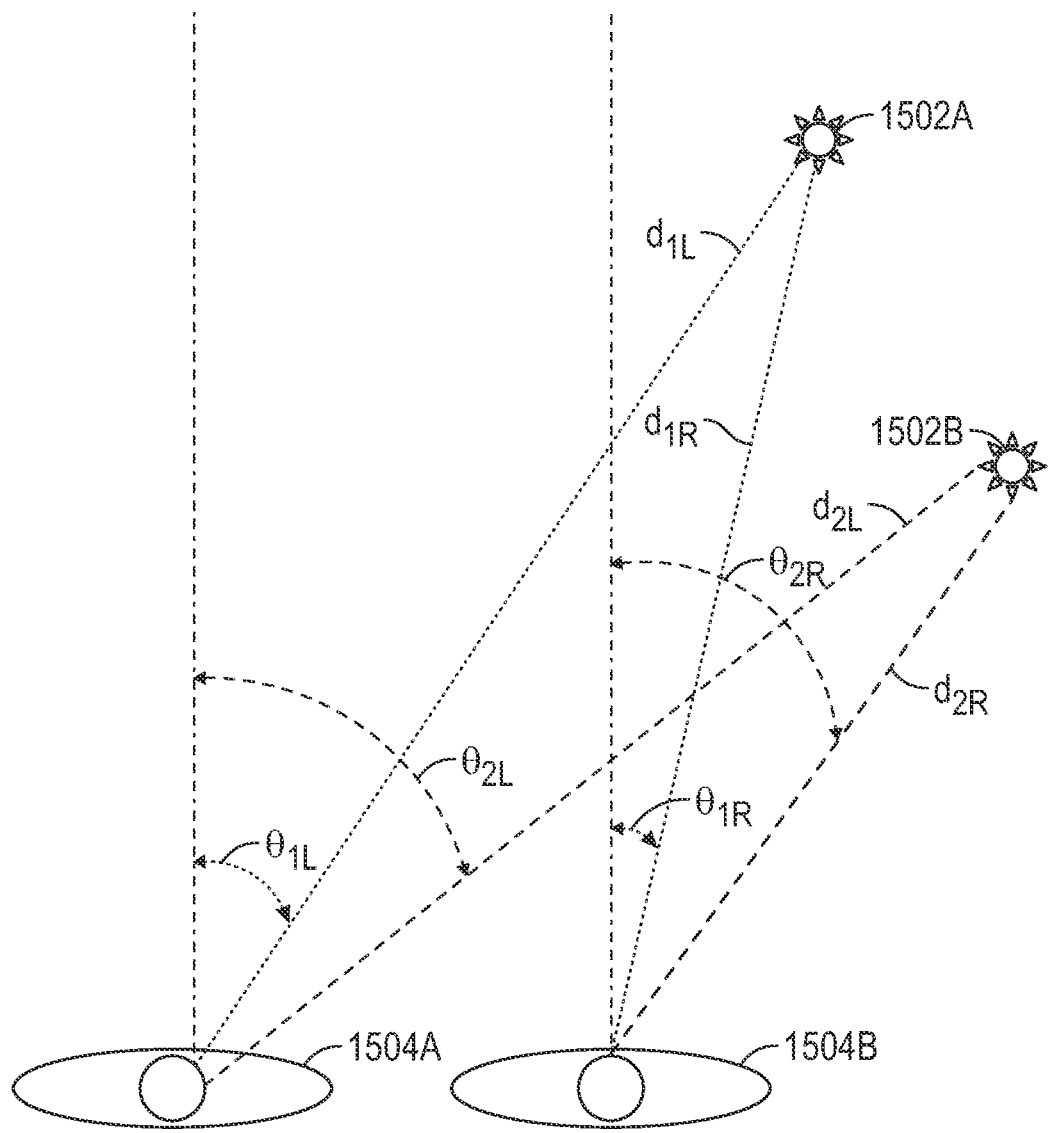
FIG. 17 illustrates an example of a general framework for describing the movement of virtual objects between two locations.

In some examples, instead of angular distance and where the initial and new target locations traverse two or more depth planes, the distance between the initial and new target locations may be referred to as a distance in diopters (or simply, diopters). In some examples, a depth may include a distance from the point of reference for distance determinations (e.g., the user's eye). For example, the distance may be a linear distance from the point of reference extending out into the user's environment. As discussed herein, FIG. 17 illustrates an example of distance and depth of a target at a first and second location.

With continued reference to FIG. 16, at block 1706, the display system may determine a travel time for the eye target to move from the initial target location to the new target location. In some examples, the travel time may be an estimate of the amount of time it takes for a user's eye to comfortably move from the initial target location to the new target location. As described herein, the travel time may be estimated based on the diopter and/or angular difference between the two locations. In some embodiments, the travel time may be a desired travel time, and the speed curve or function discussed herein may be fitted within this travel time to increase viewing comfort given the constraint of the desired travel time.

At block 1708, the display system may interpolate a speed function or position of the eye target as a function of time. In some examples, an interpolation for an eye target may include a mathematical function that allows a target to gradually speed up to a maximum speed and then gradually slow down to come to rest at the new target location. As described herein, a plot of the speed interpolation preferably takes the form of an S-curve. In some embodiments, a speed of the target may be interpolated from the S-curve with interpolation parameters associated with the travel time determined at block 1706 and/or the diopter distance or depth. In some examples, an interpolation parameter associated with the diopter distance may be a function of the inverse of the diopter distance. Advantageously, without being limited by theory, this inverse relationship is believed to account for different responses of the eye to accommodation changes with distance from the user.

At block 1710 of process 1700, the display system may move the eye target based on the interpolation (or speed function), which preferably defines an S-shaped speed plot. For example, the display system may move the target along a designated path from the initial target location to the new target location. The designated path may be the shortest path between the two points or may be a longer path (e.g., the designated path may be a linear path or path having turns or curves in different directions). In an eye calibration example, the display system may move the target to a new point in the 3D environment of the user that may be calculated by an eye calibration system in order to provide an accurate eye calibration. The movement may have a speed and/or acceleration according to the interpolation calculated in block 1708.

G. Example Travel Time Calculation

As discussed herein, in some embodiments, the travel time for movement of a virtual object from an initial (or first) target location to a new (or second) target location may be a predefined, set travel time into which an S-shaped speed curve is fitted. Preferably, this predefined, set travel time is sufficiently long that the user's eyes may be expected to comfortably move or change accommodation states to track the virtual object. For example, the set travel time may be sufficiently long that the eyes of the majority or all of a population of users are able to move sufficiently fast or change accommodation that they may comfortably traverse the desired distance between the first and the second locations.

In some other embodiments, it will be appreciated that different user's eyes may naturally move or change accommodation at different speeds. As a result, the display system may customize the travel time for different users and determine the amount of time for a target to travel or move between an initial (or first) target location and a new (or second) target location. In some examples, the determined travel time may reduce eye-tracking time while maintaining a certain, desired level of tracking accuracy. In some embodiments, as discussed herein, the calculation of the travel time may take into account various parameters. Examples of parameters include whether the distance to be traversed by the virtual object is a distance extending across the user's field of view (e.g., an angular distance), or a distance along the z-axis extending along the user's line of sight (e.g., a distance in depth away from or towards the user). Other parameters, which may be used to adjust or provide correction factors in the travel time calculation, include the innate speed at which a user's eyes may move or change accommodation states, the magnitude of the distance between the initial and new target locations, and/or the user's age, gender, eye health, etc.

FIG. 17 illustrates an example of a general framework for describing the movement of virtual objects between two locations. As discussed herein, a virtual object may be provided at a first target location 1502a and moved to a second target location 1502b. In some examples, θ1L and θ1R may refer to tangential angles of left and right eyes, respectively, of a user to a first target location 1502a. Similarly, θ2L and θ2R may refer to tangential angles of the left and right eyes, respectively, to the second target location 1502b. In some examples, d1L and d1R may refer to the distance to the first target location 1502a from the left and right eyes, respectively. Similarly, d2L and d2R may refer to the distance to the second target location 1502b from the left and right eyes, respectively.

It will be appreciated that an eye may take a certain amount of time to move angularly. f(θ) may denote a target tracking function associated with a time for an eye to track a target from 0 to angle θ. As a result, the time for a left eye of a user to track a target from the first target location 1502a to the second target location 1502b may be expressed as:

$$t_L = |f(\theta_{2L}) - f(\theta_{1L})| \qquad (1)$$

Similarly, the time for a right eye of a user to track a target from the first target location 1502a to the second target location 1502b may be expressed as:

$$t_R = |f(\theta_{2R}) - f(\theta_{1R})| \tag{2}$$

In some embodiments, an eye may take a certain amount of time to focus on a target at a distance from the eye. In some examples, the eye may take longer to focus between targets or locations that have a greater disparity in distance from the eye. $g(\xi)$ may denote a function that measures a minimum time for the eye to focus from infinity to $\xi=1/d$, where d is the distance from the eye. Then, a time for a left eye to focus on a target moved from the first target location 1502a to the second target location 1502b may be expressed as:

$$t_{d\_L} = |g(1/d_{2L}) - g(1/d_{1L})| \tag{3}$$

Similarly, a time for a right eye to focus on a target moved from the first target location 1502a to the second target location 1502b may be expressed as:

$$t_{d\_R} = |g(1/d_{2R}) - g(1/d_{1R})| \tag{4}$$

In some embodiments, the determined time for the user to track a target from the first target location 1502a to the second target location 1502b may take into account the amount of time for the user's left and right eyes to angularly move from the first target location 1502a to the second target location 1502b and the amount of time for the user's left and right eyes to change accommodation to focus on a target moved from the first target location 1502a to the second target location 1502b. For example, a target tracking time may be a maximum of the relevant angular movement and focus times:

$$t_{max} = \max(t_L, t_R, t_{d\_L}, t_{d\_R}) \tag{5}$$

In some examples, the target tracking time may be a different function of the angular movement and focus times. In some examples, the target tracking time may be a function of fewer or more input times relevant to eye tracking and/or focus on a target.

H. Example Virtual Object Tracking Function

A virtual object or target tracking function $f(\theta)$ may be determined based on one or more parameters or assumptions associated with an eye of a user or the general population. An assumption that may be utilized to determine the target tracking function may include that the time that an eye needs to track a target from a first location to a second location is monotonically increasing. Another assumption that may be utilized to determine a target tracking function may include that the time will be proportional to the angle $\theta$ for small angles of $\theta$. Another assumption that may be utilized to determine a target tracking function may include that there is more strain to the eye to track a target at larger angles. Accordingly, the assumption may include that more time may be needed for tracking than may be accounted for in a simple linear relation.

Figure 18B:
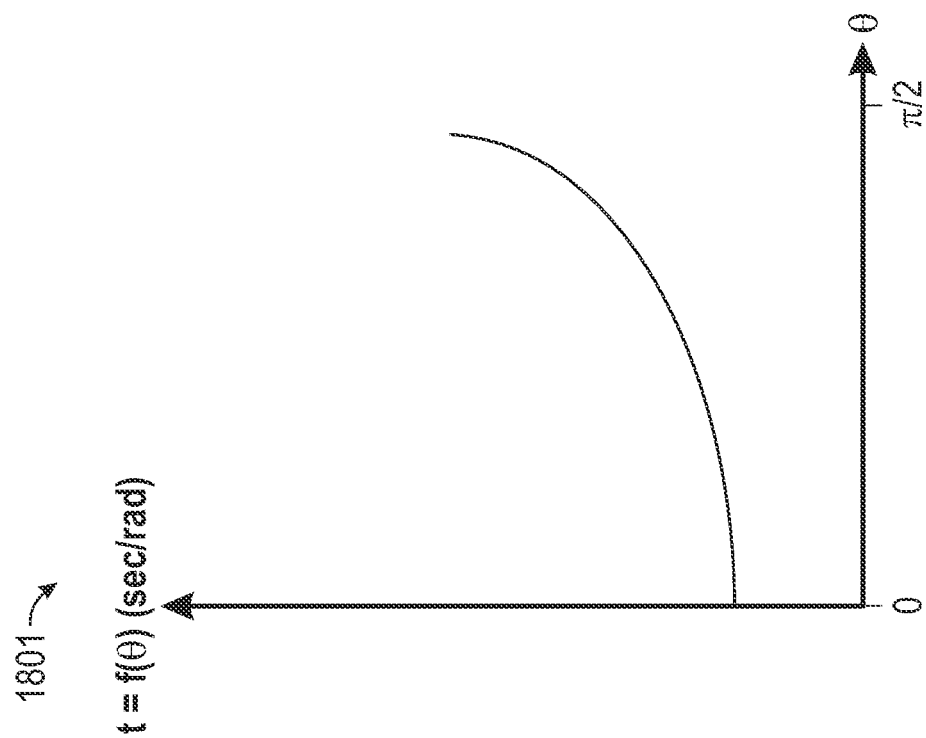
FIGS. 18A and 18B illustrate an example target tracking function and its derivative, respectively, as a function of angular distance from a first target location to a second target location.
Figure 18A:
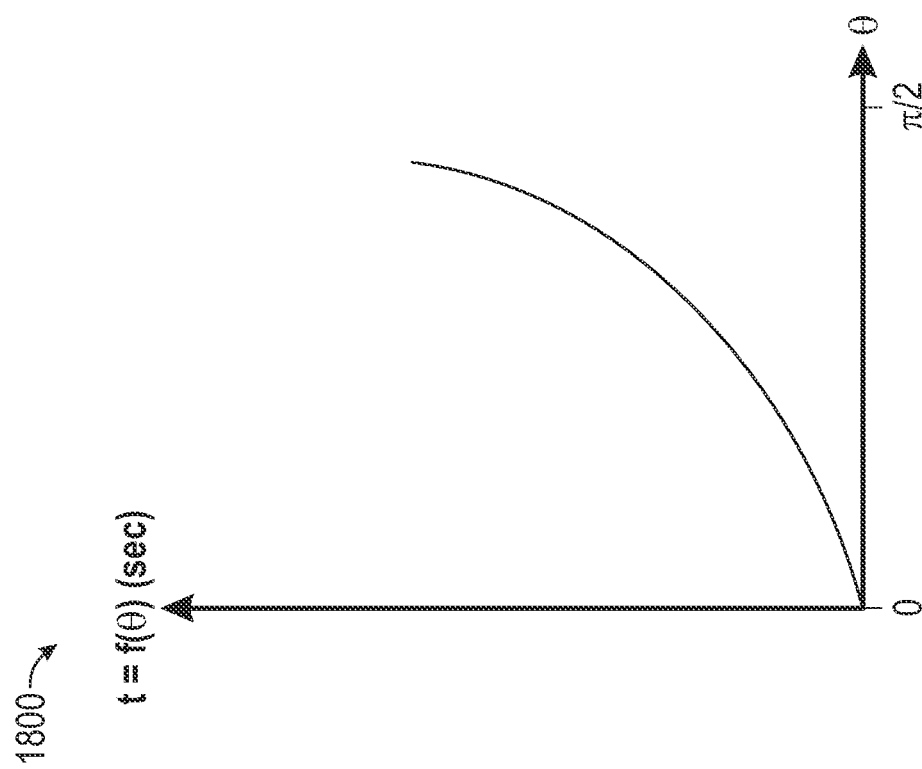

FIGS. 18A and 18B illustrate an example target tracking function $f(\theta)$ in graph 1800 and its derivative $f'(\theta)$ in graph 1801 respectively. In some examples, the target tracking function $f(\theta)$ may have similar behavior to $\tan(\theta)$ and its derivative $\sec2(\theta)$. Accordingly, in some embodiments, the display system may have a first approximation of the target tracking function $f(\theta)$ as $\tan(\theta)$.

In some embodiments, the time for an eye to change focus between two locations at different distances to the user may be approximated to be roughly proportional to the inverse of the distance between the two locations. In other words, an eye focus eye function $g(\xi)$ may be inversely proportional to the distance or linearly proportional to $\xi$.

In some examples, the approximation of the target tracking function $f(\theta)$ or focus function $g(\xi)$ may be updated or tuned based on parameters associated with a user. For example, a tuning parameter may tune the target tracking function to more closely model a comfortable pace of movement and/or duration for a change of focus of a particular user's eye. A tuning parameter may be determined based on any number of observed, tested, or approximated parameters associated with a user's ability to track a target. For example, one or more tuning parameters may be determined based on meta information associated with the user, such as age, gender, eye health, or other parameters associated with an eye of the user. Where meta information of the user is associated with slower eye tracking, one or more tuning parameters for the target tracking function may slow the target movement accordingly. Where meta information of the user is associated with faster eye tracking, one or more tuning parameters for the target tracking function may speed up the target movement accordingly. In some examples, a user may be categorized into one or more types of users based on the meta information, such as a fast tracking eye, normal tracking eye, or slow tracking eye. However, other categorizations are possible. For example, a user may be categorized into a mixed categorization, such as a fast angular tracking and a regular focusing eye or a slow angular tracking and a regular focusing eye or other categorization.

In some embodiments, a display system may determine an eye tracking time t based on measurements. For example, by inverting $t=f(\theta)$, a display system may obtain $\theta=finv(t)$. An angular velocity $\omega$ may be obtained by taking the derivative of the inverse function finv(t) with respect to t:

$$\omega = P(\theta) = df_{inv}(t)/dt \tag{6}$$

Figure 19:
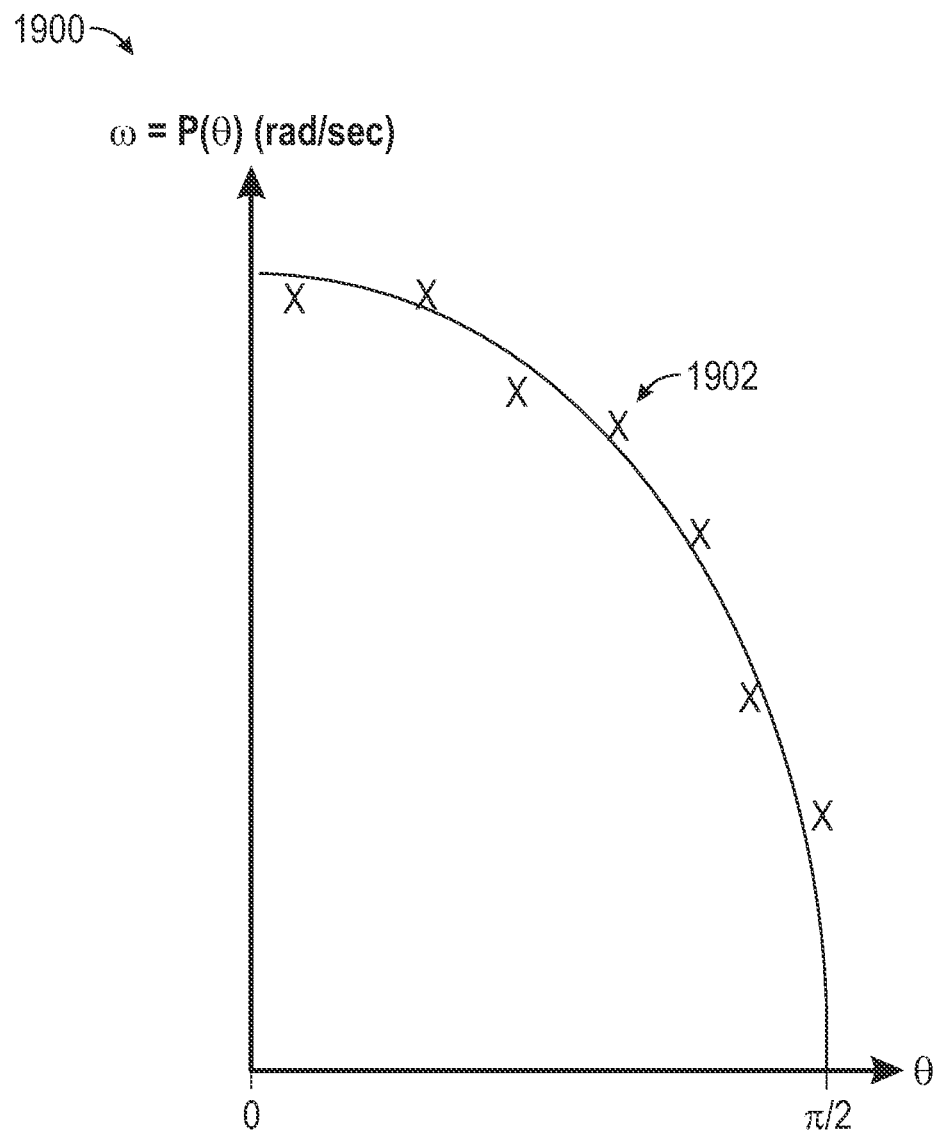
FIG. 19 illustrates an example angular velocity of an eye tracking target as a function of time.

FIG. 19 illustrates an example modeled angular velocity 1900 as a function of $\theta$ based on the inverse function. A display system may measure one or more angular velocities of a user's eye from an angle or point of origin, such as directly ahead of a user or at 0, to a point at a tangential angle $\theta$. In some examples, the display system may measure an angle velocity of a user's eye at progressive points between 0 and 90 degrees. However, other ranges of angles are also possible. The display system may measure any number of angular velocities associated with any number of tangential angles, such as 3 angular velocities at progressive angles between 0 and 90 degrees, 5 angular velocities at progressive angles between 0 and 90 degrees, 7 angular velocities at progressive angles between 0 and 90 degrees, or another combination of angular velocities, progressive angles, or range of angles.

The display system may fit the modeled angular velocity based on the measured angular velocities. Since $\omega=d\theta/dt$, a display system may determine a time $t=f(\theta)$ relation as:

$$t = \int_0^\theta \frac{d\theta}{P(\theta)} \tag{7}$$

Accordingly, by measuring an angular velocity over a number of angle ranges, the display system may determine an eye tracking time.

I. Example Virtual Object Position as a Function of Time

Over a period of the virtual object travel time, such as a travel time or virtual object tracking time determined above, the display system may move the virtual object at variable speeds. In some examples, the display system may move the virtual object from an initial (or first) target location to a new (or second) target location at a pace that approximates the naturally comfortable movements of the human eye. For example, the display system may move a virtual object (also referred to as a target) from the initial target location to the new target location with a relatively fast initial speed and slow down as it reaches the second location.

Advantageously, by utilizing a variable speed as opposed to a constant speed, movements for virtual objects nearby in angular space and/or depth may require less time, thus reducing overall calibration time during a calibration session utilizing a variable speed. For example, the maximum speed and average speed of the variable speed movement may be higher than the constant speed and/or eye overshoot may be avoided. Additionally, the time for movement may be adjusted according to the angle and/or distance movements of the virtual object. This may allow for the display system to give extra time when needed for user comfort and to trim unnecessary time. Additionally, a user may gain predictability in a final destination through the slowing down of virtual object movement as it approaches a destined location. Advantageously, this may improve comfort for a user in tracking a virtual object and/or reduce overall calibration time during a calibration session because it may reduce eye overshoot of the virtual object as it reaches the destined location.

In some examples, the display system may estimate the position of a virtual object or target as a function of time through interpolation. The display system may interpolate the coordinates of the virtual object as a function of time based on one or more parameters associated with a variable speed. FIG. 20 illustrates an example interpolation 2000. The interpolation function 2000 may be associated with an S-curve that may have interpolation parameters t and s, corresponding to the horizontal and vertical axes respectively. The interpolation will map the virtual object to an initial (or first) target location and first time (s=0 and t=0, respectively) and to a new (or second) target location and second time (scaled so that s=1 and t=1). When t changes uniformly, s changes non-uniformly. For example, s may change slowly, change more quickly, and then change slowly approaching 1 as t changes uniformly from 0 to 1. In some embodiments, the behavior of s relative to t may be understood to be a slow and progressive initial increase in speed of movement of the virtual object at the initial target position, up to a maximum speed, and then a gradual, progressive, reduction in speed as the virtual object comes to rest at the new target location. The relationship between t and s may be expressed as:

$$s=B(t) \quad (8)$$

where B(t) is a function determined by a curve, such as illustrated in FIG. 20.

Any number of curves may be used for the interpolation function, such as one or more splines curves. For example, the one or more spline curves may include one or more Cubic Bezier Splines curves, Hermite Splines curves, or Cardinal Splines curves. In the example illustrated in FIG. 20, two Cubic Bezier curves are used for the interpolation function. Points 2004 illustrate example curve points in uniform intervals. Control points 2002 for one or more curves of the interpolation may be adjusted by the display system in order to connect the one or more curves smoothly.

Since an eye provides more attention when objects are closer, it is more appropriate to approximate the interpolation according to the inverse of the distance than merely the distance. Hence, a z-coordinate of an interpolated point with a parameter s may be approximated as:

$$1/z = (1-s)1/z_1 + s 1/z_2 \quad (9)$$

Where $z_1$ and $z_2$ are the z-coordinates of the initial target location and the new target location, respectively. In some embodiments, in displays with finite numbers of depth planes, $z_1$ and $z_2$ may correspond to the depth planes on which the initial target location and the new target location are disposed. In some embodiments, where there are limited numbers of depth planes such that $z_1$ and $z_2$ are present with wavefront divergence corresponding to the same depth plane even if they are intended to be perceived to be at different z distances, $z_1$ and $z_2$ may be understood to be equal. This may occur since the same amount of wavefront divergence will be expected to provide the same accommodation state, such that the eyes would not need to change accommodation states between $z_1$ and $z_2$.

If a linear interpolation parameter u is defined as:

$$z=(1-u)z_1+uz_2 \quad (10)$$

the linear parameter is obtained as:

$$u = \frac{Z_1 S}{Z_1 S + (1-S)Z_2} \quad (11)$$

Similar to parameters t and s, the linear parameter u may be 0 at the initial target location and 1 at the new target location. An interpolated point with the linear parameter u may be approximated as:

$$P(t)=(1-u)P_1+uP_2 \quad (12)$$

Where P1 and P2 are the coordinates of the virtual object at the initial target location and the new target location, respectively. Additionally, P(t) may be an interpolated point when the uniform parameter t changes from 0 to 1. The linear parameter u may be calculated based on equations (8) and (10), above.

In some embodiments, the uniform parameter t may be based on the ratio of time between a maximum determined time to track a virtual object and a measured actual time for a user to track a virtual object. For example, a maximum time needed to move the virtual object from the initial target location to the new target location is t_max, defined by equation (4). An actual time, t_real for a user to track a virtual object moving from the initial target location to the new target location may be used in conjunction with t_max to determine a uniform parameter t:

$$t = \frac{t_{real}}{t_{max}} \quad (13)$$

Interpolation parameters s and u may then be determined from the uniform parameter t. A point or position of the virtual object may then be approximated or determined based on the interpolation using the obtained interpolation parameter u.

In some examples the interpolation and/or curve(s) associated with the interpolation may be tuned or adjusted based on one or more parameters. In some examples, the one or more parameters may change a rate of ramp up, ramp down, peak location, or other aspect a speed of the virtual object as it moves from the first location to the second location. In some examples, the parameters may be adjusted on a userby-user basis. In some examples, the parameters may be adjusted based on a population trend or categorization of a user within a population group. In some examples, the one or more parameters may be set to a default and be updated based on user use or AR system measurements of eye tracking or other tracking parameters.

In some examples, the one or more parameters may be personalized for a user or a group of users. For example, the eye virtual object movement system may make use of collected eye movement data to analyze how people move their eyes within a test framework. The system may then update the eye virtual object movement based on the collected eye movement data to help reduce sources of error in eye calibration, such as overshoot. In some examples, a test framework could include an angular speed, focus speed, eye movement range of motion, or other parameter related to eye tracking. In some examples, the test framework could include measuring the one or more parameters in a manner to help reduce measurement errors. For example, the display system may measure a user's eye tracking parameter(s) in conjunction with secondary user input relating to the calibration. The secondary user input may include, for example, virtual button presses indicating a user's eye coming to a rest. Advantageously, the secondary user input may allow, for example, the display system to identify a total time for the user to track a moving virtual object more accurately than with eye tracking alone.

J. Additional Aspects

Included herein are additional aspects of a head mounted display system and associated methods. Any of the aspects or examples disclosed herein may be combined in whole or in part.

In a 1st aspect, a head-mounted display system is disclosed. The head-mounted display system comprising: a display configured to present virtual content to a user; a hardware processor in communication with the display, the hardware processor programmed to: cause the display system to display a virtual object at a first location; and cause the display system to move the virtual object to a second location at a variable speed based on an S-shaped speed curve.

In a 2nd aspect, The head-mounted display system of aspect 1, wherein the one or more hardware processors is configured to: determine a diopter distance between the first location and the second location; determine a distance between a focal plane of the first location and a focal plane of the second location; and determine a total time to move the virtual object from the first location to the second location based at least partly on the diopter distance and the distance between the focal plane of the first location and the focal plane of the second location.

In a 3rd aspect, the head-mounted display system of any one of aspects 1 or 2, wherein to determine the total time, the one or more hardware processors is configured to: determine at least one tracking time associated with at least one eye of the user based on the diopter distance; determine at least one focus time associated with at least one eye of the user based on the focal plane distance; and select a total time from the at least one tracking time and the at least one focus time.

In a 4th aspect, the head-mounted display system of any of aspects 1-3, wherein the at least one tracking time comprises a time for the at least one eye of the user to move angularly over the diopter distance.

In a 5th aspect, the head-mounted display system of any of aspects 1-4, wherein the at least one tracking time comprises a tracking time associated with a left eye and a tracking time associated with a right eye.

In a 6th aspect, the head-mounted display system of any of aspects 1-5, wherein the at least one focus time comprises a time for the at least one eye of the user to focus over the distance between the focal plane of the first location and the focal plane of the second location.

In a 7th aspect, the head-mounted display system of any of aspects 1-6, wherein the at least one focus time comprises a focus time associated with a left eye and a focus time associated with a right eye.

In an 8th aspect, the head-mounted display system of any of aspects 1-7, wherein the one or more hardware processors is configured to determine the variable speed based on the total time.

In a 9th aspect, the head-mounted display system of any of aspects 1-8, wherein the variable speed is based on the inverse of diopter distance of the first and second locations.

In a 10th aspect, the head-mounted display system of any of aspects 1-9, wherein the one or more hardware processors is configured to interpolate the position of the virtual object as a function of time based on one or more parameters associated with the total time or the diopter distance.

In an 11th aspect, the head-mounted display system of any of aspects 1-10, wherein the one or more parameters comprises a uniform and a non-uniform parameter and wherein the non-uniform parameter is configured to change values at a variable rate associated with one or more Splines curves as a function the uniform parameter.

In a 12th aspect, the head-mounted display system of any of aspects 1-11, wherein the uniform parameter is based at least partly on the total time.

In a 13th aspect, the head-mounted display system of any of aspects 1-12, comprising an image capture device configured to capture eye images of one or two eyes of a user of the wearable system.

In a 14th aspect, the head-mounted display system of any of aspects 1-13 wherein the virtual content comprises an eye calibration target.

In a 15th aspect, a method of moving virtual content is disclosed. The method comprising: causing to display on a display system a virtual object at a first location; and causing the display system to move the virtual object to a second location at a variable speed following an S-shaped speed curve.

In a 16th aspect, the method of aspect 15, the method comprising: determining a diopter distance between the first location and the second location; determining a distance between a focal plane of the first location and a focal plane of the second location; and determining a total time to move the virtual object from the first location to the second location based at least partly on the diopter distance and the distance between the focal plane of the first location and the focal plane of the second location.

In a 17th aspect, the method of any one of aspects 15 or 16, wherein determining the total time comprises: determining at least one tracking time associated with at least one eye of the user based on the diopter distance; determining at least one focus time associated with at least one eye of the user based on the focal plane distance; and selecting a total time from the at least one tracking time and the at least one focus time.

In an 18th aspect, the method of any one of aspects 15-17, wherein the at least one tracking time comprises a time for the at least one eye of the user to move angularly over the diopter distance.

In a 19th aspect, the method of any one of aspects 15-18, wherein the at least one tracking time comprises a tracking time associated with a left eye and a tracking time associated with a right eye.

In a 20th aspect, the method of any one of aspects 15-19, wherein the at least one focus time comprising a time for the at least one eye of the user to focus over the distance between the focal plane of the first location and the focal plane of the second location.

In a 21st aspect, the method of any one of aspects 15-20, wherein the at least one focus time comprises a focus time associated with a left eye and a focus time associated with a right eye.

In a 22nd aspect, the method of any one of aspects 15-21, the method comprising determining the variable speed based on the total time.

In a 23rd aspect, the method of any one of aspects 15-22, wherein the variable speed is based on the inverse of the diopter distance.

In a 24th aspect, the method of any one of aspects 15-23, comprising interpolating the position of virtual object as a function of time, wherein interpolating the position of the virtual object as a function of time comprises interpolating an S-curve function with one or more parameters based on the total time or the diopter distance.

In a 25th aspect, the method of any one of aspects 15-24, wherein the one or more parameters comprises a uniform and a non-uniform parameter and wherein the non-uniform parameter is configured to change values at a variable rate associated with one or more Splines curves as a function the uniform parameter.

In a 26th aspect, the method of any one of aspects 15-25, wherein the uniform parameter is based at least partly on the total time.

In a 27th aspect, the method of any one of aspects 15-26, wherein the virtual content comprises an eye calibration target.

In a 28th aspect, a wearable system for eye tracking calibration is disclosed. The system comprising: a display configured to display an eye calibration target to the user; a hardware processor in communication with the non-transitory memory and the display system, the hardware processor programmed to: cause the display to display the eye calibration target at a first target location; identify a second location different from the first target location; determine a distance between the first target location and the second target location; determine a total allocated time to move the eye calibration target from the first target location to the second target location; calculate a target movement speed curve based on the total allocated time, the target movement speed curve being an S-curve; and move the eye calibration target over the total time according to the target movement speed curve.

In a 29th aspect, the wearable system of aspect 28, wherein the hardware processor is configured to: identify the user's eye gaze based on data acquired from the image capture device; determine whether the user's eye gaze aligns with the eye calibration target at the second target location; and in response to a determination that the user's eye gaze aligns with the eye calibration target at the second location, instruct the image capture device to capture the eye images and initiate storage of the eye images into the non-transitory memory.

In a 30th aspect, a method for eye tracking calibration is disclosed. The method comprising: causing to display an eye calibration target at a first target location in an environment of a user; identifying a second location different from the first target location; determining a distance between the first target location and the second target location; determining a total allocated time to move the eye calibration target from the first target location to the second target location; calculating a target movement speed curve based on the total allocated time, the target movement speed curve being an S-curve; and moving the eye calibration target over the total time according to the target movement speed curve.

In a 31st aspect, the method of aspect 30, the method comprising: identifying the user's eye gaze based on data acquired from the image capture device; determining whether the user's eye gaze aligns with the eye calibration target at the second target location; and in response to a determining that the user's eye gaze aligns with the eye calibration target at the second location, instructing an image capture device to capture the eye images and initiate storage of the eye images into the non-transitory memory.

In a 32nd aspect, a wearable system for eye tracking calibration is described. The system comprising: an image capture device configured to capture eye images of one or two eyes of a user of the wearable system; non-transitory memory configured to store the eye images; a display system through which the user can perceive an eye calibration target in an environment of the user; a hardware processor in communication with the non-transitory memory and the display system, the hardware processor programmed to: cause the eye calibration target to be perceivable via the display system at a first target location in the environment of the user; identify a second target location in the environment of the user different from the first target location; determine a diopter distance between the first target location and the second target location; determine a total time to move the eye calibration target from the first target location to the second target location based on the distance; interpolate a target position based at least partly on the inverse of the diopter distance; and move the eye calibration target over the total time according to the interpolated target position as a function of time.

In a 33rd aspect, the wearable system of aspect 32, wherein the hardware processor is configured to: identify the user's eye gaze based on data acquired from the image capture device; determine whether the user's eye gaze aligns with the eye calibration target at the second target location; and in response to a determination that the user's eye gaze aligns with the eye calibration target at the second location, instruct the image capture device to capture the eye images and initiate storage of the eye images into the non-transitory memory.

K. Conclusion

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems may include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, a video may include many frames, with each frame having millions of pixels, and specifically programmed computer hardware is necessary to process the video data to provide a desired image processing task or application in a commercially reasonable amount of time. As another example, embodiments of the eye tracking calibration techniques described herein may need to be performed in real-time, while a user is wearing a head-mounted display system.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities may be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto may be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems may generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted may be incorporated in the example methods and processes that are schematically illustrated. For example, one or more additional operations may be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, other implementations are within the scope of the following claims. In some cases, the actions recited in the claims may be performed in a different order and still achieve desirable results.

What is claimed is:

1. A wearable system for eye tracking calibration, the wearable system comprising:
   a display configured to display an eye calibration target to a user;
   a hardware processor in communication with a non-transitory memory and a display system, the hardware processor programmed to:
   cause the display to display the eye calibration target at a first target location;
   identify a second target location different from the first target location;
   determine a distance between the first target location and a second target location;
   determine a total time to move the eye calibration target from the first target location to the second target location;
   calculate a target movement speed curve based on the total time, the target movement speed curve being an S-curve; and
   move the eye calibration target over the total time according to the target movement speed curve.

2. The wearable system of claim 1, wherein the hardware processor is configured to:
   identify an eye gaze of the user based on data acquired from an image capture device;
   determine whether the eye gaze of the user aligns with the eye calibration target at the second target location; and
   in response to a determination that the eye gaze of the user aligns with the eye calibration target at the second target location, instruct the image capture device to capture eye images and initiate storage of the eye images into the non-transitory memory.

3. The wearable system of claim 1, wherein the hardware processor is configured to:
   determine a diopter distance between a first location and a second location;
   determine a distance between a focal plane of the first location and a focal plane of the second location; and
   determine a total time to move a virtual object from the first location to the second location based at least partly on the diopter distance and the distance between the focal plane of the first location and the focal plane of the second location.

4. The wearable system of claim 3, to determine the total time, the hardware processor is configured to:
   determine at least one tracking time associated with at least one eye of the user based on the diopter distance, wherein the at least one tracking time comprises a time for the at least one eye of the user to move angularly over the diopter distance;
   determine at least one focus time associated with the at least one eye of the user based on a focal plane distance, wherein the at least one focus time comprises a time for the at least one eye of the user to focus over the distance between the focal plane of the first target location and the focal plane of the second target location; and
   select the total time from the at least one tracking time and the at least one focus time.

5. The wearable system of claim 4, wherein the at least one tracking time comprises a tracking time associated with a left eye and a tracking time associated with a right eye.

6. The wearable system of claim 1, wherein the hardware processor is configured to:
   determine a diopter distance between a first location and a second location; and
   move a virtual object at a variable speed based on the S-curve, wherein the variable speed is based on an inverse of the diopter distance.

7. A method for eye tracking calibration, the method comprising:
   causing to display an eye calibration target at a first target location in an environment of a user;
   identifying a second target location different from the first target location;
   determining a distance between the first target location and a second target location;
   determining a total time to move the eye calibration target from the first target location to the second target location;
   calculating a target movement speed curve based on the total time, the target movement speed curve being an S-curve; and
   moving the eye calibration target over the total time according to the target movement speed curve.

8. The method of claim 7, the method comprising:
   identifying an eye gaze of the user based on data acquired from an image capture device;
   determining whether the eye gaze of the user aligns with the eye calibration target at the second target location; and
   in response to determining that the eye gaze of the user aligns with the eye calibration target at the second target location, instructing the image capture device to capture eye images and initiate storage of the eye images into a non-transitory memory.

9. The method of claim 7, further comprising:
   determining a diopter distance between a first location and a second location;
   determining a distance between a focal plane of the first location and a focal plane of the second location; and
   determining a total time to move a virtual object from the first location to the second location based at least partly on the diopter distance and the distance between the focal plane of the first location and the focal plane of the second location.

10. The method of claim 9, further comprising:
    determining at least one tracking time associated with at least one eye of the user based on the diopter distance, wherein the at least one tracking time comprises a time for the at least one eye of the user to move angularly over the diopter distance;
    determining at least one focus time associated with the at least one eye of the user based on a focal plane distance, wherein the at least one focus time comprises a time for the at least one eye of the user to focus over the distance between the focal plane of the first target location and the focal plane of the second target location; and
    selecting the total time from the at least one tracking time and the at least one focus time.

11. The method of claim 10, wherein the at least one tracking time comprises a tracking time associated with a left eye and a tracking time associated with a right eye.

12. The method of claim 7, further comprising:
    determining a diopter distance between a first location and a second location; and
    moving a virtual object at a variable speed based on the S-curve, wherein the variable speed is based on an inverse of the diopter distance.

13. A wearable system for eye tracking calibration, the wearable system comprising:
    an image capture device configured to capture eye images of one or two eyes of a user of the wearable system;
    non-transitory memory configured to store the eye images;
    a display system through which the user can perceive an eye calibration target in an environment of the user;
    a hardware processor in communication with the non-transitory memory and the display system, the hardware processor programmed to:
        cause the eye calibration target to be perceivable via the display system at a first target location in the environment of the user;
        identify a second target location in the environment of the user different from the first target location;
        determine a diopter distance between the first target location and the second target location;
        determine a total time to move the eye calibration target from the first target location to the second target location based on the diopter distance;
        interpolate a target position based at least partly on an inverse of the diopter distance; and
        move the eye calibration target over the total time according to the target position as a function of time.

14. The wearable system of claim 13, wherein the hardware processor is configured to:
    identify an eye gaze of the user based on data acquired from the image capture device;
    determine whether the eye gaze of the user aligns with the eye calibration target at the second target location; and
    in response to a determination that the eye gaze of the user aligns with the eye calibration target at second target location, instruct the image capture device to capture the eye images and initiate storage of the eye images into the non-transitory memory.

15. The wearable system of claim 13, wherein the hardware processor is configured to:
    determine a diopter distance between a first location and a second location;
    determine a distance between a focal plane of the first location and a focal plane of the second location; and
    determine a total time to move a virtual object from the first location to the second location based at least partly on the diopter distance and the distance between the focal plane of the first location and the focal plane of the second location.

16. The wearable system of claim 15, to determine the total time, the hardware processor is configured to:
    determine at least one tracking time associated with at least one eye of the user based on the diopter distance, wherein the at least one tracking time comprises a time for the at least one eye of the user to move angularly over the diopter distance;
    determine at least one focus time associated with the at least one eye of the user based on a focal plane distance, wherein the at least one focus time comprises a time for the at least one eye of the user to focus over the distance between the focal plane of the first target location and the focal plane of the second target location; and
    select the total time from the at least one tracking time and the at least one focus time.

17. The wearable system of claim 16, wherein the at least one tracking time comprises a tracking time associated with a left eye and a tracking time associated with a right eye.

18. The wearable system of claim 13, wherein the hardware processor is configured to:
    determine a diopter distance between a first location and a second location; and
    move a virtual object at a variable speed based on a S-curve, wherein the variable speed is based on an inverse of the diopter distance.

* * * * *